United States Patent [19]
Suzuki et al.

[11] Patent Number: 6,000,776
[45] Date of Patent: Dec. 14, 1999

[54] APPARATUS AND METHOD FOR REGULATING IMAGE DENSITY

[75] Inventors: Akio Suzuki, Yokohama; Toshimitsu Danzuka, Tokyo; Haruhiko Moriguchi, Yokohama; Yoshihiro Takada; Yasushi Miura, both of Kawasaki; Hisashi Fukushima, Yokohama; Masami Izumizaki, Tokyo; Nobuhiko Takekoshi, Yokohama; Nobuyuki Watanabe, Yokohama; Eiichi Takagi, Yokohama; Haruhiko Takahashi, Yokohama, all of Japan

[73] Assignee: Canon Kabushiki Kaisha, Tokyo, Japan

[21] Appl. No.: 09/015,054

[22] Filed: Jan. 28, 1998

Related U.S. Application Data

[63] Continuation of application No. 08/218,974, Mar. 28, 1994, abandoned.

[30] Foreign Application Priority Data

| May 11, 1990 | [JP] | Japan | 2-119954 |
| May 11, 1990 | [JP] | Japan | 2-119955 |
| May 25, 1990 | [JP] | Japan | 2-134092 |
| May 25, 1990 | [JP] | Japan | 2-134094 |
| May 25, 1990 | [JP] | Japan | 2-134095 |
| May 25, 1990 | [JP] | Japan | 2-134098 |
| May 25, 1990 | [JP] | Japan | 2-134099 |
| Jun. 6, 1990 | [JP] | Japan | 2-146185 |
| Jun. 6, 1990 | [JP] | Japan | 2-146187 |
| Jun. 7, 1990 | [JP] | Japan | 2-151133 |

[51] Int. Cl.⁶ ............................ B41J 29/393
[52] U.S. Cl. ............................ 347/19; 347/14
[58] Field of Search .......... 347/133, 5, 14, 347/19, 236, 237, 246, 247; 358/296, 298, 504, 406; 356/431; 250/559, 562, 571, 572; 400/703

[56] References Cited

U.S. PATENT DOCUMENTS

| 4,328,504 | 5/1982 | Weber et al. | 346/75 |
| 4,547,784 | 10/1985 | Erlichman et al. | 346/76 PH |
| 4,675,696 | 6/1987 | Suzuki et al. | 346/46 |
| 4,745,489 | 5/1988 | Kashiwagi et al. | 358/296 |
| 4,827,279 | 5/1989 | Lubinsky et al. | 346/1.1 |
| 4,829,323 | 5/1989 | Suzuki et al. | 346/140 R |
| 4,853,768 | 8/1989 | Suzuki et al. | 358/80 |
| 4,882,621 | 11/1989 | Suzuki et al. | 358/80 |
| 4,908,635 | 3/1990 | Iwasawa et al. | 346/140 R |
| 4,954,913 | 9/1990 | Kajita | 358/474 |
| 5,038,208 | 8/1991 | Ichikawa et al. | 358/75 IJ |
| 5,070,410 | 12/1991 | Hadley | 358/296 |
| 5,172,223 | 12/1992 | Suzuki et al. | 358/79 |

FOREIGN PATENT DOCUMENTS

| 0144188 | 6/1985 | European Pat. Off. . |
| 0399668 | 11/1990 | European Pat. Off. . |
| 50-147241 | 11/1975 | Japan . |
| 54-27728 | 3/1979 | Japan . |
| 57-41965 | 3/1982 | Japan . |
| 60-20660 | 2/1985 | Japan . |
| 61-229576 | 10/1986 | Japan . |
| 63-285070 | 11/1988 | Japan . |
| 3-114761 | 5/1991 | Japan . |
| 3-121865 | 5/1991 | Japan . |

*Primary Examiner*—Benjamin R. Fuller
*Assistant Examiner*—C. Dickens
*Attorney, Agent, or Firm*—Fitzpatrick, Cella, Harper & Scinto

[57] ABSTRACT

An image forming apparatus includes reading means for reading the density of a test pattern corresponding to each of plural recording elements of a recording head, the recording elements being arranged in an array, and the test pattern being recorded by the recording elements. An eliminating means eliminates error information, recorded from an area outside a test pattern are, from density information obtained by the reading means when the density of a test pattern end portion corresponding to an end portion of the array of plural of recording elements is determined. A means is provided for uniforming the image densities in correspondence with the plurality of recording elements based on density information from which the error information is eliminated by the eliminating means.

40 Claims, 70 Drawing Sheets

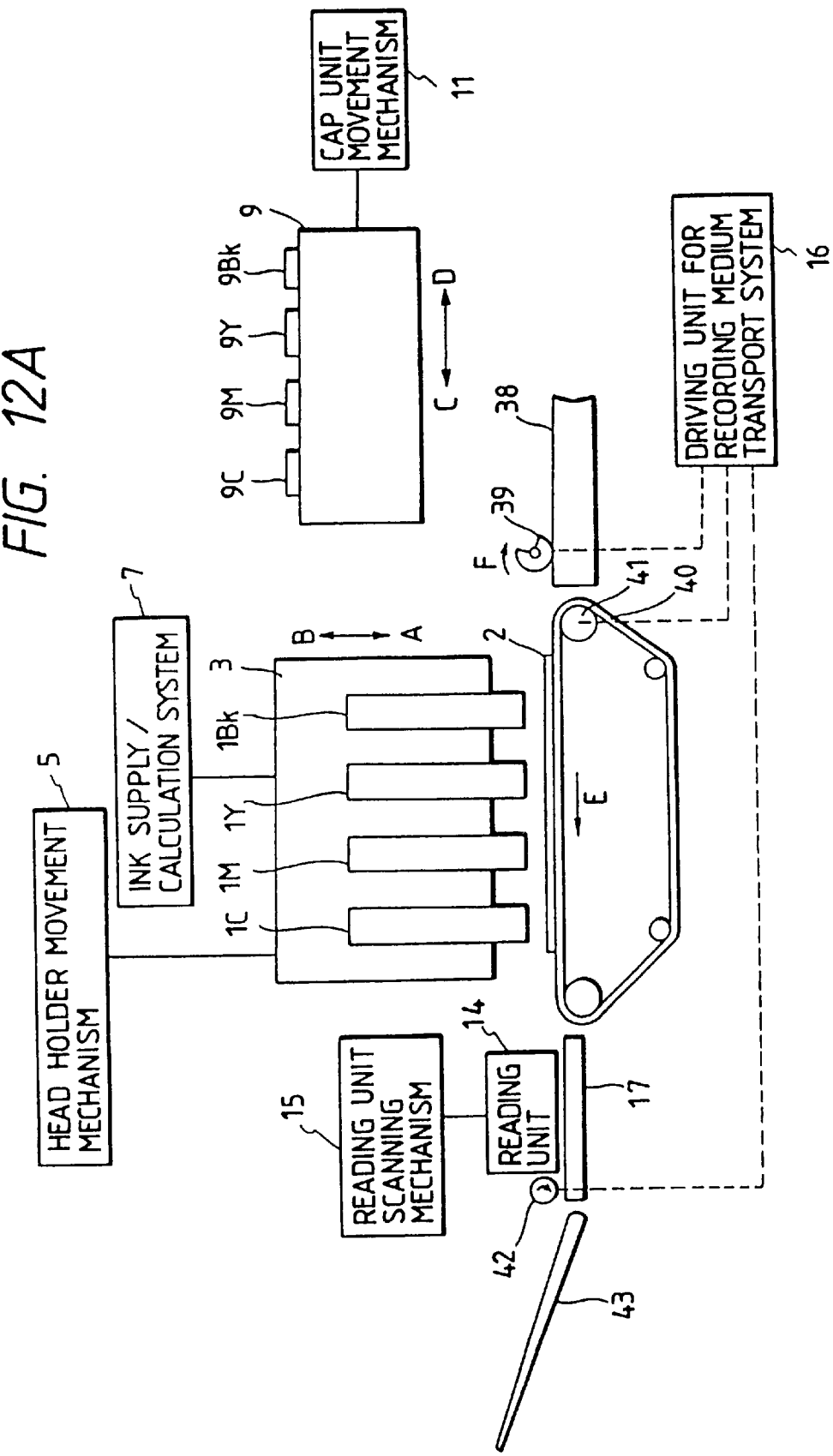

DRIVING FREQUENCY OF
STEPPING MOTOR

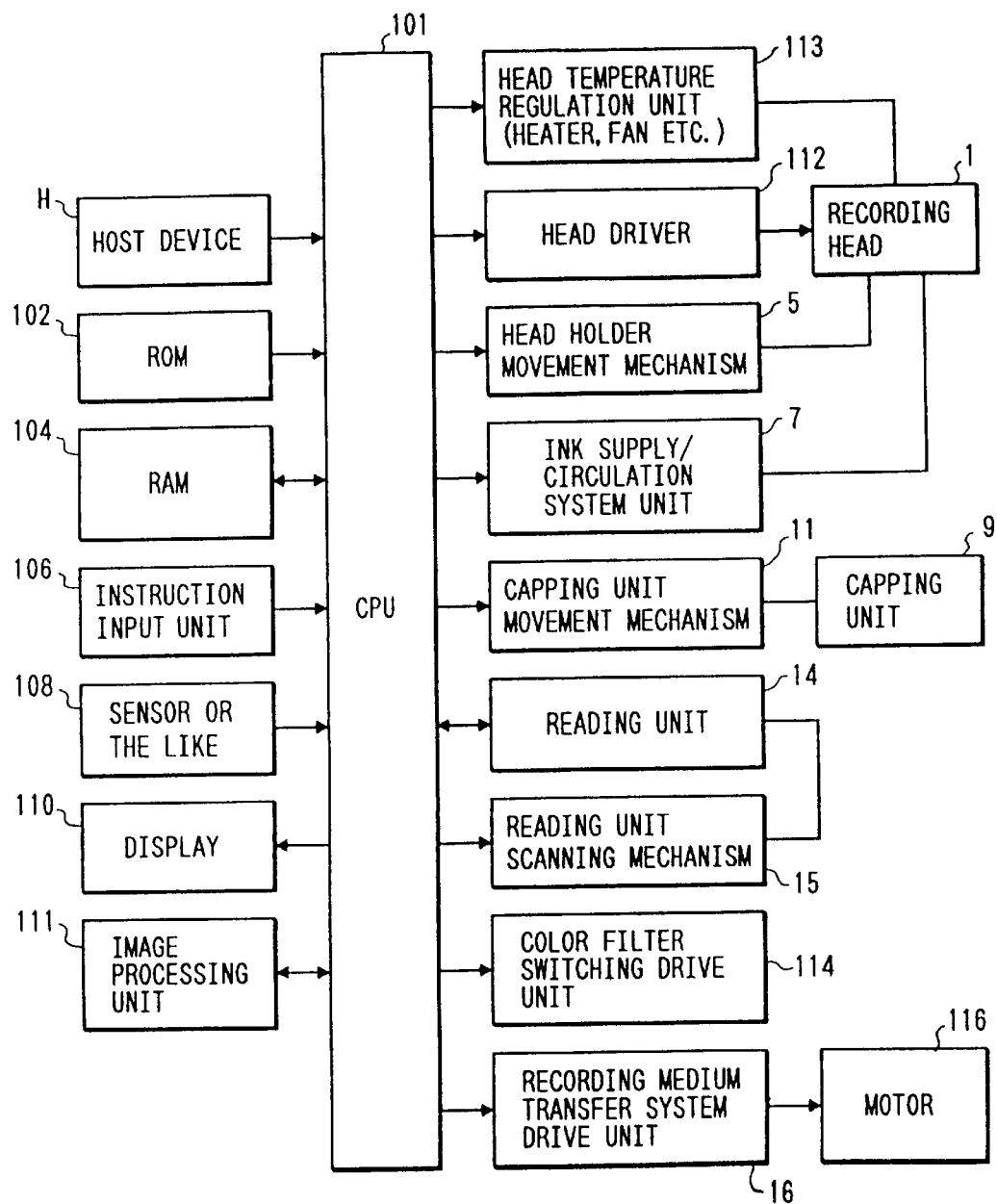

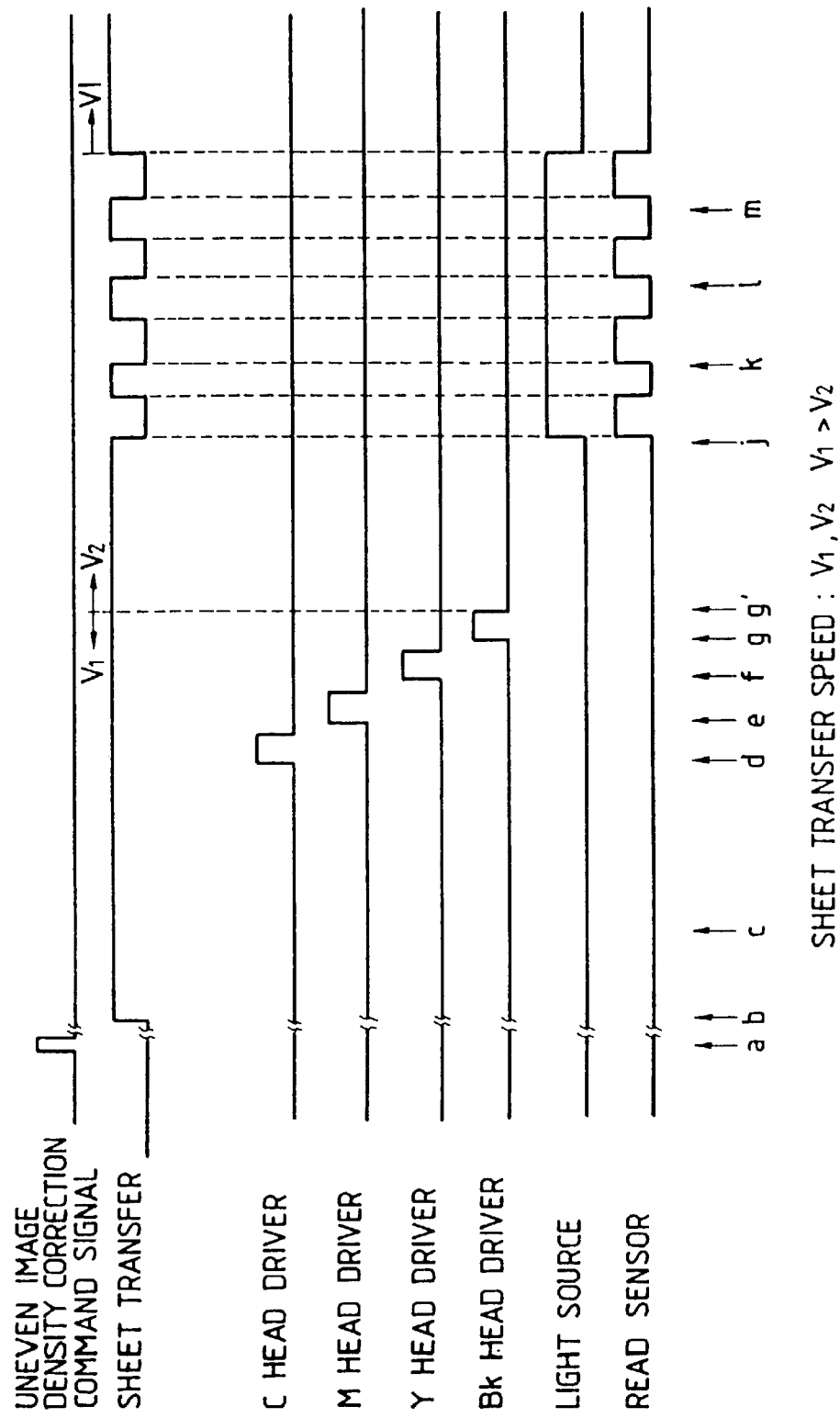

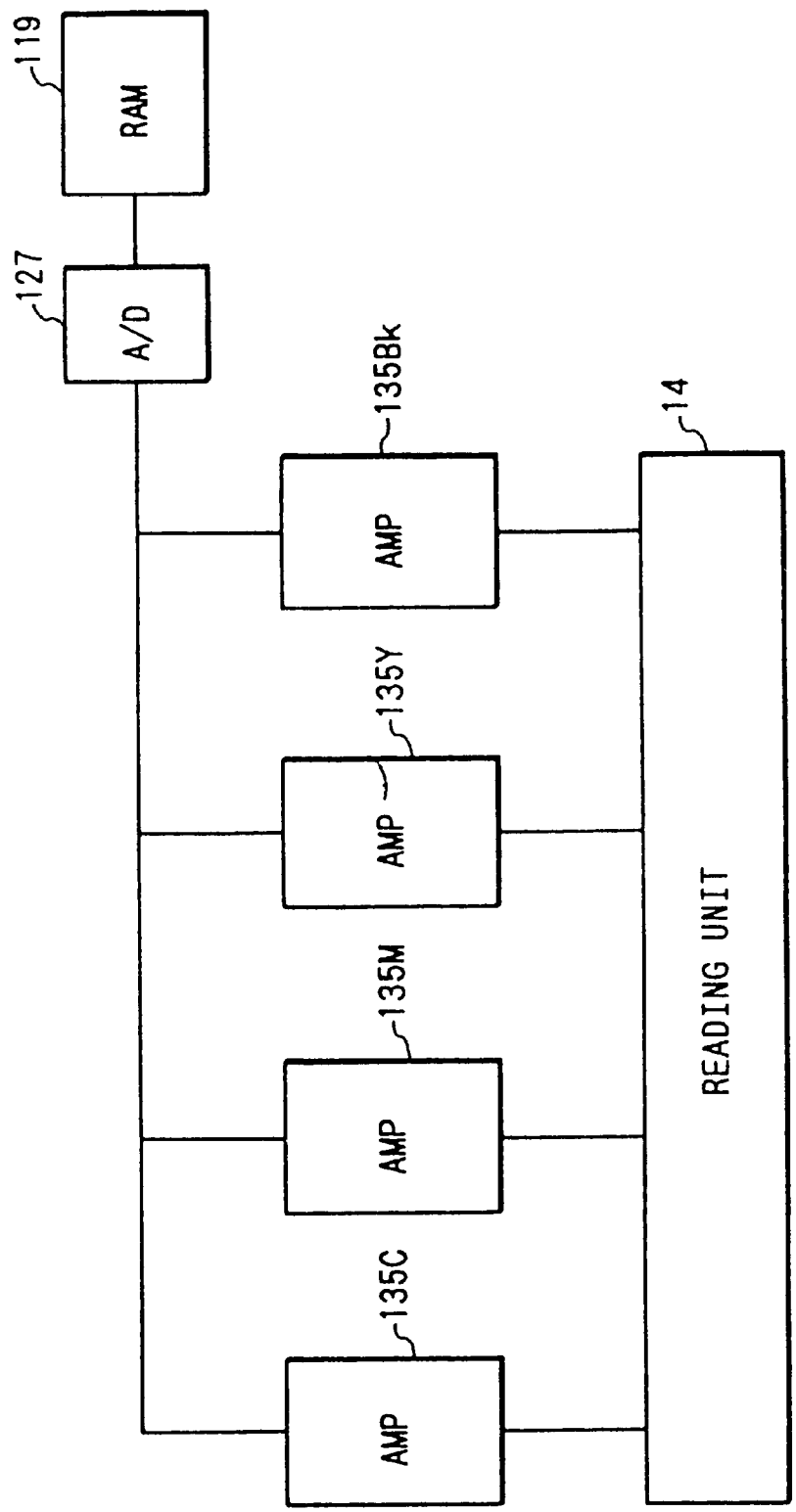

FIG. 78
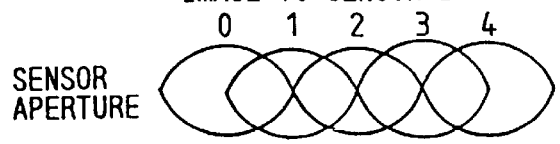
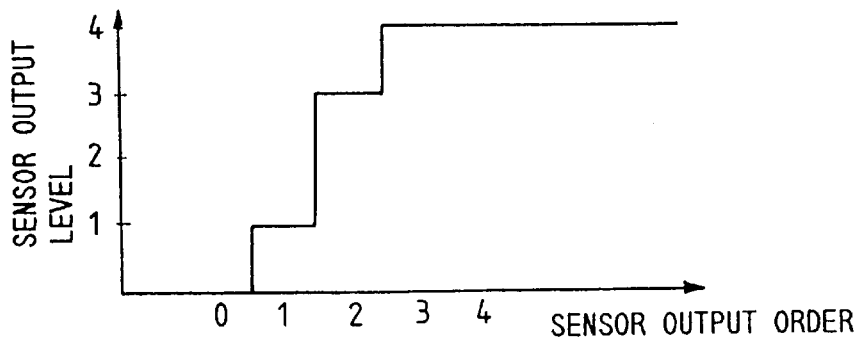
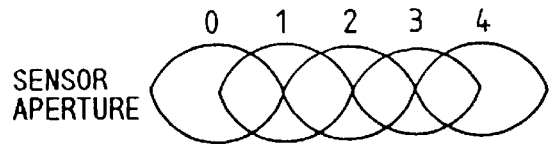
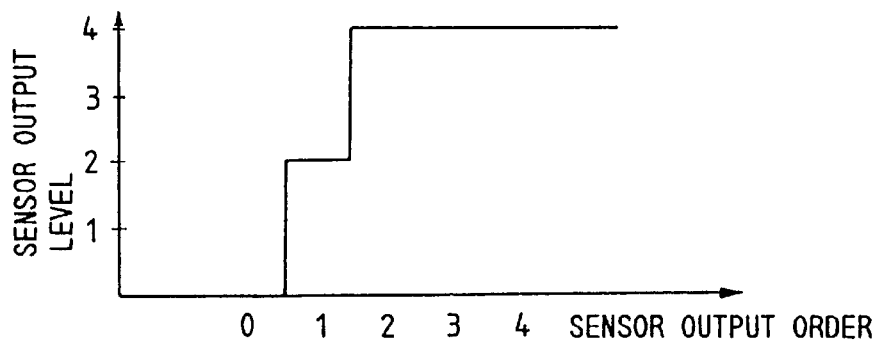

APPARATUS AND METHOD FOR REGULATING IMAGE DENSITY

This is a continuation of Ser. No. 08/218,974 filed Mar. 28, 1994, now abandoned.

BACKGROUND OF THE INVENTION

1. Field of the Invention

The present invention relates to an unevenness correction data production apparatus and an image forming apparatus and, more particularly, is suitable for an image forming apparatus for performing image formation using a recording head having a plurality of recording elements constituting an array.

Particularly, the present invention relates to an apparatus having a mechanism for automatically controlling print characteristics of a recording head in an ink-jet recording apparatus and is especially effective in an apparatus for forming a multi-gradation color image by overlapping ink droplets.

2. Related Background Art

Along with development of information processing equipment (e.g., a copying machine, a wordprocessor, and a computer) and communication equipment, apparatuses for performing digital image recording using a recording head by using an ink-jet scheme, a thermal transfer scheme, or the like have been very popular as image forming (recording) apparatuses for equipment such as information processing equipment and communication equipment. In such a recording apparatus, a recording head having an array of a plurality of recording elements (to be referred to as a multi-head hereinafter) is generally used to increase a recording speed.

For example, a multi-nozzle head having a plurality of ink orifices and a plurality of liquid paths is generally used in an ink-jet recording head. A plurality of heaters are generally stacked in a thermal transfer or thermal head.

It is very difficult to uniformly manufacture recording elements of a multi-head due to variations in characteristics during the fabrication process and variations in properties of head constituting materials. Variations occur in the characteristics of the respective recording elements. For example, in the above multi-nozzle head, variations occur in shapes of the orifices and liquid paths. In the above thermal head, shapes of heaters and resistances inevitably vary. Nonuniformity of characteristics between the recording elements appears as nonuniformity of sizes of dots recorded by the respective recording elements and as uneven image densities of the resultant image.

To cope with the above problems, various methods are proposed in which an uneven image density is visually found or an adjusted image is visually checked, a signal applied to each recording element is manually corrected, thereby obtaining a uniform image.

For example, in a multi-head 330 having recording elements 331 arranged as shown in FIG. 1A, assume that input signals to the respective recording elements are uniformed, as shown in FIG. 1B, and that an uneven image density is visually found, as shown in FIG. 1C. In this case, an input signal is corrected, as shown in FIG. 1D. More specifically, a large input signal is supplied to a recording element corresponding to a low image density, and a small input signal is supplied to a recording element corresponding to a high image density, thereby generally performing manual adjustment.

In a recording scheme capable of modulating a dot diameter or dot density, the diameter of a dot to be recorded by each recording element is modulated in accordance with an Input to achieve gradation recording. For example, if modulation of a drive voltage applied to each injection energy generating element (e.g., a piezoelectric element or an electricity-heat conversion element) in an ink-jet recording head according to a piezoelectric scheme or a scheme utilizing heat energy, or a drive voltage applied to each heater in a thermal head or a pulse width of the drive voltage in accordance with an input signal is utilized, a dot diameter or a dot density by each recording element can be uniformed, and a density distribution can be uniformed, as shown in FIG. 1E. Alternatively, assume that it is difficult to modulate a drive voltage or pulse width or it is difficult to perform density adjustment in a wide range even if the drive voltage or pulse width is modulated. In this case, if one pixel is constituted by, e.g., a plurality of dots, the number of dots to be recorded in accordance with an input signal is modulated. A larger number of dots are assigned to a portion having a low density, while a smaller number of dots are assigned to a portion having a high density. If one pixel is constituted by one dot, the number of orifice-use times (the number of injection cycles) per pixel is modulated in the ink-jet recording apparatus, thereby changing the dot diameter. Therefore, the density distribution can be uniformed, as shown in FIG. 1E.

Japanese Patent Laid-Open Application No. 57-41965 filed by the present applicant discloses that a color image is automatically read by an optical sensor, and a correction signal is supplied to each ink-jet recording head to form a desired color image. In this prior-art invention, basic automatic adjustment is disclosed, and an important technique is thus disclosed. Various problems may be posed when this prior-art invention is embodied in a variety of practical applications as various apparatuses. However, technical problems of the present invention are not found in this prior-art invention.

Techniques except for a density detection scheme are disclosed in Japanese Laid-Open Patent Application No. 60-206660, U.S. Pat. No. 4,328,504, and Japanese Patent Laid-Open Application Nos. 50-147241 and 54-27728. A landing position of a liquid droplet is automatically read, and the read position data is corrected to perform landing to an accurate position. Although these schemes are common as automatic adjustment techniques, the technical problems of the present invention are not found in these prior-art inventions.

In order to cope with the above problem, an uneven image density reading unit is arranged in an image forming apparatus, and an uneven image density distribution within the array of recording elements is periodically read to rewrite an unevenness correction data, thus providing an effective countermeasure. According to this technique, even if the uneven image density distribution of the head is changed, the unevenness correction data is rewritten accordingly, thereby always obtaining a uniform image free from unevenness. Such an image recording apparatus is proposed by the present applicant (U.S. Ser. No. 480,041 filed on Feb. 14, 1990; and U.S. Ser. No. 516,129 filed on Apr. 27, 1990).

FIG. 2 shows an uneven image density reading unit 506 used in the above method. A recording medium 501 has an unevenness measurement test pattern. The reading unit 506 includes a light source 502 for illuminating a surface of the recording medium, a reading sensor 503 for reading light reflected by the surface of the recording medium, and lenses 504 and 505. The reading unit 506 having the above arrangement is scanned to read an unevenness distribution, thereby rewriting unevenness correction data.

FIG. 3 is a view for explaining a reading mode of a test pattern. A reading unit 506 is the one shown in FIG. 2. A recording head 520 has recording elements 521 aligned within a range l in the direction of width (x direction) of a recording medium. A test pattern 524 has a predetermined width W and is recorded upon appropriate driving of the recording elements 521 during relative movement (i.e., conveyance of the recording medium 501 in the y direction) between the recording medium 501 and the recording head 520. This test pattern 524 is read upon scanning of the recording unit 506 in the x direction.

FIG. 4 shows another uneven image density reading unit. The reading unit comprises a line sensor 520 comprising a CCD or the like having read pixels 521, and an unevenness correction test pattern 524 in which a recording element is formed by a width d in the y direction. The density of the test pattern is read by a recording head while the line sensor 520 is scanned in the x direction. Data read by the pixels 521 of the line sensor 520 correspond to density data formed by the respective recording elements of the recording head.

FIG. 5 shows a relationship between scanning positions during scanning of the reading unit in the x direction and test pattern read densities in FIGS. 3 and 4. As is apparent from FIGS. 3 and 4, density data has moderate leading and trailing edges. It is difficult to employ any point corresponding to a recording element located at the end of the recording head. For this reason, a threshold value of several tens of % of a maximum output is preset, and a point P having the threshold value is assumed as a reference point of the position of the recording element of the end portion of the recording head. The read data are caused to correspond to the recording elements on the basis of the reference point, thereby forming correction data.

A print duty of each pattern is not constant and is changed as needed. For example, a test pattern having a print duty of about 50% is generally used. However, when an uneven image density of a high-density portion is to be concentratedly corrected, a test pattern having a print duty of about 75% is preferably used. When an uneven image density of a highlighted portion is to be concentratedly corrected, a test pattern having a print duty of about 30% is preferably used. In order to obtain an average correction effect throughout the entire density range, three density distributions of 30%, 50%, and 75% are preferably measured to form correction data from their average value.

In this manner, when a common threshold value is used at the time of a change in print duty, an end position detected based on the print duties varies since the read density is changed with a change in print duty.

For example, referring to FIG. 5, when the threshold value T is kept unchanged upon acquirement of an unevenness distribution B by a change in print duty of a head having an unevenness distribution A, the detected reference point becomes a position P', thus causing inaccuracy in correspondence between unevenness data and the recording elements. As a result, accurate correction may not be performed.

When an image forming apparatus has recording heads of two or more colors and unevenness correction is to be performed for these heads, the following problem is posed.

For example, when spectral sensitivity of the reading head shown in FIG. 2 was close to a human luminosity factor according to an experiment of the present applicant, read densities of magenta, cyan, and black heads were respectively 1.44, 1.46 and 1.55 under the condition that a read density of a yellow head is set to 1. In this manner, since read densities are different depending on different colors, when the common threshold value is used, end positions detected for different colors are different from each other.

For example, referring to FIG. 5, when the color of a head having the unevenness distribution A is changed to obtain the unevenness distribution A, and the threshold value B is kept unchanged, the detected reference point is the position P', thus causing inaccurate correspondence between the unevenness data and the recording elements. As a result, accurate correction may not be performed.

Since the reading means described above is mounted in a recording apparatus, it must be simple in structure at low cost. For this purpose, read precision is inevitably limited.

Uneven image densities having even a small difference are visually noticed. In order to read and correct these uneven image densities, highly precise reading is required.

Correction quantities by automatic control are obtained as follows.

A test pattern (FIG. 6A) obtained by driving a plurality of recording elements under the same condition, i.e., by the same drive signal (the drive signal is defined as $S_0$ in this case) is recorded. An optical density of the test pattern is not uniform due to variations caused by fabrication of the respective recording elements and variations caused by deteriorations over time, as shown in FIG. 6B. An uneven image density is caused. This uneven image density is read, partial densities $OD_1$ to $OD_N$ corresponding to all the recording elements are measured, and an average density as the correction target is obtained as follows:

$$\overline{OD} = \sum_{n=1}^{N} OD_n / N$$

This average density need not be obtained by simply averaging the densities of the all recording elements. For example, quantities of reflected light may be integrated and the integral values are averaged to obtain an average value, or another known method may be used to obtain an average value.

If a relationship between image signal values and an output density of a given element or a given element group is given as shown in FIG. 7, a signal actually supplied to this element or this element group is obtained by correcting the signal S to obtain a correction coefficient a for obtaining the target density $\overline{OD}$. A correction signal $\alpha \cdot S$ obtained by correcting the signal S to $\alpha \times S = (\overline{OD}/OD_n) \times S$ is supplied to the element n or the element group. More specifically, table conversion shown in FIG. 8 is performed for the input image signal in practice. Referring to FIG. 8, a straight line A is a line having a gradient of 1.0. This table is a table for performing no conversion of an input signal and directly outputting the input signal. A straight line B is a straight line having a gradient of $\alpha = \overline{OD}/OD_n$. This table is a table for converting the input signal S into an output signal $\alpha \cdot S$. The table representing the straight line B in FIG. 8 is used for the image signal corresponding to the nth recording element, and table conversion having a correction coefficient $\alpha_n$ is performed. Thereafter, when the head is driven, the densities of the portion recorded by the N recording elements are equal to $\overline{OD}$. This processing is performed for all the recording elements to correct the uneven image densities, thereby obtaining a uniform image. That is, when data representing a correspondence between a given table conversion coefficient and an image signal of each recording element is obtained, unevenness correction can be performed.

The above correction for density comparison may be performed for each nozzle group (3 to 5 nozzles) to perform correction in accordance with approximation of unevenness correction.

As briefly described above, however, the following problem is posed by a sequence wherein light is incident on the test pattern, as shown in FIG. 6A, the quantity of light reflected by the test pattern is measured, a correction quantity is calculated by the above arithmetic operation method, and each recording element is driven by a corrected drive signal.

In measurement of optical densities of end portions of a test pattern, as indicated by A and B in FIG. 6A, i.e., measurement of the quantity of light reflected by the test pattern upon its radiation with light, values having many errors caused by flare influences are inevitably measured, and recording by the recording elements corresponding to the portions A and B causes uneven image densities.

FIG. 9B shows a typical distribution of the quantity of reflected light measured by an optical sensor upon radiation of a test pattern shown in FIG. 9A. At the time of recording of a test pattern, all the recording elements are driven in accordance with a common drive signal. As described above, quantities of reflected light are not kept constant due to variations in recording elements, resulting from various causes. An uneven image density is present in a recorded image. End portions outside the pattern and a recording medium are left white. The quantity of reflected light is large, and the quantity of light received by an optical sensor is also large. For this reason, portions A' and B' (FIG. 9B) slightly inside the white portions receive flare influences. When light quantity to density conversion is performed by a correction quantity calculation algorithm using the quantities of light received by the sensor, the optical densities have values smaller than actual values. In this case, a correction value for increasing a drive signal for a recording element so as to increase the optical density is undesirably calculated. As a result, an image obtained by correcting the above correction value may have a higher density at both ends thereof.

In order to essentially solve this problem, flare must be eliminated. An optical system which satisfies this requirement becomes expensive.

This arrangement still has the following points to be improved.

Assume a read range of the sensor 503 under the condition that the reading unit 506 shown in FIG. 2 is located at a given scanning position. When this range is inappropriate, the resultant read signal reflects recording characteristics of a large number of recording elements within this range. Uneven image densities represented by fringes having high spatial frequencies cannot be detected. Accurate reading cannot be performed due to an influence of a difference in the number of dots recorded within this range, and a shortage of a light reception quantity.

The above arrangements still have points to be improved.

At the time of reading of uneven image densities, a distance between the uneven image density reading unit and the recording medium on which measurement test patterns are formed must be kept constant. When this distance is changed, a detection result is changed accordingly.

A recording medium such as paper is often curled at a high or low humidity, and a distance between the uneven image density reading unit and the recording medium is often changed.

In this state, the detection result does not necessarily reflect an accurate uneven image density of a recording head. It is therefore difficult to perform accurate uneven image density correction.

On the other hand, when a recording head is located near a read means, the recording head may adversely affect the read means. For example, in an ink-jet recording apparatus, an ink mist is attached from the recording head to a reading sensor of the read means, or reading precision is degraded by a thermal influence.

When the reading head and the read means are arranged in a single apparatus, the recording head may adversely affect the read means. For example, in an ink-jet recording apparatus, an ink mist or water droplet is attached from the recording head to a read means to degrade reading precision. In this case, accurate correction cannot be performed. Recording paper dust and any other dust may be generally attached to the reading unit.

An uneven image density may be defined as an nonuniform density or discontinuity in a change in density. The uneven image density is typically caused not in a narrow range, e.g., in units of pixels, but in a wide range. This uneven image density can be visually observed by an operator. For this reason, an image reading aperture of a sensor for reading this uneven image density can be set to be larger than the size of a dot recorded by each recording element. Since the width of a change in uneven image density is larger than the above aperture, even if correction data are formed on the basis of data obtained by reading an image at a low resolution, unevenness can be eliminated to a considerable extent.

In correction of uneven image densities, however, in order to improve correction precision, correction data are obtained, an image is read using the resultant correction data, and correction data are obtained again, thereby generally performing correction processing a plurality of times. In this case, as shown in FIG. 10, an image area obtained upon first reading in correction processing and an image area obtained upon second reading may be subjected to aberration in positions on the recording sheet. In this case, when a conventional sensor having a low resolution, i.e., a sensor having a large aperture, is used, it is difficult to specify an end of an image area in accordance with a sensor output. Therefore, a sensor output cannot be caused to correspond to each recording element corresponding to an image area. As a result, appropriate correction of each recording element cannot be performed.

In order to solve this problem, a sensor having a high resolution, i.e., having an aperture in units of pixels can be used. However, since this sensor is expensive, the resultant image forming apparatus is becomes expensive accordingly.

SUMMARY OF THE INVENTION

It is an object of the present invention to provide an uneven image density correction data production apparatus capable of accurately correcting an uneven image density and an image forming apparatus.

It is another object of the present invention to provide an uneven image density correction data production apparatus capable of accurately correcting an uneven image density regardless of different print duties and print colors, and an image forming apparatus.

It is still another object of the present invention to provide a simple, low-cost image forming apparatus capable of accurately reading and correcting an uneven image density.

It is still another object of the present invention to provide an image forming apparatus capable of performing correction free from influences such as reading flare, and accurately performing uneven image density correction.

It is still another object of the present invention to solve a problem wherein when three or more test pattern arrays are formed adjacent to each other, and a print density of a plurality of recording elements (orifice corresponding elements) from the density of the central array, unnecessary information is input at an end of a test pattern (array) to be detected.

It is still another object of the present invention to allow accurate, stable reading, thereby improving precision of uneven image density correction.

It is still another object of the present invention, to provide a compact image forming apparatus capable of performing accurate and stable reading.

In order to achieve the above objects according to an aspect of the present invention, there is provided a correction data production apparatus comprising:

detecting means for reading a test pattern formed by a recording head having a plurality of recording elements constituting an array, and for detecting a density distribution of a range of the array of the plurality of recording elements;
 corresponding means for causing the density distribution detected by the detecting means to correspond to the plurality of recording elements on the basis of a reference position where a density of an end portion of the density distribution reaches a predetermined threshold value;
 producing means for producing correction data for an image formation density uniforming drive conditions in correspondence with the plurality of recording elements on the basis of the density distribution corresponded by the corresponding means; and
 changing means for changing the threshold value in accordance with characteristics of the test pattern.

In order to achieve the above objects according to another aspect of the present invention, there is provided an image forming apparatus comprising:

a recording head, having a plurality of recording elements constituting an array, for performing image formation on a recording medium;
 detecting means for reading a test pattern formed by the recording head and for detecting a density distribution of a range of the array of the plurality of elements;
 corresponding means for causing the density distribution detected by the detecting means to correspond to the plurality of recording elements on the basis of a reference position where a density of an end portion of the density distribution reaches a predetermined threshold value;
 producing means for producing correction data for image formation density uniforming drive conditions in correspondence with the plurality of recording elements on the basis of the density distribution corresponded by the corresponding means;
 changing means for changing the threshold value in accordance with the density of the test pattern; and
 correcting means for correcting the drive conditions of the plurality of recording elements on the basis of the produced correction data at the time of image formation.

In order to achieve the above objects according to still another aspect of the present invention, there is provided an image forming apparatus comprising:

a recording head, having a plurality of recording elements constituting an array, for performing image formation on a recording medium;
 reading means for reading a density of a test pattern formed by the recording head;
 uneven image density correcting means for correcting drive conditions of the plurality of recording elements on a read result so as to uniform an image formation density; and
 regulating means for causing the reading means to read a reference density sample prior to reading of the test pattern and regulating the reading means on the basis of a read result.

In order to achieve the above objects according to still another aspect of the present invention, there is provided an image forming apparatus comprising:

reading means for reading a density of a test pattern which corresponds to each of a plurality of recording elements of a recording head, the test pattern being recorded by the plurality of recording elements of the recording head;
 eliminating means for eliminating error information, received from an area outside a test pattern area, from density information obtained by the reading means when a density of a test pattern end portion corresponding to an end portion of an array of the plurality of recording elements is determined; and
 means for uniforming the image densities of the plurality of recording elements on the basis of density information from which the error information is eliminated by the eliminating means.

In order to achieve the above objects according to still another aspect of the present invention, there is provided an image forming apparatus comprising:

a recording head, having a plurality of recording elements constituting an array, for performing image formation on a recording medium;
 signal generating means for causing the recording head to record a predetermined test pattern;
 reading means for reading the test pattern formed by the recording head under the control of the signal generating means;
 read value correcting means for correcting a read value of a given portion associated with a read value of a portion adjacent to the given portion, the given portion corresponding to an end portion of the array of the plurality of recording elements; and
 drive correcting means for correcting drive conditions of the recording head on the basis of the end portion value corrected by the read value correcting means and the read value of a portion except for the end portion.

In order to achieve the above objects according to still another aspect of the present invention, there is provided an image forming apparatus comprising:

a recording head, having a plurality of recording elements constituting an array, for performing image formation on a recording medium;
 reading means for reading a test pattern formed by the recording head in a direction corresponding to a direction of the array;
 means for setting a size of a read range of the test pattern at a main scanning position such that a sub-scanning length is larger than a main scanning length; and
 correcting means for correcting recording head drive conditions on the basis of the read result.

In order to achieve the above objects according to still another aspect of the present invention, there is provided an image forming apparatus comprising:

a recording head, having a plurality of recording elements constituting an array, for performing image formation on a recording medium;

density reading means for reading a density of a test pattern formed by the recording head;

uneven image density correcting means for correcting drive conditions of the plurality of recording elements to uniform an image formation density on the basis of the read result; and means for regulating floating of the recording medium having the test pattern thereon at a position near a read position of the uneven image density reading means.

The objects of this invention also can be achieved by an image forming apparatus which has a recording head having plural recording elements constituting an array, for performing image formation of plural images each having an image density on a recording medium, signal generating means for causing the recording head to record a predetermined test pattern, reading means for reading the test pattern formed by the recording head under control of the signal generating means, and read value correcting means for correcting a read value of an end portion in accordance with a read value of an adjacent portion adjacent to the end portion, the end portion corresponding to an end portion of the array of the plural recording elements. Also provide is a means for uniforming the densities of the images in correspondence with the plural recording elements based on the read value of the end portion corrected by the read value correcting means and the read value of a portion which does not include the end portion.

Moreover, the objects of this invention can be achieved by an image forming apparatus which includes a recording head having plural recording elements constituting an array, for performing image formation of plural images each having an image density on a recording medium, a signal generating means for causing the recording head to record a predetermined test pattern, a reading means for reading the test pattern formed by the recording head under control of the signal generating means, and a read value correcting means for correcting a read value of an end portion in accordance with a read value of an adjacent portion adjacent to the end portion, that end portion corresponding to an end portion of the array of plural recording elements. A means for uniforming the densities of the images in correspondence with the plural recording elements based on the read value of the end portion corrected by the read value correcting means and the read value of a portion which does not include the end portion is provided, and the read value correcting means substitutes for the read value of the end portion corresponding to the end portion of the array of plural recording elements the read value of the adjacent portion adjacent to the end portion.

In addition, the foregoing objects of this invention can be achieved by an image forming apparatus which includes a recording head having recording elements constituting an array, for performing image formation of images each having an image density on a recording medium, signal generating means for causing the recording head to record a predetermined test pattern, reading means for reading the test pattern formed by the recording head under the control of the signal generating means, read value correcting means for correcting a read value of an end portion in accordance with a read value of an adjacent portion adjacent to the end portion, the end portion corresponding to an end portion of the array of recording elements, and means for uniforming the densities of the images in correspondence with the plural recording elements based on an end portion value corrected by the read value correcting means and the read value of a portion which does not include the end portion. The read value correcting means converts the read value of the end portion corresponding to the end portion of the array of recording elements to the read value of the adjacent portion adjacent to the portion.

The objects of this invention also can be achieved through an image forming method involving providing a recording head having recording elements constituting an array, for performing image formation of images each having an image density on a recording medium. This method also involves causing the recording head to record a predetermined test pattern, reading the test pattern formed by the recording head, correcting a read value of an end portion in accordance with a read value of an adjacent portion adjacent to the end portion, the end portion corresponding to an end portion of the array of recording elements, and making uniform the densities of the images in correspondence with the plural recording elements based on an end portion value corrected in the correcting step and the read value of a portion which does not include the end portion.

BRIEF DESCRIPTION OF THE DRAWINGS

FIGS. 12A and 12B are side views showing a line printer type ink-jet recording apparatus according to the first embodiment of the present invention;

FIG. 24 is a block diagram showing an arrangement of a control system in an ink-jet recording apparatus according to this embodiment;

FIGS. 33 and 34 are timing charts showing apparatus operations starting with test pattern recording and terminating with uneven image density reading;

FIG. 35 is a block diagram showing an arrangement for correcting an output magnitude difference caused by colors of unevenness reading sensors;

FIG. 78 is a view for explaining correspondence between an image area and a reading sensor output in the nineteenth embodiment;

DETAILED DESCRIPTION OF THE PREFERRED EMBODIMENTS

The first embodiment of the present invention will be described in detail with reference to the accompanying drawings in the following order.

(1) General Description (FIG. 11)
(2) Mechanical Structure of Apparatus (FIGS. 12A and 12B)
(3) Reading System (FIGS. 13 to 23C)
(4) Control System (FIGS. 24 to 26)
(5) Unevenness Correction Sequence (FIGS. 27 to 36B)

(1) General Description

Figure 11:
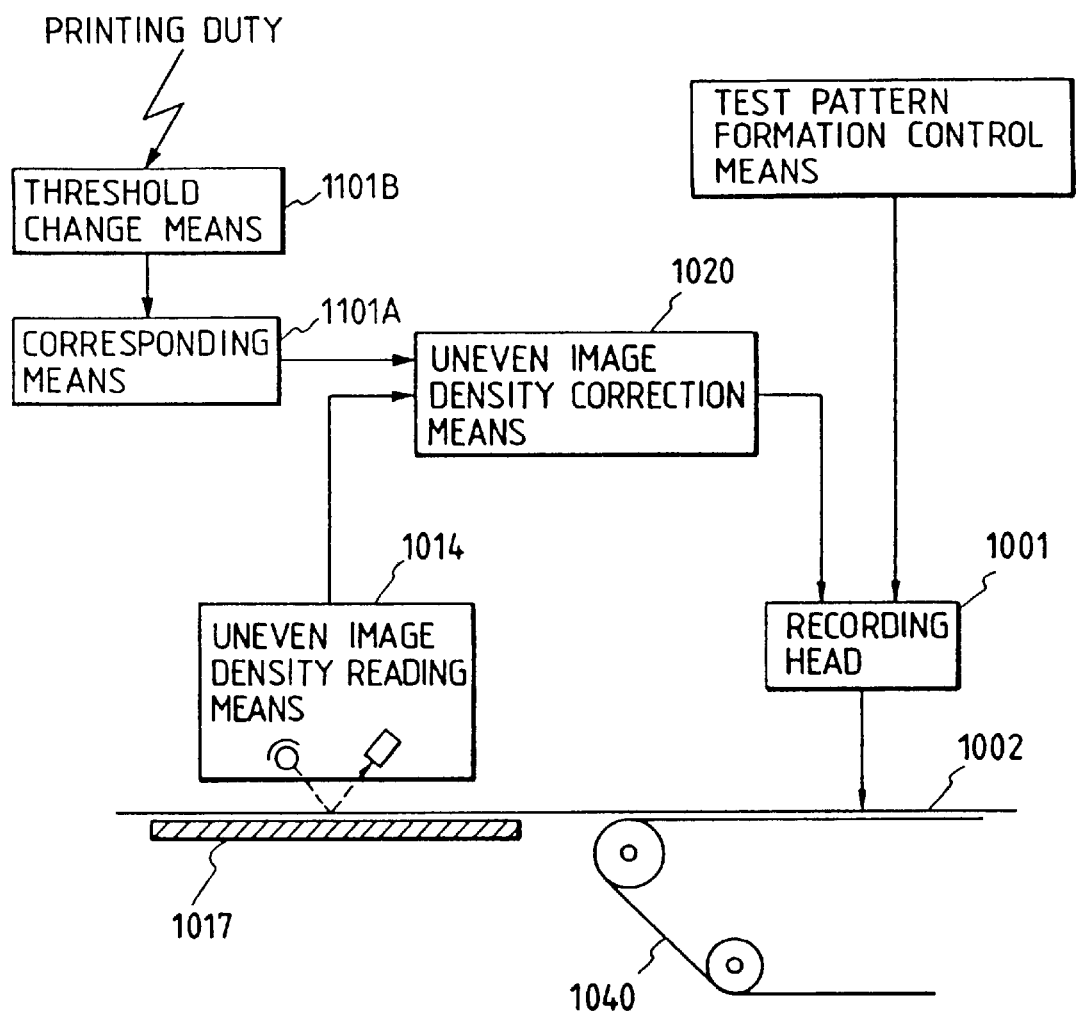
FIG. 11 is a diagram for explaining the principle of the first embodiment of the present invention.

FIG. 11 is a schematic view showing the main part of the first embodiment. One or a plurality of recording heads 1001 are arranged in accordance with the form of an image forming apparatus. Each recording head 1001 is a so-called full multi-type ink-jet recording head in which a plurality of orifices are aligned in a range corresponding to the width of a recording medium 1002. A convey means 1040 conveys the recording medium 1002 to a recording position of the recording head 1001.

An uneven image density reading means 1014 causes the recording head 1001 to read a test pattern formed on the recording medium 1002. The uneven image density reading means 1014 includes a light source for illuminating the surface of the recording medium, a sensor for receiving light reflected by the surface of the recording medium, and an appropriate converter. An uneven image density correction means 1020 corrects a recording head drive condition in accordance with the uneven image density read from the test pattern. A platen 1017 regulates the recording medium to be flat at the test pattern read position.

A corresponding means 1101A causes an end orifice of all the orifices to correspond to a point having a density reaching a predetermined threshold value and for producing correction data for injection energy generation elements located inside the orifices. A threshold change means 1101B changes the threshold value in accordance with a print duty of a test pattern. The corresponding means 1101A reads a test pattern to obtain its density distribution and causes the density distribution to correspond to the aligned orifices on the basis of a reference point at which the density of an end portion in the density distribution reaches the predetermined threshold value.

In this embodiment, a correction data producing function including these means is incorporated in the image forming apparatus itself. However, this function may be separately provided.

(2) General Description of Mechanical Structure of Apparatus

FIG. 12A shows a general structure of an ink-jet recording apparatus according to this embodiment of the present invention.

Recording heads 1C, 1M, 1Y, and 1BK correspond to cyan, magenta, yellow, and black inks, respectively. Each head is a full-line head having orifices at a density of 400 dpi (dots per inch) in a range corresponding to the width of the recording medium convey direction, e.g., the length of a short side of an A3 size recording medium. A head holder 3 holds the recording heads 1C to 1BK and can be moved in the A direction toward the recording position and the B direction away from the recording position by means of a head holder moving mechanism 5. The head holder moving mechanism 5 includes a driving source such as a motor, a transmission mechanism for transmitting a driving force to the head holder 3, and a guide member for guiding the head holder 3. The head holder 3 is moved in the appropriate A or B direction to the recording position at which the recording medium opposes the orifices of the recording heads 1C to 1BK with a gap, a retracted position for allowing reception of a cap unit (to be described later), or a position where each head is capped.

An ink supply/circulating system unit 7 includes supply paths for supplying color inks to the corresponding recording heads, circulating paths for performing ink refreshing, and an appropriate pump. At the time of injection recovery, the pump is driven to compress the ink supply path, thereby forcibly discharging the ink from each recording head.

A cap unit 9 opposes the recording heads 1C, 1M, 1Y, and 1BK can be brought into contact with them. The cap unit 9 includes caps 9C, 9M, 9Y, and 9BK made of an elastic material such as rubber, an absorbing member for absorbing an ink (waste ink) from the recording heads at the time of injection recovery, waste ink paths for receiving the waste inks to waste ink tanks (not shown). The cap unit 9 is moved by a cap unit moving mechanism 11. The cap unit moving mechanism 11 includes a motor, a transmission mechanism, and a guide member and moves the cap unit 9 in the C or D direction. Therefore, the cap unit 9 can be set to a position immediately below the head holder 3 located at the retracted position, and a position wherein downward movement of the head holder 3 is not interfered.

At the time of injection recovery, the head unit 3 is moved upward in the B direction to a position where entrance of the cap unit 9 is not interfered. The cap unit 9 is inserted into the formed space, and the cap unit 9 is set at a position where the corresponding head opposes the cap. In this state, a state wherein the orifice formation portion of the recording head opposes the cap with a small gap upon downward movement of the head holder 3, or a state wherein the orifice formation portion of the recording head is in contact with the cap, a pump or the like of the ink supply/circulating unit 7 is driven. The ink is forcibly discharged, and at the same time injection defect factors such as dust, bubbles, and a viscous ink are removed, thereby stabilizing the ink injection state during recording. The recording head may be driven as in the recording mode in the above state to inject an ink (i.e., preliminary injection), thereby eliminating injection defect factors. At the end of recording or upon its interruption, the heads may be capped to prevent the orifices from drying.

A cassette 38 stores recording media 2 such as OHP films. The recording media 2 stored in the cassette 38 are separated and fed one by one by a pickup roller 39 rotated in the F direction. A conveyor belt 40 conveys the fed recording medium 2 to the recording position of the recording heads 1C to 1BK in the E direction. The conveyor belt 40 is looped around rollers 41. In order to improve tight contact between the conveyor belt 40 and the recording medium and assure smooth conveyance of the recording medium, and at the same time to obtain an optimal distance (head gap) between the head and the recording medium, a means for performing electrostatic attraction or air suction, or a member such as a press roller for the recording medium may be provided.

The recording medium 2 is discharged by discharge rollers 42 upon completion of recording. A tray 43 stacks discharged recording media.

An uneven image density reading unit 14 is located between the recording position of the recording heads 1C to 1BK and the discharge rollers 42 so as to oppose a recording surface of the recording medium 2. The uneven image density reading unit 14 reads a pattern formed on the recording medium 2 during uneven image density correction. A mechanism 15 (to be described later with reference to FIG. 13) scans the reading unit 14. A driving unit 16 drives the respective convey members associated with the recording medium 2, i.e., the feed rollers 39, the rollers 41, and the discharge rollers 42.

At the time of uneven image density correction, a recording medium (a fixed size sheet in this embodiment) stored in the cassette 38 is fed out onto the conveyor belt 40 as in the normal recording mode upon rotation of the pickup roller 39 in the F direction. Upon rotation of the rollers 41, the recording medium 2 is conveyed together with the conveyor belt 40 in the E direction. At this time, each recording head is driven, and a test pattern is recorded on the recording medium 2.

Thereafter, the recording medium 2 to which this test pattern is recorded is conveyed to the uneven image density reading unit 14. The recorded test pattern is read by a reading sensor or the like, and then the recording medium is discharged onto the tray 43.

In this embodiment, since the fixed size sheet on which a test pattern is formed is used, an arrangement for feeding a sheet except for paper feed using the cassette 38 (so-called manual paper feed) in favor of better operability may be employed.

Figure 12B:
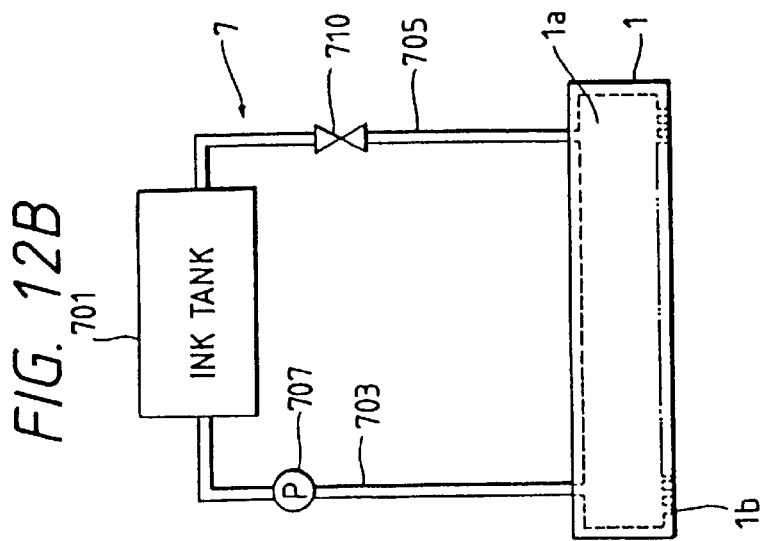

FIG. 12B illustrates an ink system comprising the recording head (the recording heads 1C, 1M, 1Y, and 1BK are collectively illustrated) 1, and an ink supply/circulating system unit 7.

In the recording head, a common liquid chamber 1a is connected to an ink pipe connected to an ink source and communicates with each ink orifice 1b through a liquid path. An injection energy generation element such as an electricity-heat conversion element is arranged in each liquid path, and an ink is injected from an orifice upon energization of the corresponding injection energy generation element.

An ink tank 701 serves as an ink source and is connected to the common liquid chamber 1a in the recording head 1 through ink paths 703 and 705. A pump 707 is arranged midway along the ink path 703, and a valve 710 is arranged midway along the ink path 705.

When the ink system is arranged as described above, when an operating state of the pump 707 and the open/closed state of the valve 710 are appropriately switched to set the ink system in each of the following modes.

① Print Mode

An ink necessary for recording is supplied from the ink tank 701 to the head 1. Since this embodiment exemplifies an on-demand ink-jet printer, an ink is not pressurized during recording, and the pump 56 is not driven. The valve 710 is open.

In this mode, the ink is supplied to the head 1 through the ink path 705 upon injection of the ink from the head 1.

② Circulation Mode

This mode is set when an ink is circulated to supply an ink to each head in initial use of the apparatus or when a bubble in the head or supply path is removed and at the same time the ink is refreshed. This mode is set after the ink-jet printer is left unused for a long period of time.

In this mode, since the valve 710 is open and the pump 707 is operated, the ink is circulated to the ink tank 701 through the ink tank 701, the ink path 703, the head 1, and the ink path 705.

③ Pressure Mode

When an ink inside the orifices of the head 1 has an increased viscosity or clogging occurs in the orifices or the liquid paths, the ink is pressurized to forcibly inject the ink from the orifices 1b, thereby removing the ink.

In this mode, the valve 710 is open and the pump 707 is operated. The ink is supplied to the recording head 1 from the ink tank 701 through the ink path 703.

(3) Reading System

Figure 13:
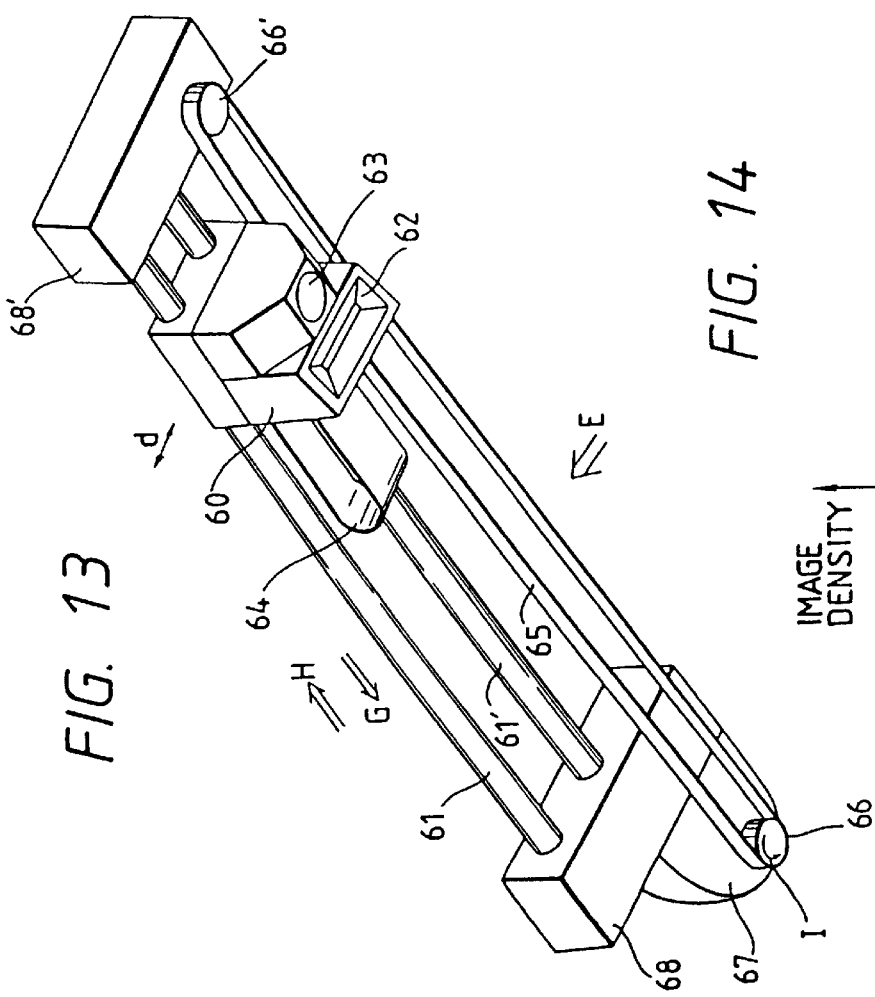
FIG. 13 is a perspective view showing an arrangement of a reading unit and its scanning mechanism shown in FIGS. 12A and 12B.

FIG. 13 shows the reading unit and its scanning mechanism according to this embodiment.

A flat recording medium guide portion serving as a platen (a portion denoted by reference numeral 17 in FIG. 12A) is disposed below a scanning portion of the reading head 60, the recording medium 2 is conveyed onto this guide portion, and an image formed on the recording medium is read by the reading head 60 at this position. The read position of the reading head 60 in FIG. 13 serves as the home position of the reading head 60. This home position is preferably a position laterally spaced apart from the recording medium convey range because reading members can get rid of attachment of water droplets caused by ink evaporation.

Referring to FIG. 13, the read head 60 is slid along a pair of guide rails 61 and 61' to read an image. The reading head 60 includes an original illumination light source 62, and a lens 63 for focusing an original image on a photoelectric conversion element group such as a CCD. A flexible cable 64 supplies a power to the light source 62 and the photoelectric conversion elements and transmits image signals from the photoelectric conversion elements. The sensor may be a single aperture type sensor for reading reflected light within a predetermined range, or may be a sensor having a reading element array such as a CCD. In the latter arrangement, a plurality of reading elements are caused to correspond to one orifice. An average value of outputs from the plurality of reading elements is caused to correspond to one orifice.

The reading head 60 is fixed to a driving force transmission portion 65 such as a wire in a main scanning (G and H directions) direction perpendicular to the recording medium convey direction. The driving force transmission portion 65 in the main scanning direction is looped between pulleys 66 and 66' and is moved upon rotation of a main scanning pulse motor 67. Upon rotation of the pulse motor 67 in the I direction, the reading head 60 is moved in the G direction and reads line information of an image perpendicular to the main scanning G direction.

When image reading is performed by a predetermined width, the main scanning pulse motor 67 is rotated in the reverse direction, and the reading head 60 is moved in the H direction to the initial or home position. Support members 68 and 68' are fixed to both ends of the pair of rails 61 and 61'.

When one main scanning cycle is to be performed for uneven image density reading, the reading operations are completed as described above. However, uneven image densities of a plurality of colors are to be read or when reading of one color is repeated a plurality of times and an average value is to be obtained, after main scanning G of a given color or one main scanning cycle is completed, the recording medium 2 is conveyed by the conveyor belt 40 or the discharge rollers 42 in the E direction by a predetermined distance (FIG. 12A) (one pitch between adjacent color patterns or the same distance d as the read image width in one main scanning G cycle). The recording medium 2 is then stopped. In this state, main scanning G is repeated. This main scanning G operation, the main scanning reverse H operation, movement of the recording medium (sub-scanning) are repeated to read the uneven image densities of different colors or one color a plurality of times. In the above operation, the reading unit may be sub-scanned instead of conveyance of the recording medium 2. When a sensor is a full-line sensor, a mechanism associated with main scanning can be eliminated.

An image signal thus obtained is supplied to an image forming unit and is used for correcting drive conditions of the recording heads (to be described later).

In the present invention, elimination of the uneven image density during image formation indicates at least one of the following effects. Image densities by liquid droplets from a plurality of orifices of the recording head can be uniformed by the corresponding recording head itself. Image densities in units of recording heads can be uniformed. A desired color can be obtained by mixing a plurality of ink colors, or a desired density can be obtained by mixing a plurality of ink colors. A plurality of these effects are preferably satisfied.

An unevenness correction means is preferably a means for automatically reading a standard print for obtaining a correction condition and automatically determining a correction condition. This means may include a fine adjustment unit or a manual adjustment unit operated by a user.

Correction conditions include optimal print conditions, a condition for adjusting a value to fall within a predetermined range including an allowable range, and a condition for a reference density changed in response to a desired condition. In fine, all conditions associated with correction are included in the above correction conditions.

Uneven image density correction of a multi-head having a recording element count N to converge print outputs from all elements into average density values will be described below.

Figure 14:
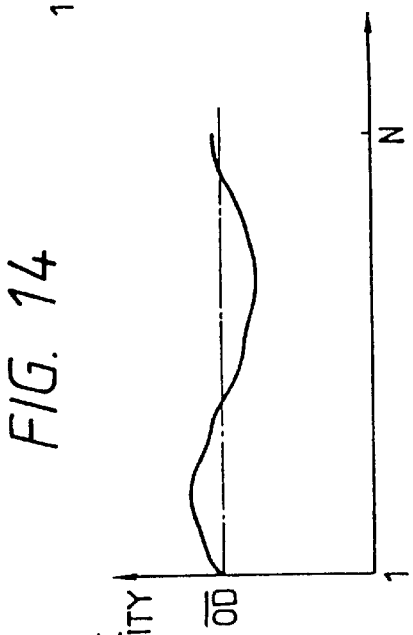
FIG. 14 is a graph for explaining a density correction mode in a multi-nozzle head.

Assume that a density distribution is obtained by driving and printing all the elements (1 to N) in accordance with a given uniform image signal S. as shown in FIG. 14. Partial densities $OD_1$ to $OD_N$ corresponding to all the recording elements are measured, and an average density as the correction target is obtained as follows:

$$\overline{OD} = \sum_{n=1}^{N} OD_n / N$$

This average density need not be obtained by simply averaging the densities of the all recording elements. For example, quantities of reflected light may be integrated and the integral values are averaged to obtain an average value, or another known method may be used to obtain an average value.

Figure 7:
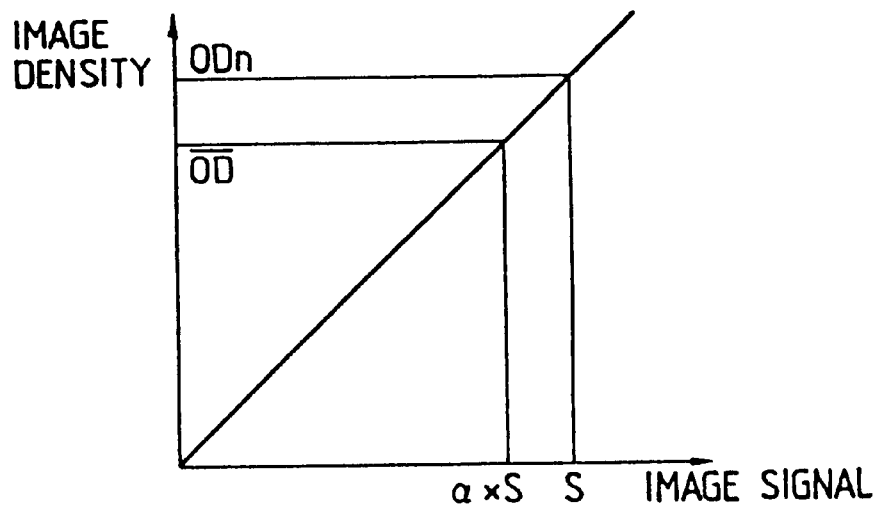
Figure 8:
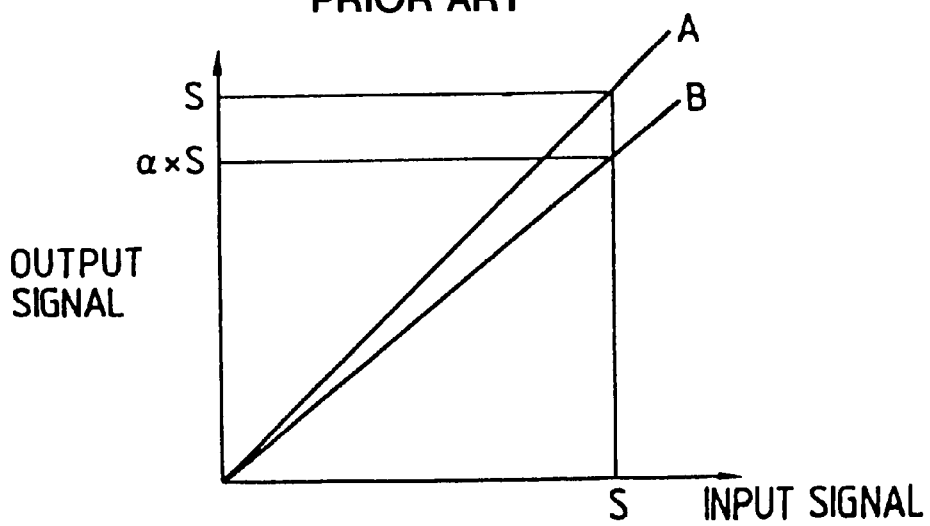
Figure 9:
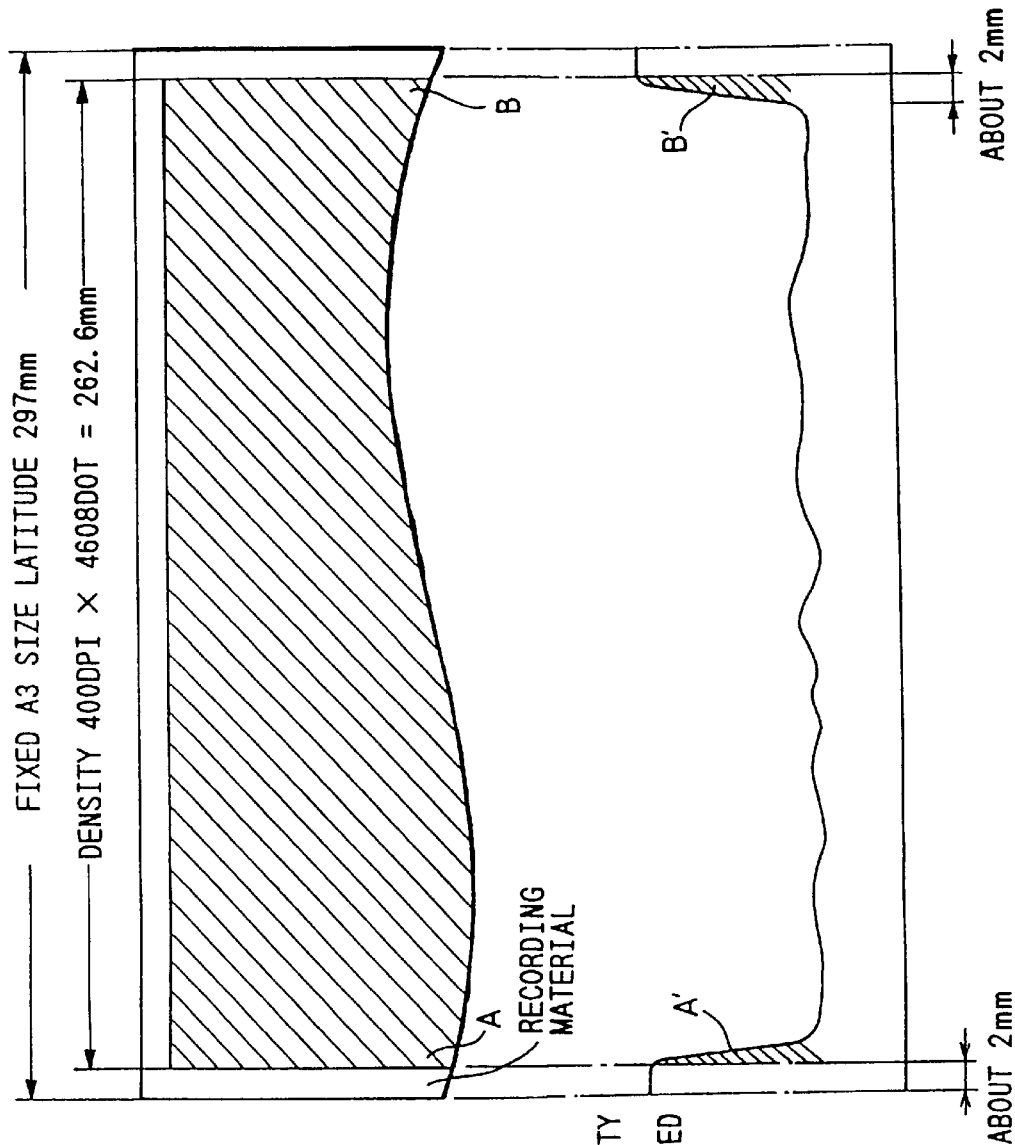
Figure 10:
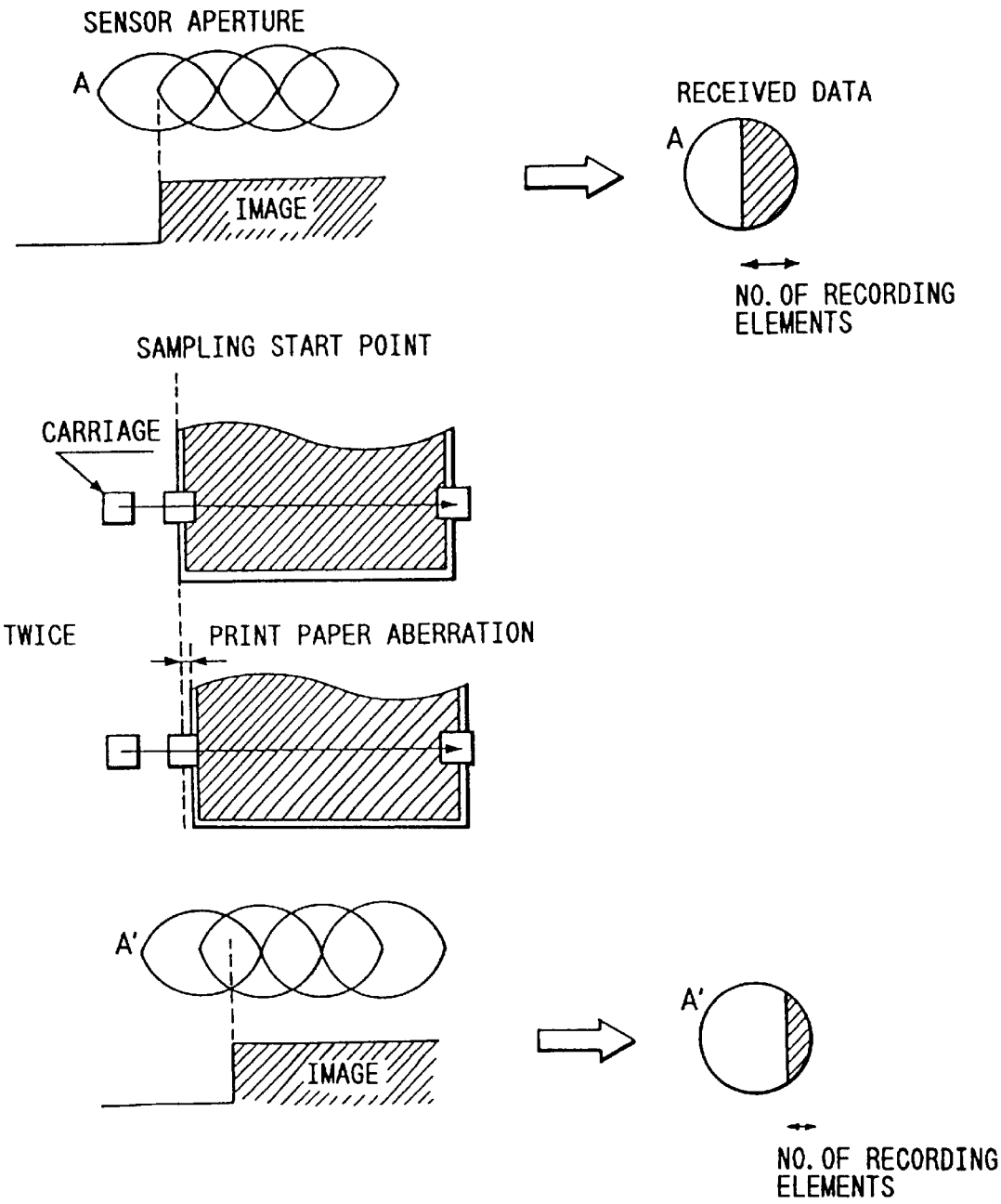

If a relationship between image signal values and an output density of a given element or a given element group is given as shown in FIG. 7, a signal actually supplied to this element or this element group is obtained by correcting the signal S to obtain a correction coefficient a for obtaining the target density $\overline{OD}$. A correction signal α·S obtained by correcting the signal S to α×S=($\overline{OD}/OD_n$)×S is supplied to the element n or the element group. More specifically, table conversion shown in FIG. 8 is performed for the input image signal in practice. Referring to FIG. 8, a straight line A is a line having a gradient of 1.0. This table is a table for performing no conversion of an input signal and directly outputting the input signal. A straight line B is a straight line having a gradient of α=$\overline{OD}/OD_n$. This table is a table for converting the input signal S into an output signal α·S. The table representing the straight line B in FIG. 8 is used for the image signal corresponding to the nth recording element, and table conversion having a correction coefficient $α_n$ is performed. Thereafter, when the head is driven, the densities of the portion recorded by the N recording elements are equal to $\overline{OD}$. This processing is performed for all the recording elements to correct the uneven image densities, thereby obtaining a uniform image. That is, when data representing a correspondence between a given table conversion coefficient and an image signal of each recording element is obtained, unevenness correction can be performed.

The above target correction for density comparison may be performed for each nozzle group (3 to 5 nozzles) to perform correction in accordance with approximation of unevenness correction.

Although the uneven image density can be corrected by the above method, unevenness in image density may occur due to a change in uneven image density state prior to correction or a time change in correction circuit. In order to cope with this situation, an input signal correction quantity must be changed since this is caused by the following drawbacks. When an ink-jet recording head is used for a long period of time, a precipitate from an ink is attached to a portion near an orifice, or an external foreign substance is attached thereto, thereby changing the density distribution. This can also be expected by a density distribution change caused by heater degradation and a change in properties thereof in a thermal head. In this case, the initial input correction quantities set during the manufacture cannot sufficiently perform uneven image density correction. An uneven image density is gradually increased during long-term use, so that this problem must be solved.

Although a distance between the reading unit and the recording medium on which the test pattern is recorded varies depending on reading precision, it is preferable to obtain a predetermined distance. In order to hold the distance to a predetermined value, an arrangement shown in FIGS. 15 to 17 can be employed.

Figure 15:
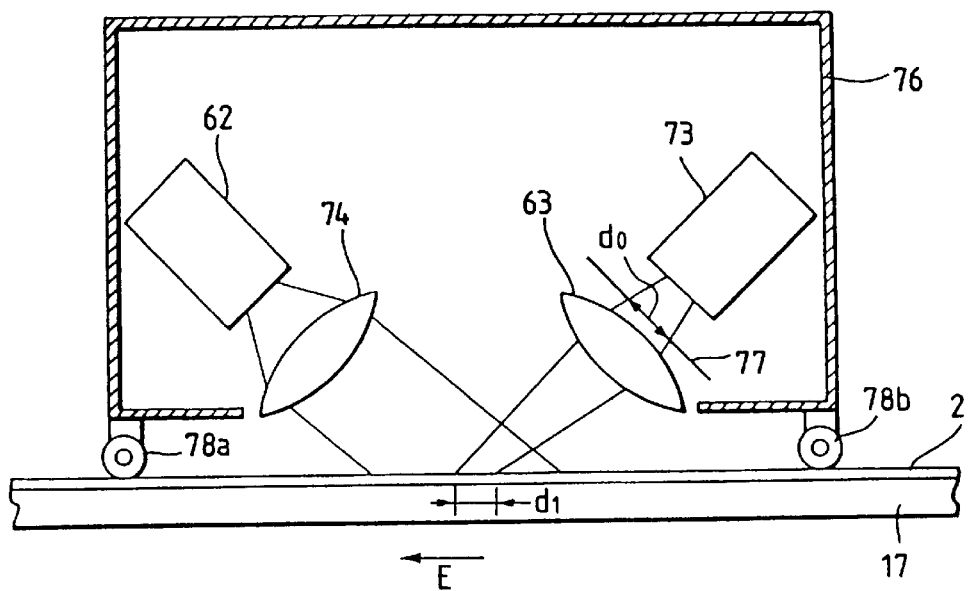
FIGS. 15 to 17 are side views showing arrangements each for keeping a distance between the reading unit and a recording medium.

FIG. 15 illustrates an arrangement for the above purpose. Press rollers 78a and 78b engaged with the recording medium 2 are mounted on a housing 76 for storing the reading unit 14 and the scanning mechanism 15 therein. Since these rollers 78a and 78b are rotated in the recording medium convey direction, no problem is posed in conveyance of the recording medium. This arrangement prevents floating of the recording medium 2, and the housing 76 is displaced in accordance with the recording medium 2, so that the distance between the reading unit 14 and the recording medium can be kept constant.

The arrangement in FIG. 15 includes a lens 74 for collimating light emitted from a light source 62, a sensor 73 having a photoelectric transducer element group, a lens 63 for focusing light reflected by the recording medium, and a filter 77 having an aperture having an aperture diameter $d_0$. By the scanning mechanism shown in FIG. 8, the lenses, the sensor, the light source, the filter, and the like are scanned in the G and H directions (vertical direction in FIG. 15) within the housing 76.

The light reflected by the recording medium is incident on the sensor 73 through the lens 3 and the filter 77 having the aperture diameter $d_0$. This incident light is light falling within a range $d_1$ on the test pattern. Therefore, an average value obtained by averaging the uneven image densities within this range is detected. According to experiments of the present inventors, a good result was obtained when the aperture diameter was about 0.2 to 1 mm. When unevenness correction is performed on the basis of the detection result, a uniform image can be obtained.

When the reading unit including a lens, a sensor, and a light source is vertically displaceable in FIG. 13 with respect to the scanning mechanism 15, rollers serving as press members may be mounted on the reading unit itself. In this case, when each roller has a caster structure, conveyance of the recording medium and movement of the reading unit can be smoothly performed. When reading is performed while the recording medium is kept moved, the scanning direction is inclined to read the recording medium with a small load.

Figure 16:
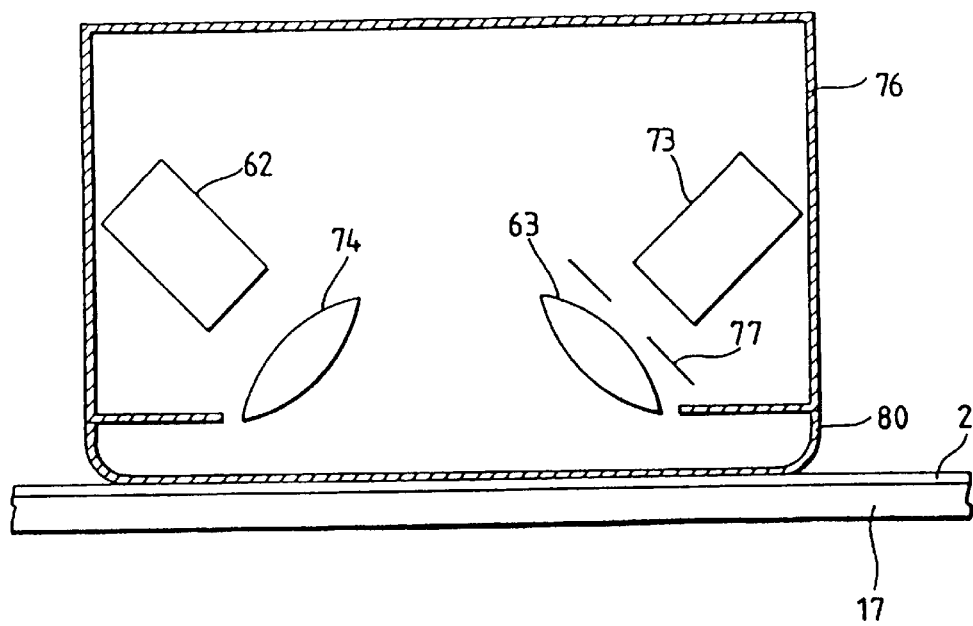

FIG. 16 shows another arrangement for keeping a distance between the reading unit and the recording medium constant. In this structure, a press member 80 made of a transparent plastic material is formed at the bottom of a housing 76.

In this structure, the housing 76 which stores the reading unit and the scanning mechanism is spaced apart from the platen 17 by about 10 mm. When the recording medium 2 on which a test pattern is recorded comes below the reading unit, the housing is moved downward to cause the transparent plastic pressure member 80 to hold the recording medium 2. The reading head 60 scans the recording medium 2 to detect an uneven image density. In this case, it is preferable that an image is completely fixed.

With this structure, paper floating can be prevented, and accurate reading can be performed. Contamination of a light source 62 and a sensor 73 can be prevented by the transparent plastic press member 80 which covers the lower portion of the housing.

Figure 17:
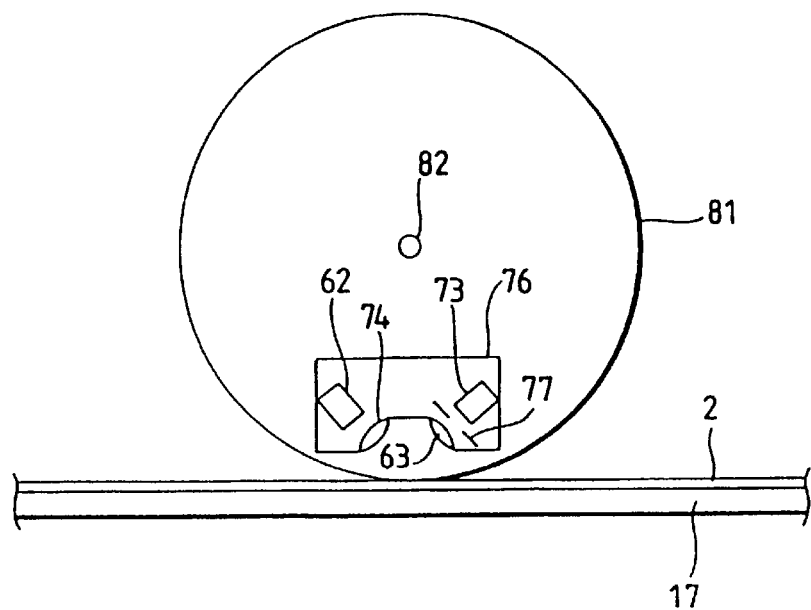

FIG. 17 shows still another arrangement for keeping a distance between the reading unit and the recording medium constant. Referring to FIG. 17, a housing 76 is vertically fixed but a cylindrical roller 81 made of a transparent plastic material is pivotal about a shaft 82. The recording medium 2 is pressed by the transparent cylindrical roller 81. An uneven image density can be read from the inside of the transparent cylindrical roller 81 while paper floating is prevented. In this structure, an uneven image density can be accurately detected.

In addition to the above arrangements, an apparatus main body has recording medium clamping means on the upstream and downstream sides, and the recording medium is read between the upstream and downstream clamping means, thereby performing high-precision reading.

When color image recording is to be performed using three colors, i.e., cyan (C), magenta (M), and yellow (Y), or four colors, i.e., the above colors and black (Bk), in order to rewrite unevenness correction data, correction test patterns must be recorded by the corresponding heads, uneven image densities must be read, and unevenness correction data for these heads must be rewritten.

Figure 18A:
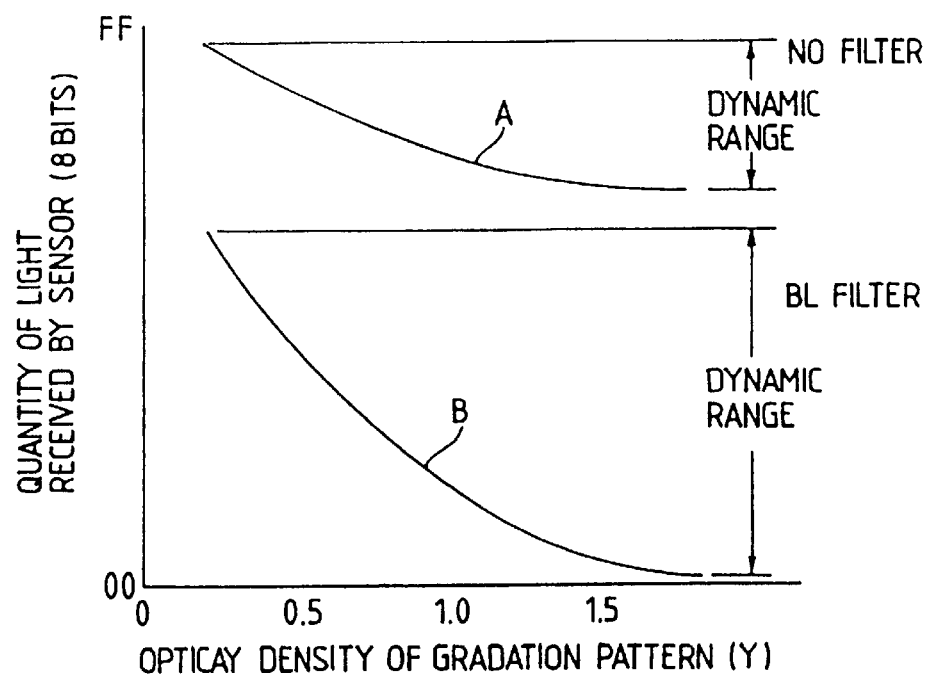
FIGS. 18A to 18C are views for explaining a mode for increasing a dynamic range of a sensor light reception quantity corresponding to each color.
Figure 18B:
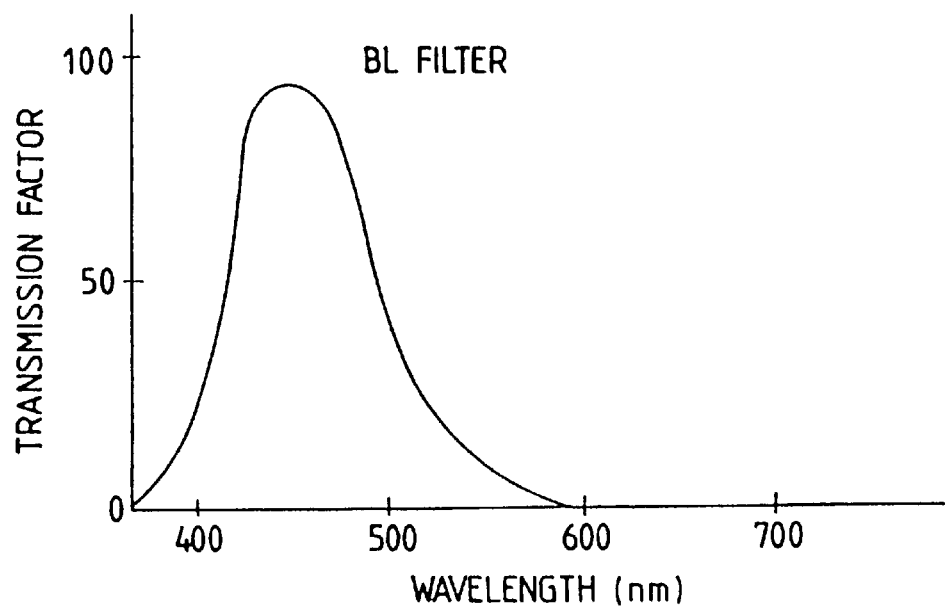

In unevenness reading of the C, M, and Y components, and particularly the Y component, when white color light is radiated on a Y test pattern, and light reflected by this test pattern is received without being through a filter, a quantity of light received by the sensor 73 has a narrow dynamic range as indicated by a curve A in FIG. 18A. In this case, it is difficult to accurately read unevenness (an optical density difference is as small as about 0.02 to 0.15). When light passing through a BL (blue) filter as shown in FIG. 18B is used, the quantity of light received by the sensor can be reduced, but the dynamic range is increased, as indicated by a curve B in FIG. 18A. In this case, unevenness reading precision can be increased. This can apply to the C and M components when R (red) and G (green) filters are used.

Figure 19:
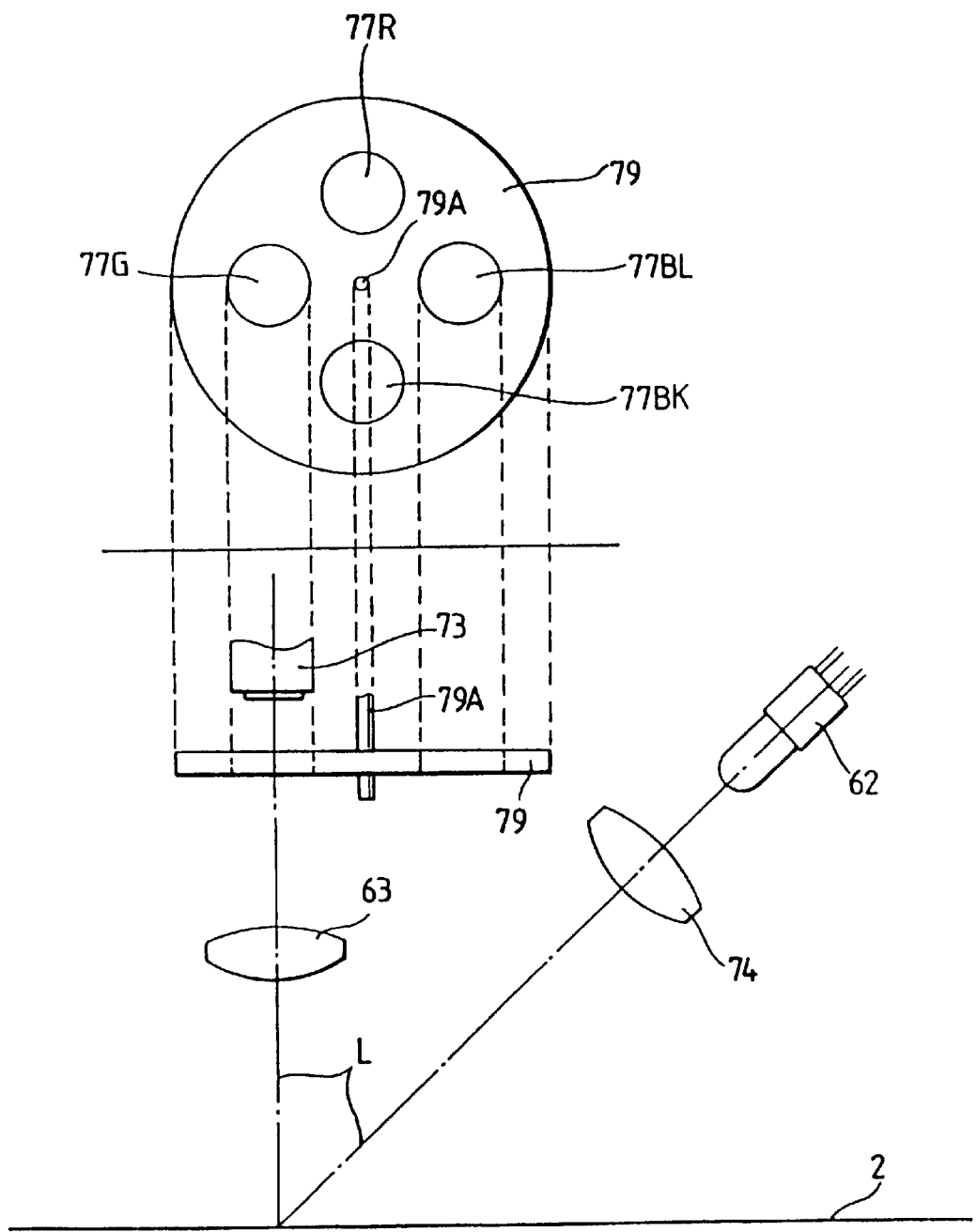
FIGS. 19 to 21 are views showing arrangements of a portion for reading an uneven image density of a test pattern in correspondence with its color.

FIG. 19 shows an arrangement for switching these color filters. A color filter switching portion 79 can be pivoted about a shaft 79A to properly and selectively locate an R filter 77R, a G filter 77G, a BL filter 77BL, or a BR aperture (no filter) 77BK on an optical path to the sensor 73 during reading of the test pattern of each color. The aperture or each filter has a diameter as in do described above.

Unevenness correction of each color can be accurately performed by using the single unevenness reading sensor 73 and the light source 62.

Figure 18C:
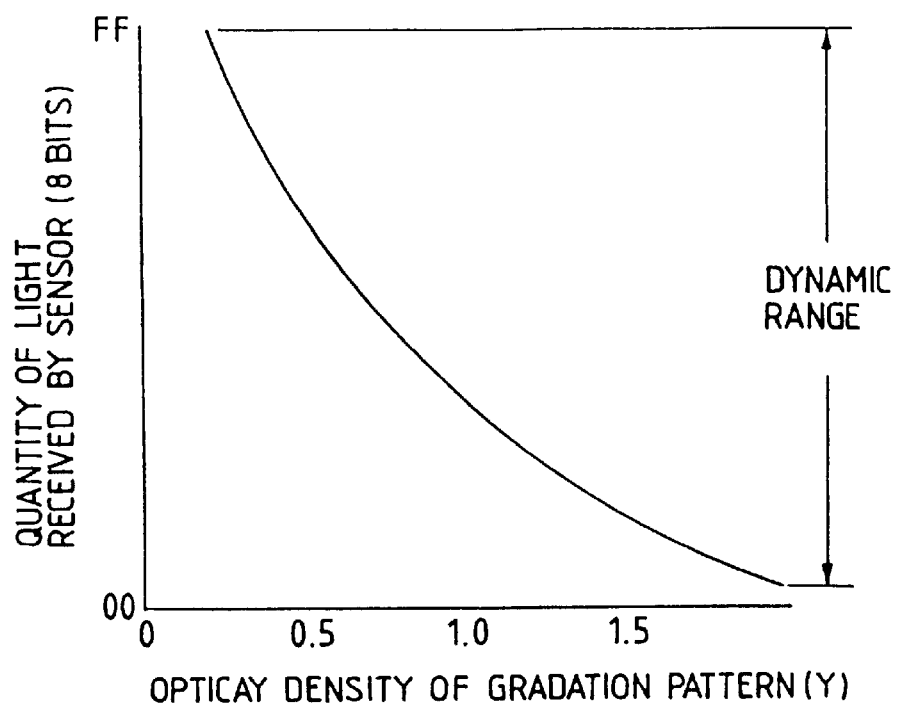

The positions of the filter are not limited to specific positions on the optical path L extending from the light source 62 to the sensor 73. In order to correct the quantity of received light whose magnitude is reduced by filtering through the filters, a quantity of light emitted from the lamp source can be increased to compensate for its decrease, thereby widening the dynamic range, as shown in FIG. 18C. In a manner to be described later, an appropriate constant may be multiplied or a signal may be amplified in accordance with a given color (to be described later).

In addition, light sources may be switched instead of switching the color filters described above.

Figure 20:
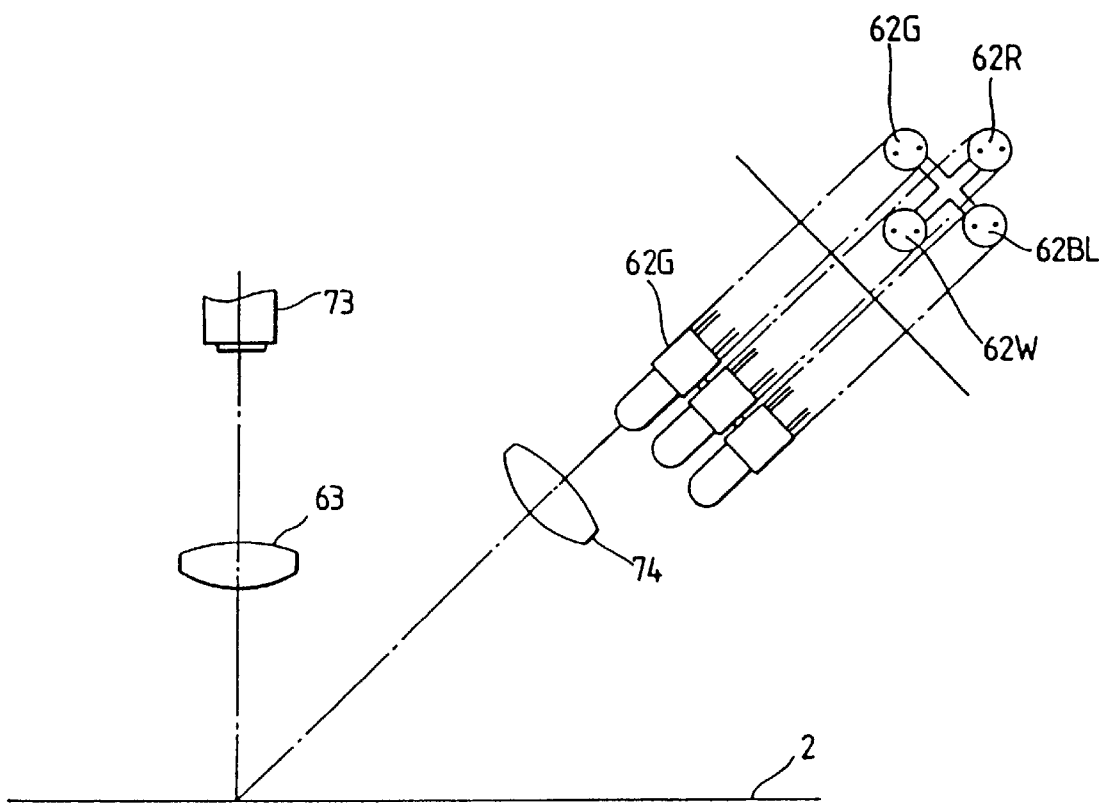

FIG. 20 shows an arrangement for switching between light sources. Four light sources 62R, 62G, 62BL and 62W having R, G, BL, and white spectral characteristics are switched as in the above arrangement, thereby obtaining the same effect as in the above arrangement.

A mechanism for preventing floating of the recording medium 2 and an arrangement for increasing the dynamic range in accordance with colors can be integrally formed.

Figure 21:
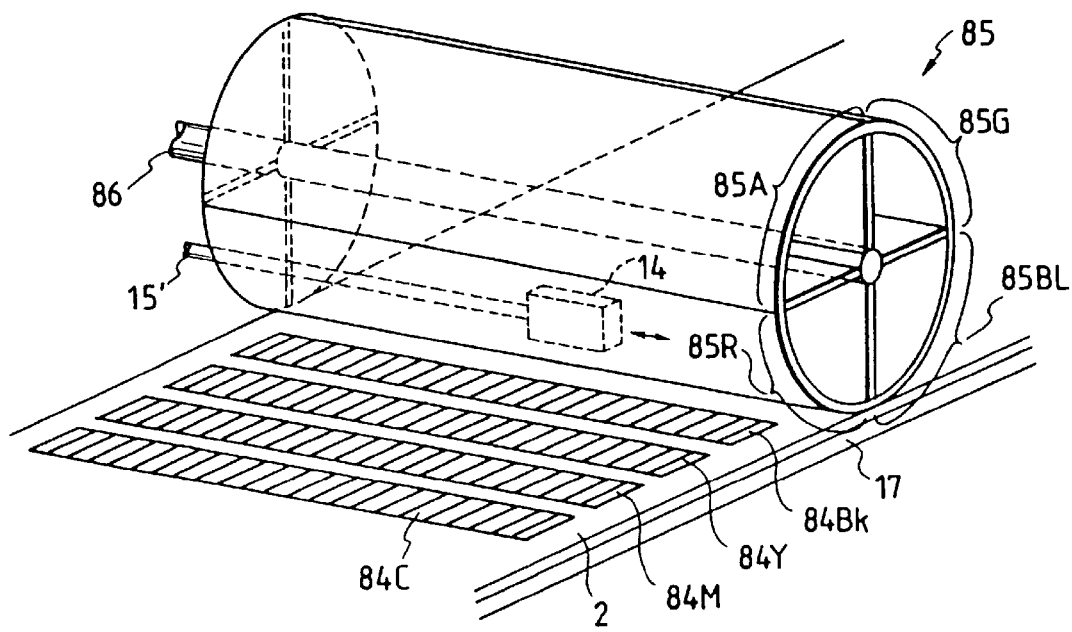

FIG. 21 shows an arrangement integrally having the mechanism for preventing floating of the recording medium 2 and the arrangement for increasing the dynamic range in accordance with colors. A transparent press roller 85 has four portions equally divided in its circumferential direction. These four portions consist of a transparent portion 85A, a red filter portion 85R, a green filter portion 85G, and a blue filter portion 85BL. A test pattern 84BK on the recording medium 2 is formed by the black head 1BK, a test pattern 84C is formed by the cyan head 1C, a test pattern 84M is formed by the magenta head 1M, and a test pattern 84Y is formed by the yellow head 1Y.

The reading unit 14 which can be inserted inside the transparent roller 85 is supported by a support rod 15'. The support rod 15' can be moved in directions indicated by a double-headed arrow.

When unevenness of the test pattern 84BK is to be read by the black head 1BK, the roller 85 is rotated. The unit 14 is inserted while the recording medium is held by the portion 85A. Simiarly, when the test pattern 84C of the cyan head 1C is to be read, the recording medium is held at the position corresponding to the portion 85R. When the test pattern 84M formed by the magenta head 1M is to be read, the recording medium is held at a position corresponding to the portion 85G. When the test pattern 84Y formed by the yellow head 1Y is to be read, the recording medium is held at a position corresponding to the portion 85BL.

In this arrangement, the uneven image densities of the color heads can be read through the filters with high precision, and at the same time paper floating can be prevented. Therefore, accurate reading can be performed.

Scanning of the reading head having the arrangement shown in FIG. 13 will be described below.

As described above, the recording medium on which a test pattern is recorded is conveyed to the reading unit 14 located to face the recording surface of the recording medium on the downstream side of the recording head with respect to the convey direction. Thereafter, the pulse motor 67 is driven, and the reading unit 14, i.e., the reading head 60 fixed to the driving force transmission portion 65 such as a wire or timing belt connected to the pulse motor 67 is scanned in the main scanning or G direction, thereby causing the reading sensor 73 to read the test pattern recorded on the recording medium 2.

In this embodiment, when the pulse motor 67 is to be driven by a control circuit (to be described later) to convey the reading unit 14, the pulse motor 67 is driven at a frequency different from a resonance frequency of the reading unit convey system.

Figure 22:
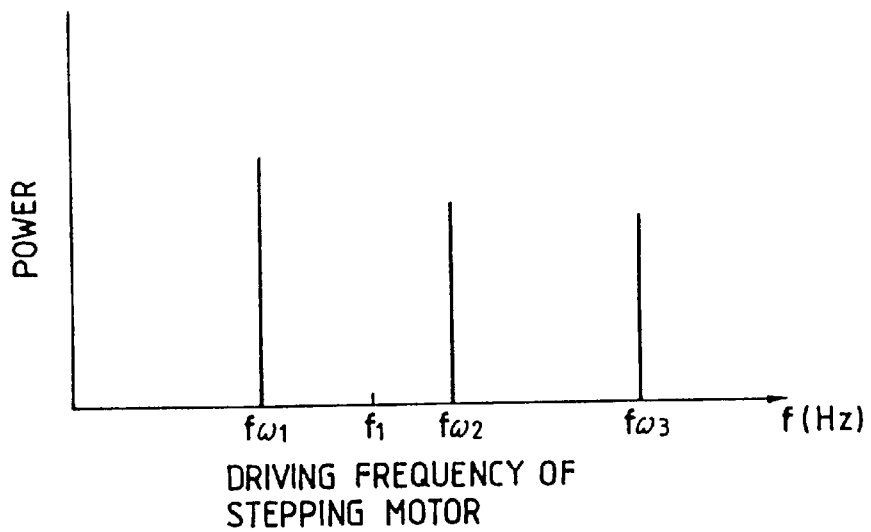
FIG. 22 is a view for explaining a scanning drive mode of the reading unit of this embodiment.
Figure 23A:
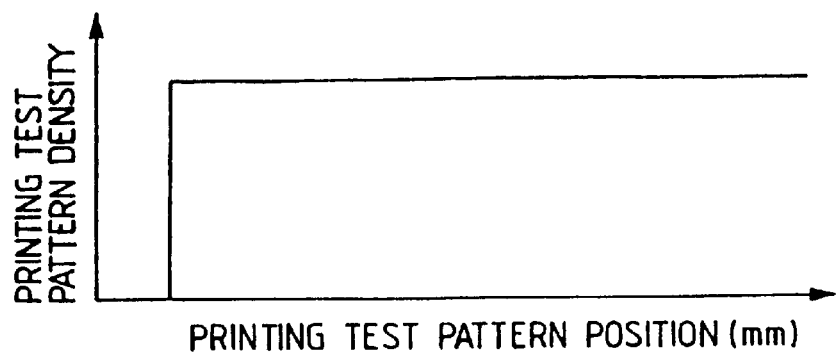
FIGS. 23A, 23B, and 23C are views for explaining variations in values read corresponding to variations in scanning rate of the reading unit.
Figure 23B:
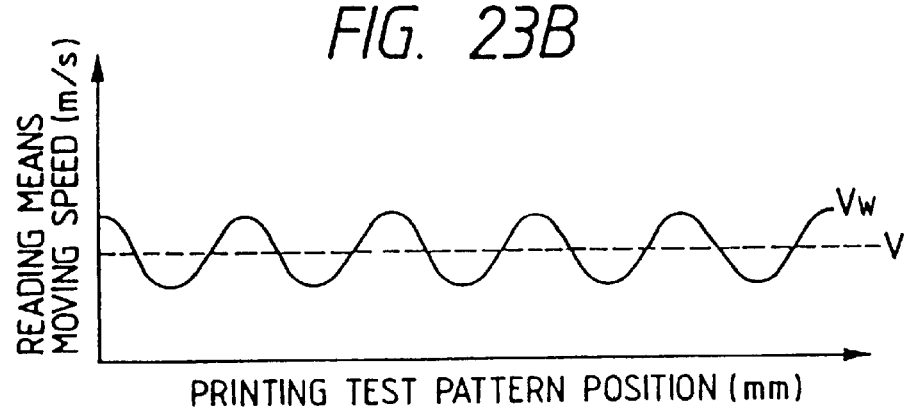
Figure 23C:
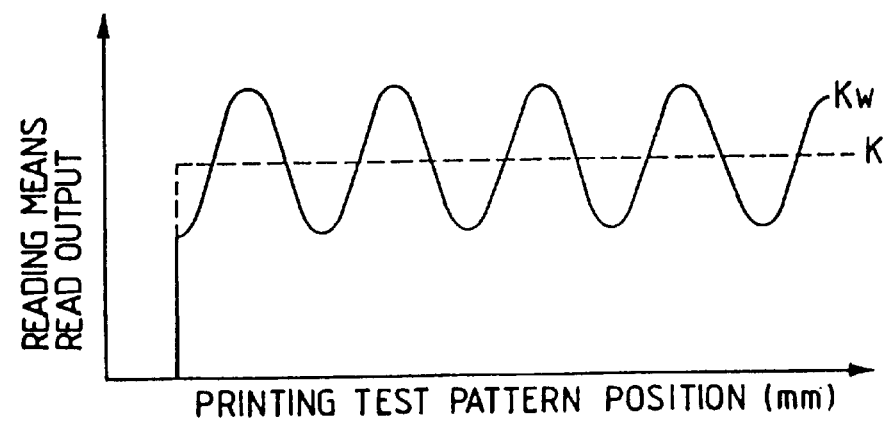

When the pulse motor 67 is driven to convey the reading unit convey system, vibrations of the reading unit convey system are increased at resonance frequencies $f\omega_1$, $f\omega_2$, $f\omega_3$, ..., as shown in FIG. 22. When the reading unit 14 is conveyed at resonance frequencies which cause large vibrations of the system, the following problem is posed. That is, as shown in FIG. 23A, even if the recording density of the test pattern recorded on the recording medium 2 is uniform, a convey speed Vω of the reading unit 14 may be changed, as shown in FIG. 23B. In this case, a read output from the reading unit 14 has output characteristics having a pitch error such as kω shown in FIG. 23C. As a result, a recording density of the test pattern recorded on the recording medium 2 cannot be accurately read.

In this embodiment, in order to eliminate this drawback, the reading unit 14 is driven at a frequency $f_1$ except for the resonance frequencies of the reading unit convey system. The test pattern is read at a predetermined read speed v, thereby accurately reading the test pattern recording density free from influences of vibrations of the convey system.

(4) Arrangement of Control System

A control system of this system by connecting the respective components described above will be described below.

FIG. 24 shows an arrangement of the control system. A host unit 33 supplies recording image data and various commands to the apparatus of this embodiment. The host unit H is a computer, an image reader or another arrangement. A CPU 101 serves as a main control unit of the apparatus of this embodiment. The CPU 101 has a form of a microcomputer and controls the respective circuit components in accordance with processing sequences (to be described later). A ROM 102 stores programs corresponding to the processing sequences and other permanent data. A RAM 104 has temporary storage areas of image data and work areas used in various control operations.

An indication input unit 106 includes an on-line switch for allowing the apparatus to communicate with the host unit H, inputs a recording start command, a command for recording a test pattern for uneven image density correction, and information representing a type of recording medium, and inputs and indicates a print duty (indication of a density to be concentratedly corrected, e.g., indication of a high density, an intermediate density, a highlighted region and a whole density area). Sensors 108 detects the presence/absence of the recording medium, its convey state, the presence/absence of an ink, and other operating states. A display unit 110 is used to display operating and setup states of the apparatus, and the presence/absence of an abnormal event. An image processing unit 111 performs logarithmic transformation, masking, UCR (Under Color Removal), color balance control of image data associated with recording.

A head driver 112 drives each ink injection energy generation element of the recording head 1 (the heads 1Y, 1M, 1C, and 1BY are collectively represented). A temperature adjustment unit 113 adjusts a temperature of the recording head 1. More specifically, the temperature adjustment unit 113 includes heating and cooling fans arranged in correspondence with the head 1. A driving unit 114 drives the color filter switching unit 79 described with reference to FIG. 19, and a driving unit 116 drives the respective motors for driving the recording medium convey system.

Figure 25:
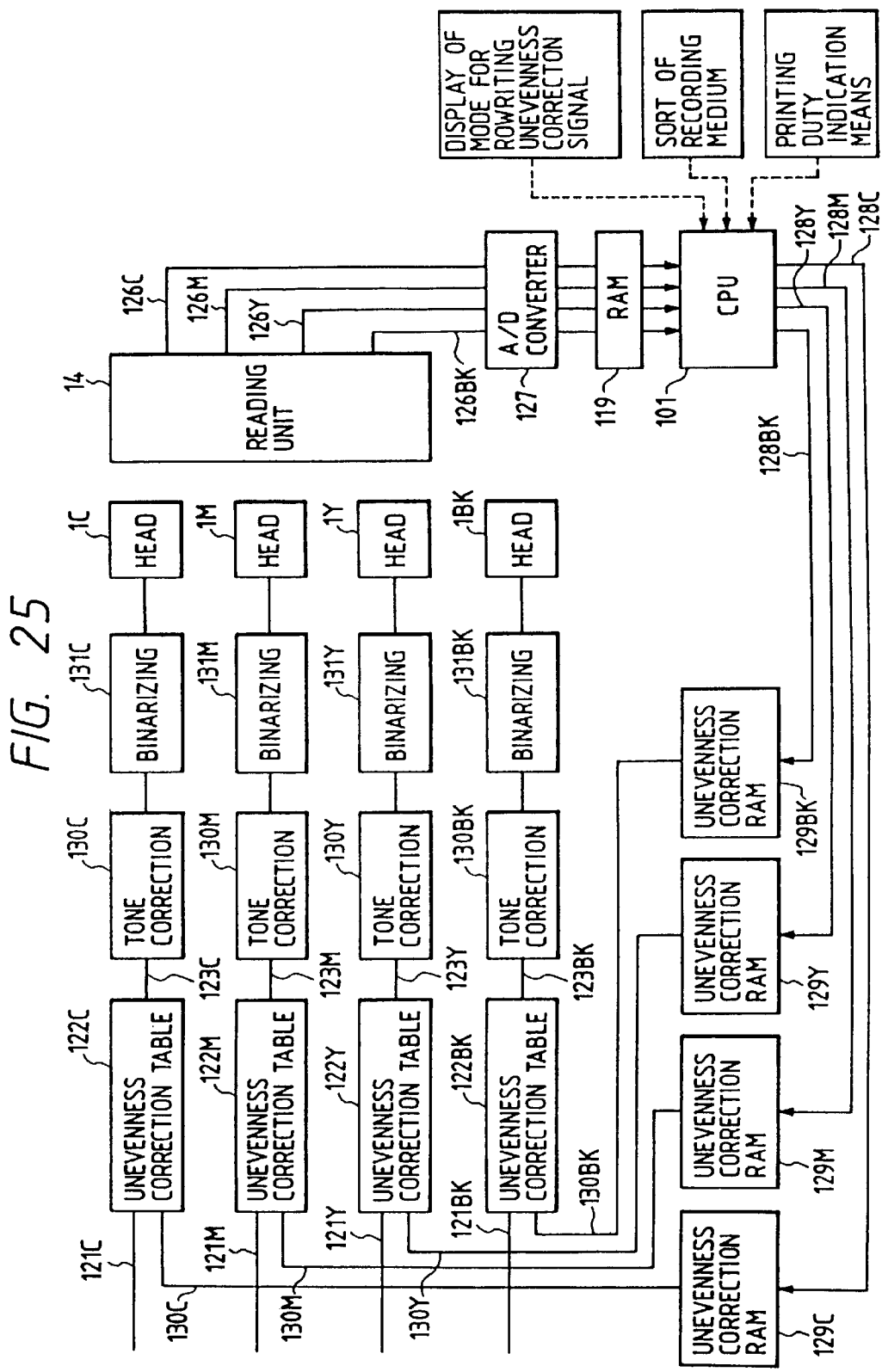
FIG. 25 is a block diagram showing a detailed arrangement for an uneven image density correction system.

FIG. 25 is a block diagram showing a detailed arrangement of the system for correcting the uneven image density in the arrangement shown in FIG. 24. The image processing unit 111 outputs cyan, magenta, yellow, and black image signals 121C, 121M, 121Y, and 121BK. Unevenness correction tables 122C, 122M, 122Y, and 122BK are arranged for the cyan, magenta, yellow, and black components, respectively. The unevenness correction tables 122C, 122M, 122Y, and 122BK can be stored in the area of the ROM 102 and output corrected image signals 123C, 123M, 123Y, and 123BK. Binarizing circuits 131C to 131BK use a dither method, an error diffusion method, or the like and supply binary signals to the color heads 1C to 1BK through drivers 112 (not shown in FIG. 25).

The reading unit 14 reads color signals 126C, 126M, 126Y, and 126BK through the respective color filter and the aperture shown in FIG. 19. These color signals are input to an A/D converter 127. An output from the A/D converter 127 is temporarily stored in a RAM area 119 which is an area of the RAM 104. The CPU 101 calculates corrected data 128C, 128M, 128Y, and 128BK on the basis of the stored signals. Unevenness correction RAMs 129C to 129BK are arranged for the cyan, magenta, yellow, and black components, respectively, and are constituted by the areas of the RAM 104. Corrected signals 130C to 130BK output from the unevenness correction RAMS 129C to 129BK are supplied to the unevenness correction tables 122C to 122BK. The image signals 121C to 121BK are converted to correct unevenness of the heads 1C to 1BK.

Figure 26:
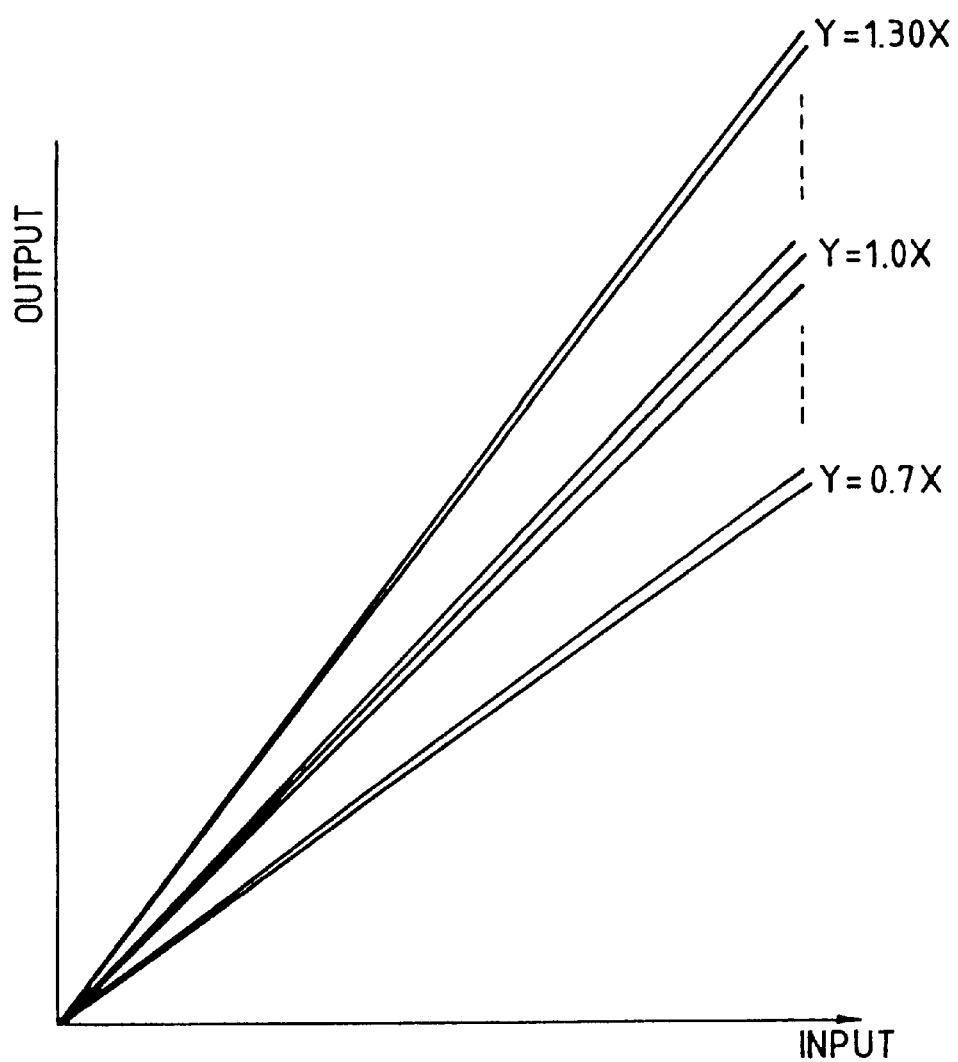
FIG. 26 is a graph for explaining an uneven image density correction table used in this embodiment.

FIG. 26 shows an unevenness correction table. In this arrangement, 61 straight correction lines having a gradient Y=0.70 X to Y=1.30 X in units of 0.01 are available. The correction straight lines are selectively used in accordance with the unevenness correction signals 130C to 130BK. For example, when a pixel signal representing recording using an orifice having a large dot diameter is input, a correction straight line having a small gradient is selected. However, a correction straight line having a large gradient is selected when an orifice having a small dot diameter is selected, thereby correcting the image signal.

The unevenness correction RAMs 129C to 129BK store selection signals of correction straight lines necessary for correcting unevenness of the heads. More specifically, correction signals, the number of which is equal to the number of orifices and each of which have 61 different values of "0" to "60", are stored in the unevenness correction RAMs 129C to 129BK. The unevenness correction RAMs 129C to 129BK output the unevenness correction signals 130C to 130BK in synchronism with input image signals. The signals 123C to 123BK whose unevenness is corrected by γ lines selected by the unevenness correction signals are input to gradation correction tables 130C to 130BK, respectively. The gradation characteristics of the input signals are corrected, and the resultant signals are output. These signals are binarized by the binarizing circuits 131C to 131BK. The binary signals drive the heads 1C to 1BK through head drivers, thereby forming a color image.

(5) Sequence of Unevenness Correction

The following processing with the above arrangement is performed to accurately perform unevenness correction.

By performing the unevenness correction processing, an injection energy generation element corresponding to an orifice for a high density portion of the head is set to have a lower driving energy (e.g., driving duty). However, an injection energy generation element corresponding to an orifice having a low density of the recording head is set to have a high driving energy. As a result, the uneven image density of the recording head can be corrected, and a uniform image can be obtained. When the uneven image density pattern of the head is changed during use, the present unevenness correction signal becomes inappropriate, so that unevenness occurs in the image. In this case, the correction signal rewriting mode indication switch arranged in the indication input unit 106 is operated to perform unevenness correction data rewriting, thereby starting the following sequence.

Figure 27:
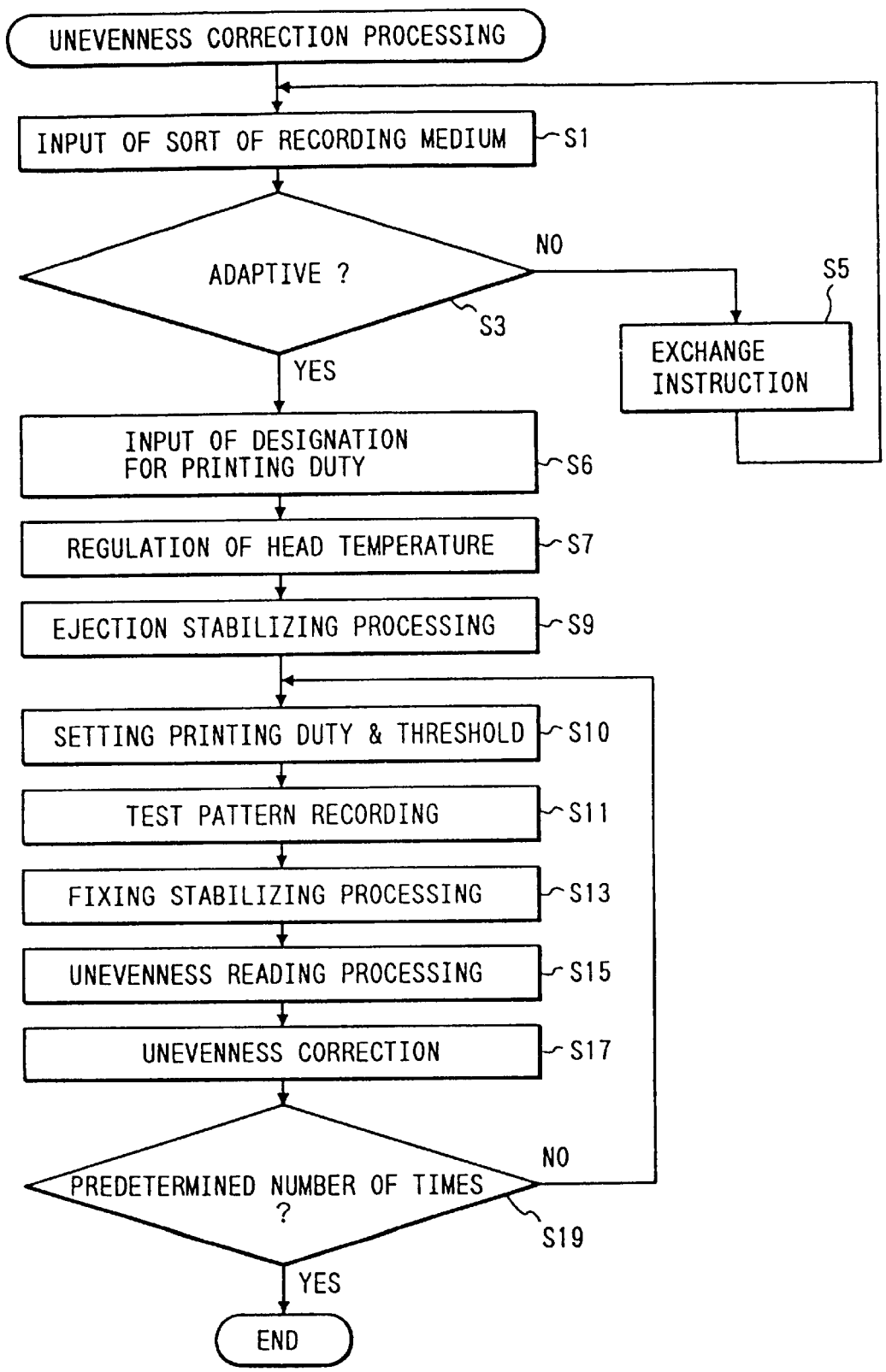
FIG. 27 is a flow chart showing an uneven image density correction sequence of this embodiment.

FIG. 27 shows an unevenness correction processing sequence of this embodiment.

When this sequence is started, an input representing a type of recording medium is accepted in step S1. A message of "Input the type of currently used recording sheet." is displayed on the display unit 110 of, e.g., a liquid crystal panel. The operator designates the type of currently used recording medium with a switch or the like arranged in the indication input unit 106 in accordance with this message. Determination is performed in step S3. When the type of input recording sheet is not a suitable sheet such as an OHP sheet and a sheet coated in a small amount which is not suitable for uneven image density detection, a message of "Use a specified sheet" is displayed on the display unit 110 in step S5. As a result, when the current sheet is replaced with the specified sheet and the designated type of sheet is input, or when the type of input recording medium is the designated one from the beginning, the following operation is performed.

In this embodiment, every time the unevenness correction data rewriting mode is set, the type of recording medium is input. It is then determined whether the unevenness correction data is rewritten in accordance with the input data. Information representing the type of recording medium often represents the medium already designated in the recording mode. Since color tones of recording outputs often vary depending on types of recording media, image processing factors such as masking coefficients are changed in accordance with the type of recording medium.

In a modification of this embodiment, the type of recording medium used in the normal recording mode is input. When the unevenness correction data rewriting mode is set, it is determined by the already input type of recording medium whether unevenness data rewriting is performed. For this reason, the type of recording medium need not be input this time.

In this embodiment, the recording medium must be designated upon depression of the switch. Still another modification of this embodiment need not perform depression of the switch.

Figure 28:
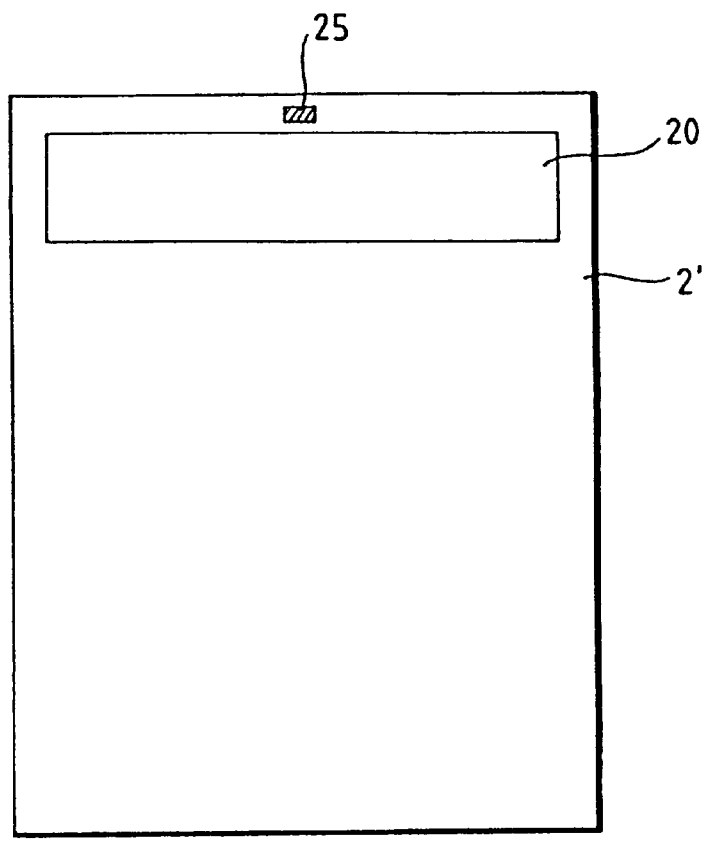
FIG. 28 is a view showing a state wherein an ID (identification) mark for performing uneven image density correction in accordance with types of recording media is formed on a recording medium.

FIG. 28 shows a recording medium 2' used for this purpose. An unevenness correction pattern 20 is recorded on the recording medium 2'. A recording medium identification mark 25 is formed in a leading end margin of the recording medium 2' to represent a density in accordance with the type of recording medium 2'. The identification mark 25 is read by the uneven image density reading unit 14 prior to reading prior to the unevenness correction pattern 20.

When the currently used sheet is determined as a specified or fixed sheet, the unevenness correction data is started to be rewritten. Otherwise, a message is displayed to change the currently used recording medium to a designated sheet, and an unevenness correction data rewriting operation is inhibited.

With the above technique, the type of recording medium need not be input.

In still another modification of this embodiment, the same effect as in use of the identification mark can be obtained even if any identification mark is not used. For this purpose, a sensor unit for detecting the type of recording medium is arranged in addition to the uneven image density reading unit 14. An arrangement of this additional sensor unit is almost the same as that in FIG. 19. An ultraviolet lamp is used as a lamp for this additional sensor unit, and a sensor has a sensitivity in an ultraviolet range. In this case, the type of recording medium is discriminated in accordance with the quantity of light reflected from a margin of the recording medium. In general, a coated sheet for ink-jet recording often contains a fluor to make the sheet color whiter. For this reason, when the ultraviolet lamp is used, the type of recording medium can be discriminated from light reflected by the coated sheet. That is, when the quantity of light reflected by a sheet is large, it is discriminated as a sheet having a thick coating layer. When the quantity of light reflected by a sheet is medium, it is discriminated as a sheet having a thin coating layer. When the quantity of light reflected by a sheet is almost zero, it is discriminated as an OHP film. When the quantity of reflected light is large and the sheet is determined as a designated sheet suitable for uneven image density detection, the uneven image density is read and the unevenness correction data is rewritten. Otherwise, the same message described above is displayed to inhibit uneven image density reading and unevenness correction data rewriting. Therefore, since the operator inputs the type of recording medium, the same effect as described above can be obtained without forming the identification mark.

Referring back to FIG. 27, when a recording medium is suitable for unevenness correction processing, the flow advances to step S6 to receive a print duty indication input. This indicates or designates a "high density", an "intermediate density", and a "low density" so as to receive a specific density to be corrected.

The flow advances to step S7 to perform temperature adjustment due to the following reason.

In an ink-jet recording apparatus, each recording head is maintained within a predetermined temperature range (e.g., about 40° C. as a first temperature adjustment standard) to generally suppress variations in image density and perform stable injection. When this sequence is started to record a test pattern, recording is performed at 40° C. serving as the first temperature adjustment standard of the recording head temperature, as indicated by a region a in FIG. 29. On the other hand, when continuous image recording is to be performed in practice, the head is heated, and recording is performed at a maximum temperature of 50° C. serving as a second temperature adjustment reference, as indicated by a region b in FIG. 29.

Figure 30A:
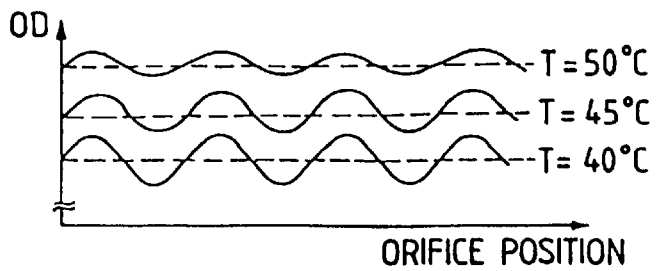
FIGS. 30A to 30C are views for explaining a mode for performing stable uneven image density correction without depending on temperatures.
Figure 30B:
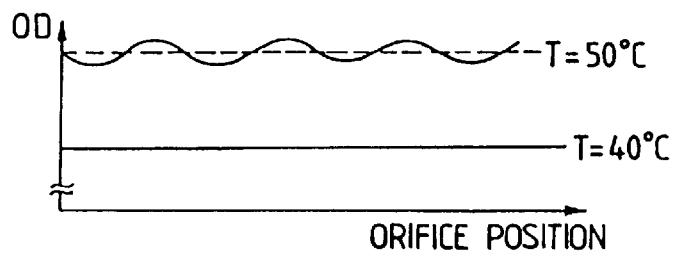

According to experimental results, as shown in FIG. 30A, it is known that a magnitude of a density (OD value) is changed in accordance with a change in temperature of the recording head. In this case, as shown in FIG. 30B, when unevenness correction at 40° C. is performed, a uniform image can be obtained at a head temperature of 40° C. However, unevenness is still left in an image formed at a head temperature of 50° C.

Figure 29:
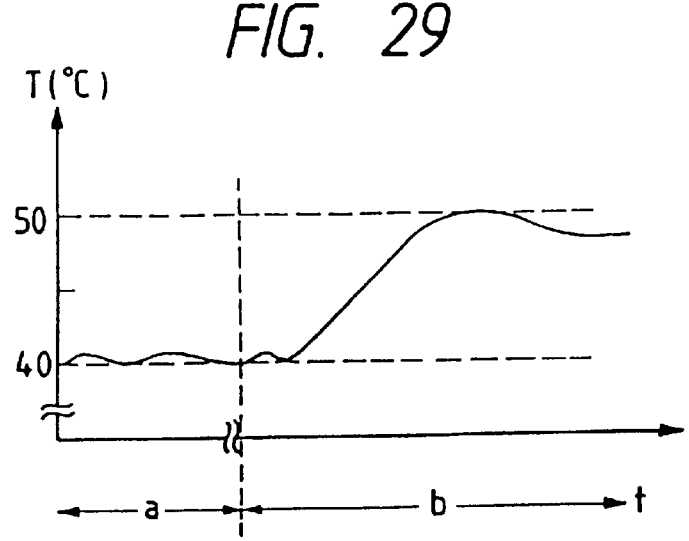
FIG. 29 is a graph for explaining a change in temperature of a recording head.
Figure 30C:
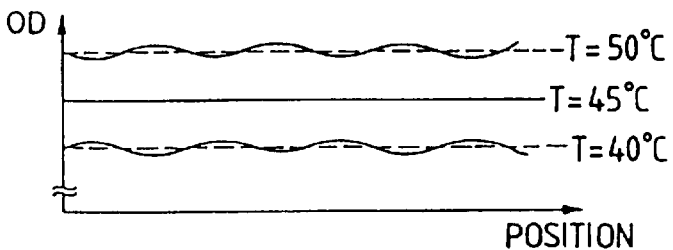

In the apparatus of this embodiment, the temperature adjustment unit 113 (heater and fan) are properly turned on/off in accordance with the temperature of the recording head 1 in the normal recording mode or a recording standby mode, thereby maintaining the recording head temperature within a predetermined temperature range (about 40° C.), as shown in FIG. 29. To the contrary, in uneven image density correction processing, a setup temperature is increased to 45° C. More specifically, the temperature adjustment standard in test pattern printing is set higher than the temperature adjustment standard of the normal recording mode. By appropriately turning on/off the heater and the fan, the head temperature is increased to about 45° C., and an uneven image density check test pattern is recorded, thereby performing uneven image density correction performed on the basis of the recorded test pattern. In this manner, recording of a recording head can be stably performed by temperature adjustment. That is, for example, a test pattern is formed at the head temperature of 45° C., and the uneven image density correction is performed on the basis of the test pattern, as shown in FIG. 30C, thereby performing almost uniform uneven image density correction.

In this embodiment, test patterns are printed at the head temperature of 40° C. as the first temperature adjustment standard and 50° C. as the maximum temperature (i.e., the second temperature adjustment standard), uneven image densities of these two test patterns are detected, and correction may be performed by an average value of the uneven image densities (i.e., first and second density data).

In order to shorten the total uneven image density correction time and increase the head temperature from, e.g., 40° C. to 45° C., an electrical pulse which does not allow ink injection may be applied to recording elements (electricity-heat conversion elements) in addition to the temperature adjustment heater to shorten a rise time of the head temperature, thereby shortening a predetermined period of time until uneven image density correction is started.

Alternatively, in order to record the following uneven image density correction test pattern, perform correction, and decrease the head temperature (45° C.–40° C.) to the normal recording state, the fan is driven and the ink circulation as previously described is performed to shorten a period of time required until a recordable state is set.

In addition, the adjustment temperature in the test pattern recording mode can be appropriately determined in association with the temperature adjustment range in the normal recording mode, as a matter of course.

Referring back to FIG. 27, an injection stabilizing operation is performed in step S9 due to the following reason. When a recording head does not have normal injection characteristics due to an increase in viscosity of an ink, and mixing of dust and bubbles, and when uneven image density correction processing is performed in this state, accurate head characteristics (i.e., faithful unevenness) cannot be recognized.

In injection stabilizing processing, the recording heads 1C to 1BK are set to oppose the cap unit 9, the pressure mode is set, and the ink is forcibly discharged from orifices. Orifice surfaces can be cleaned by bringing the ink absorbing member arranged in the cap unit into contact with the orifices or by air blowing or wiping the orifice surfaces. The recording head can be driven in the same manner as in the normal recording mode to perform preliminary injection. Note that driving energy at the time of preliminary injection is not necessarily equal to that in the recording mode. That is, the same operation as in a so-called injection recovery operation in the ink-jet recording apparatus may be performed.

In place of the above operations or after it, an injection stabilizing pattern may be recorded on a recording medium. Thereafter, a test pattern for uneven image density correction may be recorded.

Figure 31:
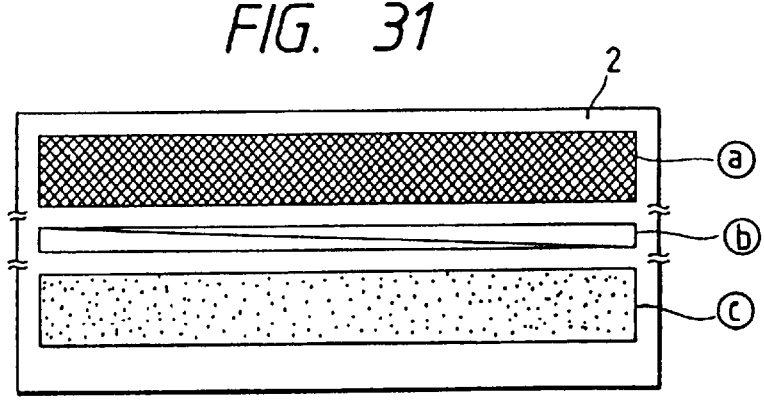
FIG. 31 is a view showing a case wherein an injection stabilizing pattern, an injection defect detection pattern, and an uneven image density correction test pattern are formed on a recording medium.

FIG. 31 shows recording of these patterns. A pattern (a) is an injection stabilizing pattern, a pattern (b) is a test image pattern for testing the presence/absence of non-injection (this pattern is formed by sequentially driving orifices while a recording medium is being fed in FIG. 31), and a pattern (c) is a test pattern for detecting an uneven image density. The injection stabilizing pattern is obtained by driving all the orifices of all the recording heads, i.e., a 100% duty. By recording this injection stabilizing pattern, the head temperature is stabilized, the ink supply system is set in a steady stater conditions for normal recording are given, and the presence/absence of injection errors or orifice defects during actual printing and the uneven image density can be accurately detected.

In an apparatus having the full multi-recording head 1 and a regist adjustment such that a maximum recording width is slightly larger and an image recording width, the recording width of the test pattern during recording is preferably larger than the normal image recording width. Assume that a maximum sheet size is an A3 size, that a maximum recording sheet size is about 293 mm determined by considering right and left margins with respect to 297 mm, i.e., the short side of the A3 size or the long side of an A4 size, and that a maximum recording width of the recording head is 295 mm. The orifice array range is electrically adjusted, and positional errors between the mechanical heads and between the recording media are corrected. In this case, a test of the width of 295 mm as the orifice array range, and a test pattern having a length of 295 mn is recorded.

Figure 32:
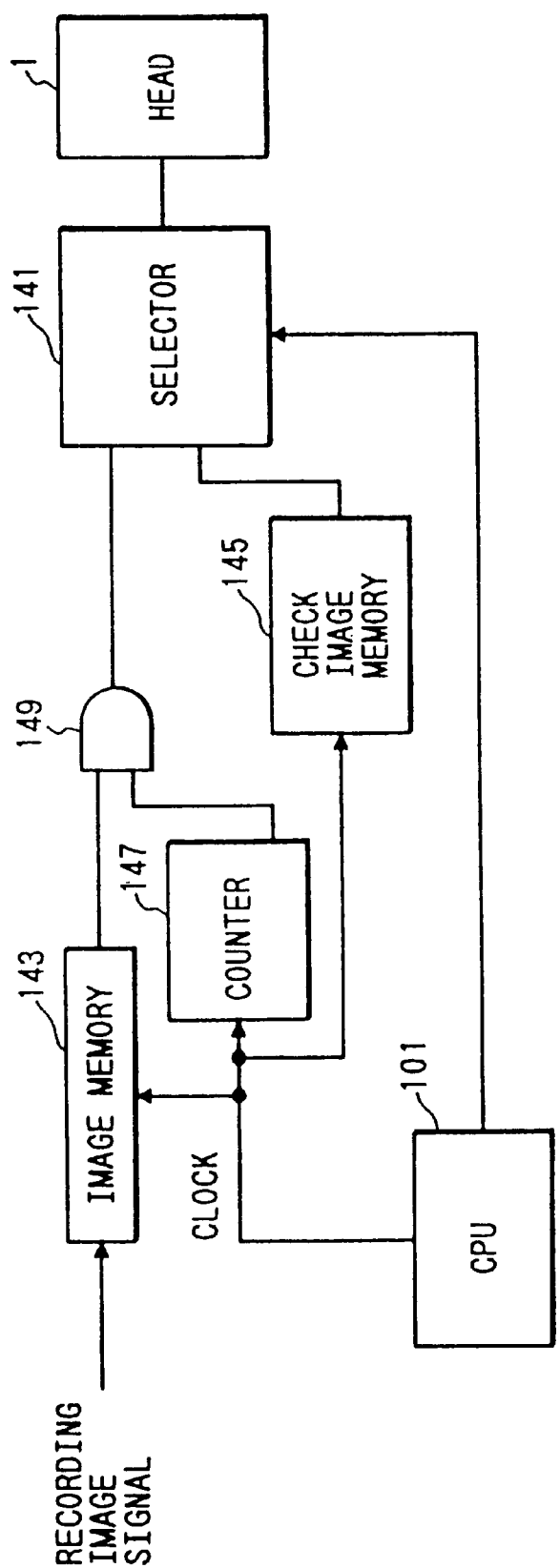
FIG. 32 is a block diagram showing an arrangement of a main part of a control system for performing uneven image density correction for all the orifices of a recording head of a full multi-type recording head of this embodiment.

FIG. 32 is a block diagram showing an arrangement of a circuit for performing the above operation. A selector 141 selects data to be supplied to the recording head in accordance with image data to be recorded and test pattern data. Memories 143 and 145 store the image data to be recorded and test pattern data, respectively. A counter 147 is arranged to cause an AND gate 149 to select an actual orifice array range in actual recording. In the above arrangement, the AND gate 149 outputs image data corresponding to 293 mm in actual recording to the selector 141. In the test pattern recording mode, the test pattern data corresponding to 295 mm is output from the test image memory 145 to the selector 141. Therefore, a test can be performed using a test pattern having a length of 295 mm.

When the above injection stabilizing processing is completed, and indication or designation of a print duty is performed in step S10 (if the "high density", the "intermediate density", and the "low density" are set, they are set to be 75%, 50%, and 30%, respectively). A threshold value for setting a position serving as a reference position of an end orifice of the recording head 1 is set (e.g., ½ the read density). For example, if a read density of a uniform halftone having a duty of, e.g., 50% is about 0.78 for black, the threshold value is ½ the read density, i.e., 0.39. However, the threshold value need not be limited to ½ the read density. For example, when a reflection density of the recording medium itself is relatively high, the threshold value is preferably set to be ½ the sum of the reflection density and a color read density.

Predetermined test patterns (to be described later with reference to FIG. 37) are recorded by the recording heads 1C to 1BK in step S11, and uneven image densities are read from these test patterns. In this embodiment, an operation for test pattern recording and reading cycle will be described with reference to a timing chart in FIG. 33.

Figure 33:
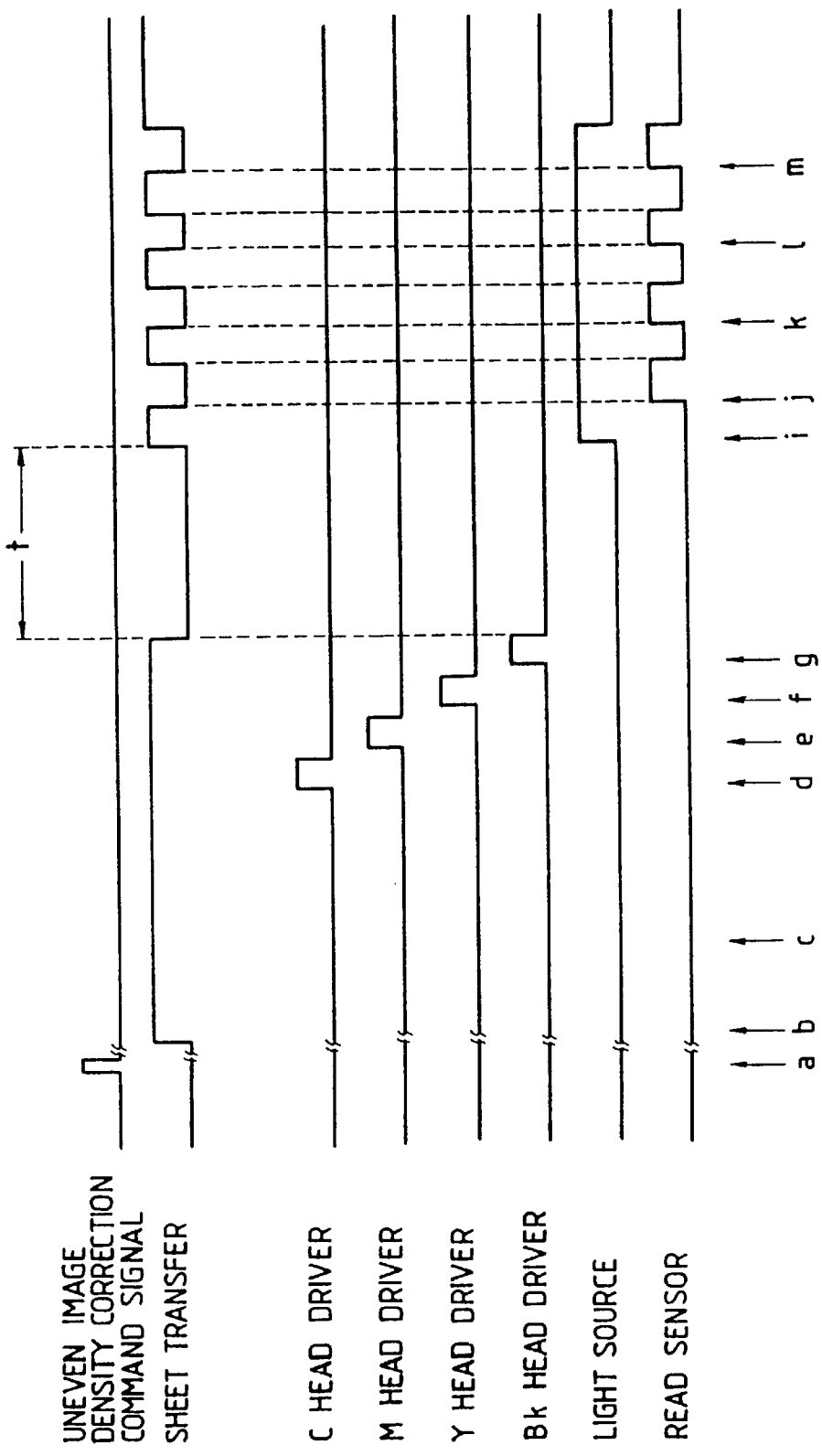

FIG. 33 is a timing chart showing an operation of the apparatus of this embodiment. An uneven image density correction sequence is started at a timing a in FIG. 33. After the above processing is completed, when the recording medium 2 is conveyed to the image forming area at a timing b, the main scan motor is driven at a timing c. Drivers for the cyan, magenta, yellow, and black recording heads 1C, 1M, 1Y, and 1BK are driven at timings d, e, f, g. In steps S11, S21, and S31 of FIG. 27, test patterns are recorded on the recording medium 2. This test pattern is used to read an uneven image density. In this case, the unevenness correction tables represent straight lines having a gradient of 1.0, and a state in which unevenness correction is not performed is set. Test patterns are uniform halftone patterns and appropriate print ratios can be set.

When the test patterns are to be recorded on the recording medium 2 by the corresponding recording heads, an ink cannot be instantaneously absorbed from each recording head to a recording medium, depending on the types of recording media. An uneven image density of the test pattern recorded on the recording medium is not immediately stabilized.

In this embodiment, in order not to cause the uneven image density reading unit 14 to read the uneven image density of the test pattern until the uneven image density state of the test pattern recorded by each recording head is stabilized, a recording sheet is not fed and is kept stopped for a predetermined period of time t after recording of the test pattern by the recording head is completed (step S13 in FIG. 27). After the uneven image density state of the test pattern is stabilized, the recording sheet is conveyed at a timing i. When the C pattern reaches the reading apparatus, feeding of the recording medium is stopped. The reading sensor 17 is driven at a timing j, and the uneven image density of the C test pattern is read by the reading unit 14. Thereafter, the uneven image densities of the M, Y, and BK color components are read at timings k, l, and m, respectively (step S15 in FIG. 27).

According to an experiment conducted by the present inventors, when a test pattern was recorded on an ink-jet recording coated sheet by a recording head having a resolution of 400 dpi at a print ratio of 50%, the recording sheet stop time was as short as about 3 to 10 seconds.

FIG. 34 is a timing chart showing another operation of the apparatus of this embodiment. In this operation, when recording of a test pattern by a recording head is completed (time g') at a convey speed $v_1$ of conveying the recording medium to the recording position, and then the recording medium is to be fed to the uneven image density reading unit 14, the paper feed speed is reduced to satisfy condition $v_1 > v_2$. The same effect as in FIG. 33 is obtained.

After fixing stabilization described above is completed, uneven image density reading processing is performed in step S15 in FIG. 27. The unevenness values of the test patterns of the respective colors are read, and unevenness correction data for the heads are calculated (step S17).

In this embodiment, although the reading sensor 73 is a single unit, sensor read outputs generally charge in units of colors. For example, when a sensor having spectral characteristics close to a luminosity factor is used, the BK component has the maximum output density, and the output densities are reduced in an order of C, M, and Y. For example, an output ratio of BK:C:M:Y is given as 1:0.8:0.75:0.25.

An uneven image density correction quantity is obtained by a ratio of an intrahead average density and a density of an orifice of interest, output differences do not pose any problem. Assume that an output for C is $K_1$ times the output for BK. An average density of the head 1BK is defined as $OD_{BK}$, a density of an orifice of interest in the head 1C is defined as $OD_{BKn}$, an average density of the head 1C is $OD_c$, and a density of an orifice of interest in the head 1C is defined as $OD_{cn}$. If unevenness of the orifice of interest in the head 1BK is equal to that of the head 1C, sensor outputs $\overline{OD_c} = K_1 \times \overline{OD_{BK}}$ and $OD_{cn} = K_1 \times OD_{BKn}$. In this case, a correction value for the C component is equal to that of the BK component as follows:

$$\frac{\overline{OD_c}}{OD_{cn}} = \frac{K_1 \times \overline{OD_{BK}}}{K_1 \times OD_{BKn}} = \frac{\overline{OD_{BK}}}{OD_{BKn}}$$

For this reason, output differences between the color components do not pose any problem.

When an uneven image density correction value is obtained from an absolute value of a density of an orifice of interest and a difference between an average density and the density of the orifice of interest, sensor output differences between the color components pose a decisive problem.

For example, when a correction value is to be obtained from a difference between an average density and a density of an orifice of interest, the following relation is established:

$$\overline{OD_c} - OD_{cn} = K_1(\overline{OD_{BK}} - OD_{BKn})$$

This value for the C component is $K_1$ times that of the BK component. Correction data for the orifice of interest is obtained on the basis of the above value. Although the uneven image densities of the heads are equal to each other, the final correction value for the BK component is different from that of the C component.

In this embodiment, a ratio of sensor outputs of the respective colors is obtained. At the time of unevenness reading, the CPU 101 multiplies the sensor outputs with a reciprocal value of this ratio. Unevenness correction is then performed on the basis of the calculated products.

If an output ratio of BK:C:M:Y is given as $1:K_1:K_2:K_3$, an output obtained upon reading of the BK component is multiplied with 1, an output obtained upon reading of the C component is multiplied with $1/K_1$, an output obtained upon reading of the M component is multiplied with $1/K_2$, and an output obtained upon reading of the Y component is multiplied with $1/K_3$.

With the above technique, the following relation is obtained:

$$1/K_1 \times (\overline{OD_c} - OD_{cn}) = 1/K_1\{K_1 \times (\overline{OD_{BK}} - OD_{BKn})\}$$

$$= \overline{OD_{BK}} - OD_{BKn}$$

Optimal correction can be performed without being influenced by the ratio of sensor outputs of the respective colors.

Sensor output correction need not be performed by the CPU 101, but can be performed in the preprocessing section.

When the A/D converter 127 comprises, e.g., an 8-bit A/D converter, an output value of each color must be converted into 8-bit digital data of the dynamic range. This is very effective against a decrease in resolution of the read data of each color.

Figure 36A:
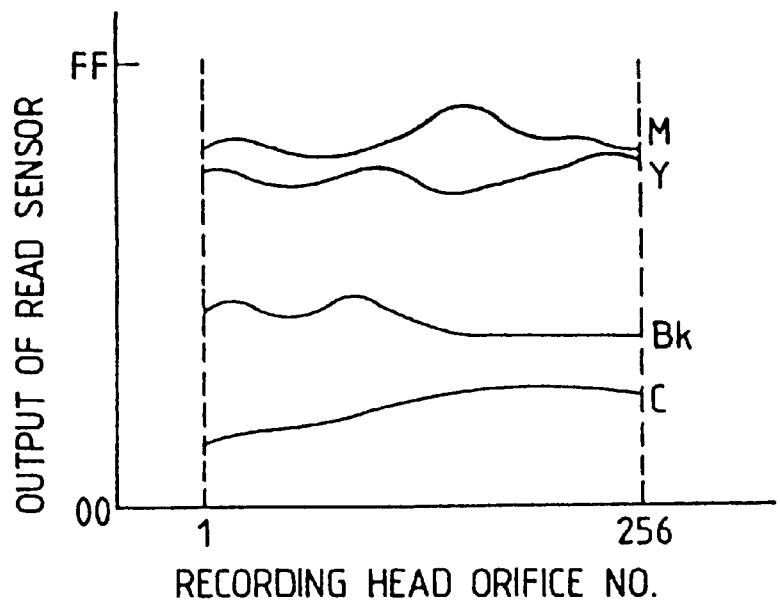
FIGS. 36A and 36B are views for explaining a correction mode in the operation in FIG. 35.
Figure 36B:
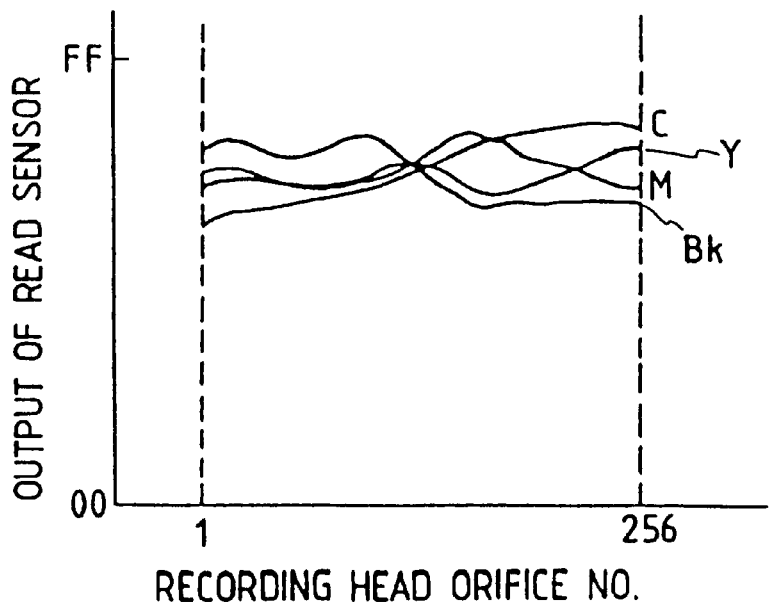

As shown in FIG. 35, amplifiers 135C, 135M, 135Y, and 135BK are arranged to amplify read signals of the respective colors. Sensor outputs of the read signals of the respective colors in FIG. 36A are set to be almost equal to each other, as shown in FIG. 36B. The read signal width for A/D-converting the read signals can be set narrow as a whole. A read data resolution in an 8-bit arrangement can be increased, and the read precision can further be improved.

Figure 1A:
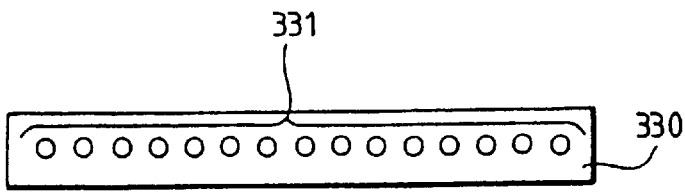
FIGS. 1A to 1E are views for explaining an uneven image density correction mode in a multi-nozzle head.
Figure 1B:
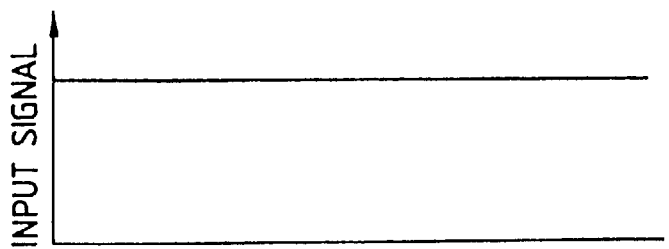
Figure 1C:
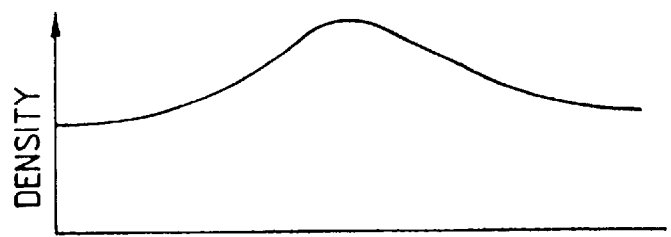
Figure 1D:
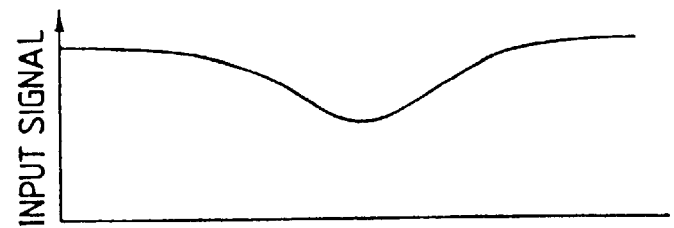
Figure 1E:
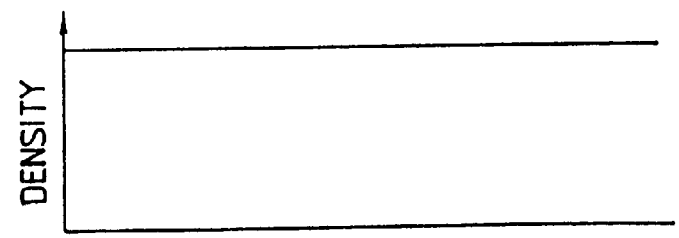
Figure 2:
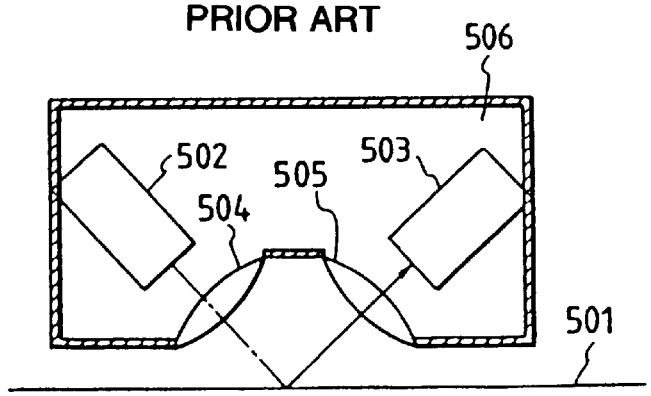
FIGS. 2, 3, and 4 are views for explaining reading units for performing uneven image density correction, respectively.
Figure 3:
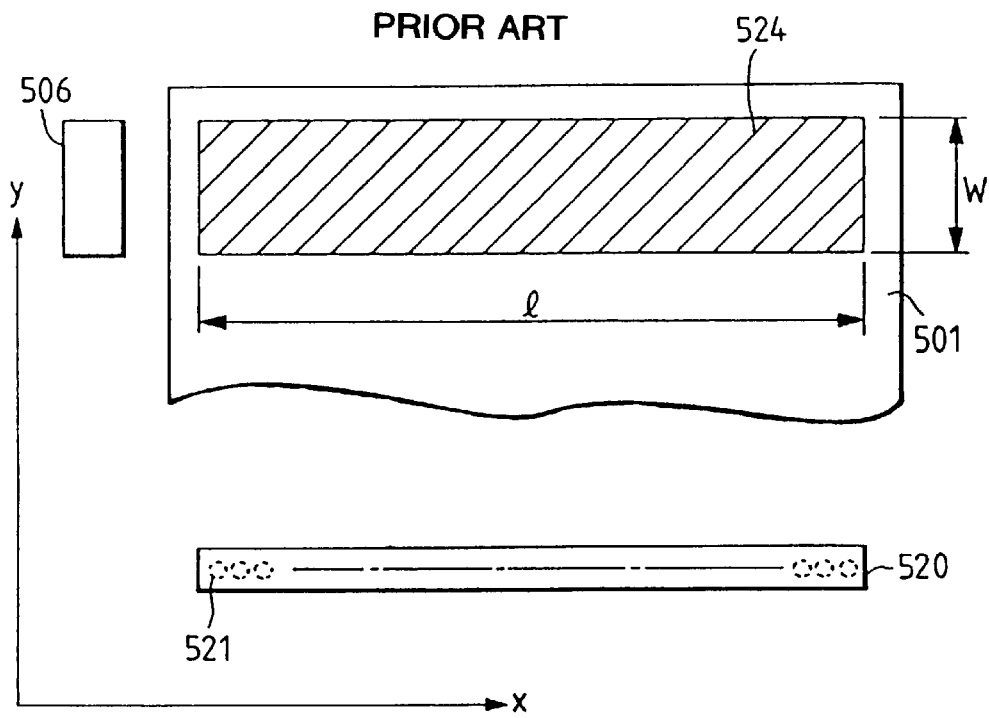
Figure 4:
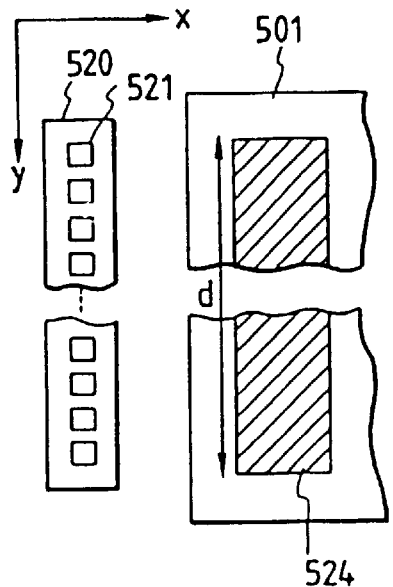
Figure 5:
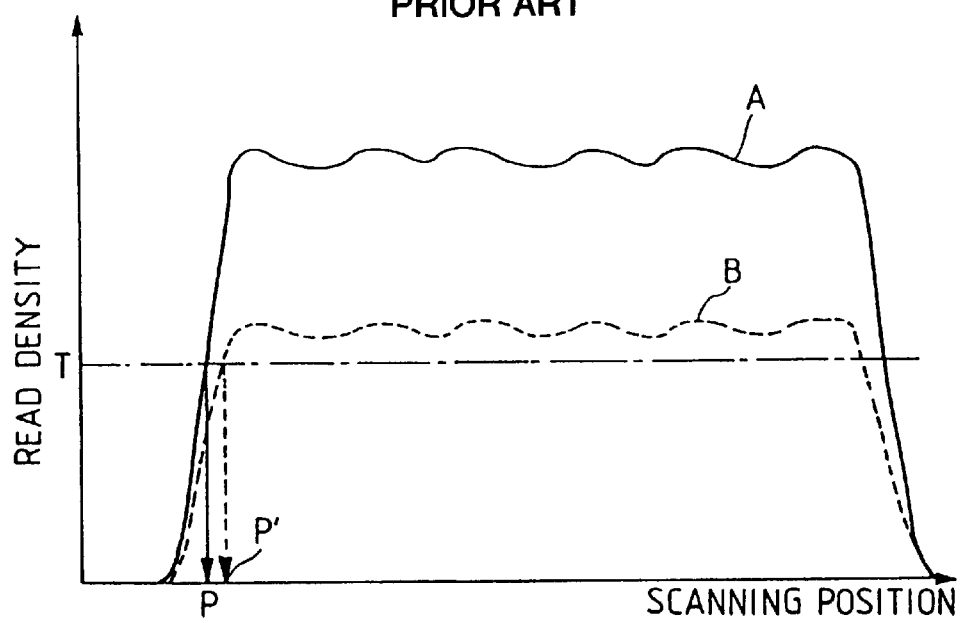
FIGS. 5, 6A, 6B, 7, 8, 9A, 9B and 10 are views for explaining an uneven image density correction algorithm.
Figures 6A, 6B:
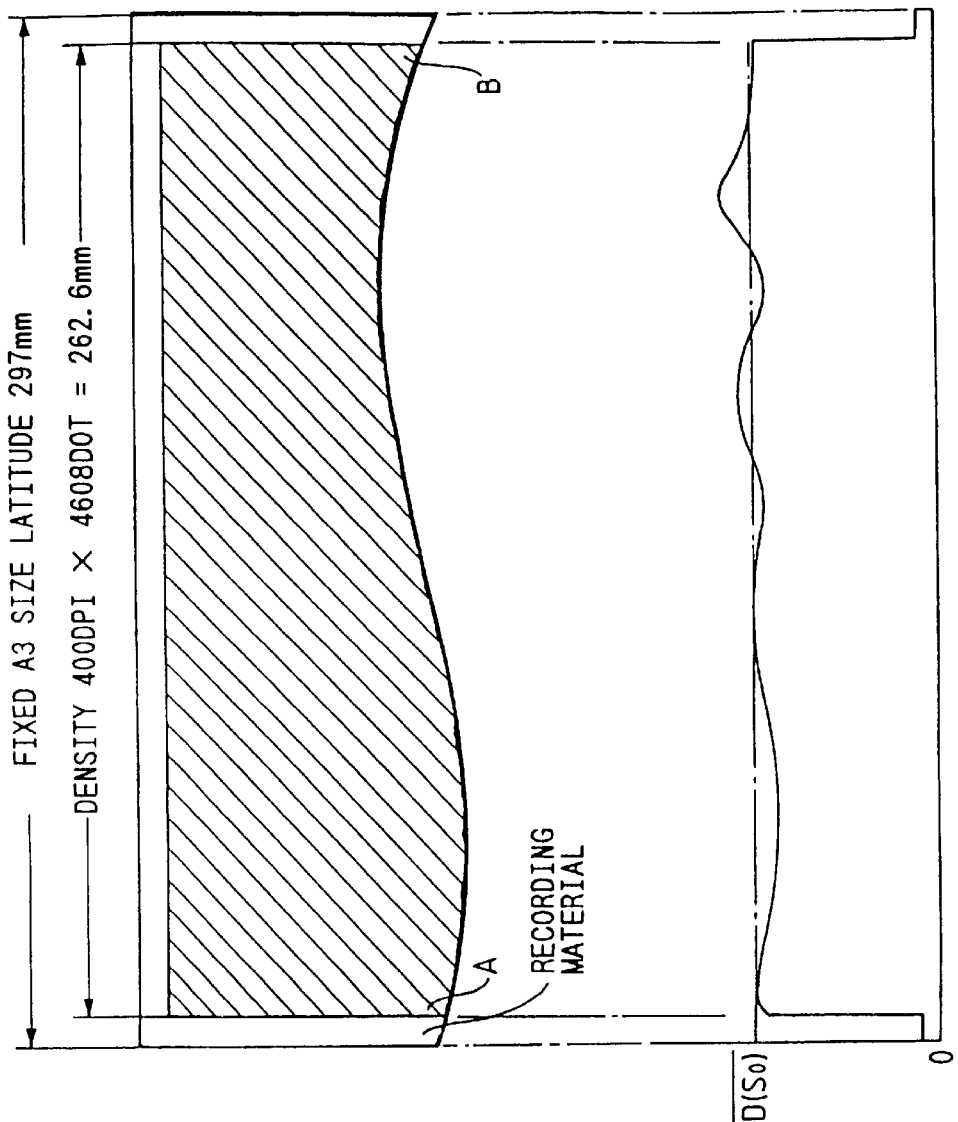
Figure 37:
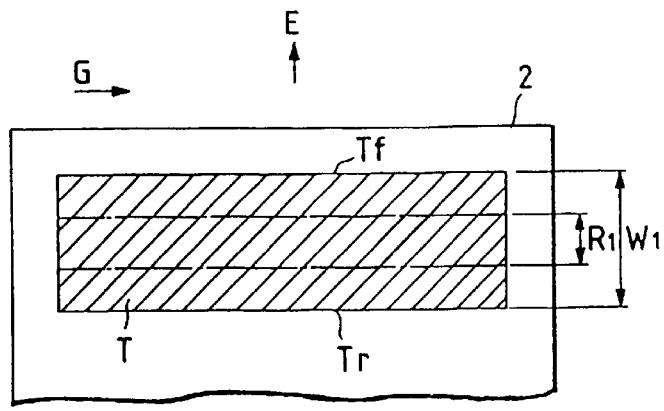
FIG. 37 is a view for explaining a test pattern and a reading area according to this embodiment.

FIG. 37 is a view for explaining a test pattern and an operation for reading this test pattern according to this embodiment. A test pattern T has a formation range $W_1$ in a recording medium convey direction E. The reading unit 14 has a read range (length $R_1$=d in FIG. 4) in the direction E. Uneven image density correction data obtained on the basis of the length R1 are produced. Referring to FIG. 37, in this embodiment, the length $R_1$ is smaller than the length $W_1$ and falls within the range of $W_1$ with sufficient margins at both sides in the convey direction.

When the relationship between the above lengths is not determined as described above, i.e., when the length $R_1$ is larger than the length $W_1$, i.e., when $R_1$ falls outside the range of $W_1$, light reflected by the background portion of the recording medium outside an edge Tf and/or an edge Tr of the test pattern is incident or may be incident on a reading sensor. As a result, accurate density reading cannot be performed. This embodiment, however, can prevent this inconvenience. Formation of a margin on the Tf side outside the range of $R_1$, i.e., driving of the recording head from a portion in front of an actual read portion, is preferable from the viewpoint of operational stability. Judging from this viewpoint, all or part of the stabilization processing (i.e., processing in steps S7 and S9 in FIG. 27 and processing for forming the pattern (a) in FIG. 31) can be omitted by the above driving operation.

Reading within the range of $W_1$ with sufficient margins at both sides of $R_1$ can be performed by determining a feed quantity upon recording of the test pattern in consideration of a distance between the recording position and the reading position and the lengths $R_1$ and $W_1$.

On the basis of the above results, in step S17 of FIG. 27, unevenness correction can be performed. More specifically, signals are sampled from the uneven image density read signals, and the number of sampled signals corresponds to the number of orifices. The sampled data are defined as data respectively corresponding to the orifices. For example, these data are defined as $R_1, R_2, \ldots, R_N$ (N is the number of orifices) and are temporarily stored in the RAM 119. The following operation is performed by the CPU 101.

These data are processed and converted into density signals as follows:

$$C_n = -\log(R_n/R_0)$$

where $R_0$ is the constant satisfying condition $R_0 \geq R_n$; $1 \leq n \leq N$.

When a threshold value having a predetermined density value is set to be ½ the normal read density of the test pattern, positions defined by the threshold value along the reading unit scanning direction are defined as $P_1$ and $P_N$. These positions correspond to positions obtained by causing the reading sensor to read dots formed by the and orifices. Therefore, read data of points shifted inside the test pattern from these points by ½ dot are defined as read data corresponding to the end orifices. This data is employed for $C_1$ and $C_N$.

An average density is then calculated as follows:

$$\overline{C} = \sum_{n=1}^{N} C_n / N$$

Subsequently, an aberration of the density corresponding to each orifice from the average density is calculated as follows:

$$\Delta C_n = A \times \Delta C_n$$

A signal correction quantity $(\Delta S)n$ corresponding to $(\Delta C)n$ is then obtained as follows:

$$\Delta S_n = A \times \Delta C_n$$

Where A is the coefficient determined by gradation characteristics of a head.

A selection signal of a correction straight line to be selected in accordance with $\Delta S_n$, and unevenness correction signals which has the number equal to that of orifices and each of which has 61 values of "0" to "60" are stored in the unevenness correction RAMs 129C to 129BK. Different $\gamma$ straight lines respectively corresponding to the orifices are selected in accordance with the formed unevenness correction data. The uneven image densities are corrected, thereby rewriting the unevenness correction data.

Test patterns are recorded by the respective recording heads in accordance with the correction data through the decision step S19 of FIG. 27, the test patterns recorded by the recording heads are read by the uneven image density reading unit 14, and the uneven image density correction data are calculated. These operations are repeated a plurality of times to end the uneven image density correction operation.

In this embodiment, in one processing for one recording medium, recording of the test patterns with the recording heads, reading of the test patterns, and calculations of the uneven image density correction data can be automatically performed a plurality of times. Therefore, even if an uneven image density of a given recording head cannot be sufficiently corrected by a single unevenness correction operation, this density can be corrected to improve uneven image density correction precision of each recording head, thereby shortening the total correction time.

In this embodiment, only one print duty is manually set. However, when a plurality of print duties are to be designated, e.g., when unevenness correction data are to be formed for three patterns having print duties of 30%, 50%, and 75%, it is cumbersome to set each duty at a time. As a modification of this embodiment, a plurality of duties can be simultaneously set to facilitate unevenness correction.

Figure 38A:
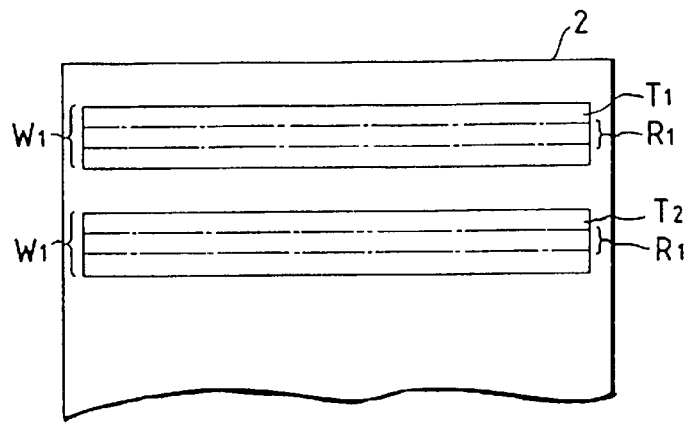
FIGS. 38A and 38B are views for explaining two modifications of this embodiment, respectively.

In this embodiment, the same control system as described above can be employed. A plurality of print duties, e.g., 30% and 50%, or 30%, 50%, and 75% can be selected in step S6 in FIG. 27. When patterns having duties of 30% and 50% are selected, a 30% pattern $T_1$ and a 50% pattern $T_2$ are printed on a recording medium 2, as shown in FIG. 38A. A threshold for the 30% pattern is set first, and the 30% pattern $T_1$ is read. When reading of the 30% pattern $T_1$ is completed, a threshold value for the 50% pattern $T_2$ is set, and the 50% pattern $T_2$ is read. various methods can be employed to select an appropriate threshold value such that conveyance of the recording medium 2 is monitored and an appropriate threshold value is selected in accordance with a monitoring result.

With this above arrangement, even if a plurality of test patterns are required, a threshold value need not be set every time, thus eliminating cumbersome operations.

As another modification, a mark representing a print duty of a test pattern may be printed, a print duty may be judged upon reading of the mark, and an optimal threshold value may be sat.

Figure 38B:
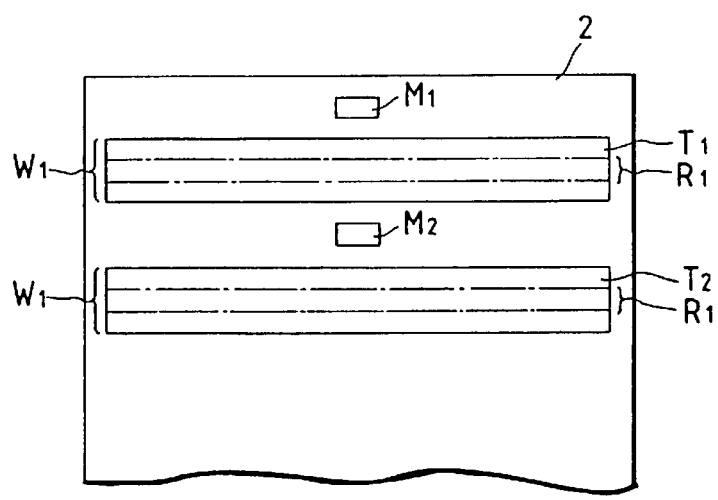

FIG. 38B show test patterns of this embodiment. A mark $M_1$ represents a test pattern having a print duty of 30%, and a mark $M_2$ represents a test pattern having a print duty of 50%.

Prior to printing of a 30% test pattern, the mark $M_1$ representing the print duty of 30% is printed. The mark $M_2$ representing the print duty of 50% is printed prior to printing of a 50% test pattern. The reading head reads the mark $M_1$, determines an uneven image density print duty, sets an optimal threshold value, and reads the test pattern $T_1$.

The reading head reads the mark $M_2$, determines the corresponding print duty, sets an optimal threshold, and reads the test pattern $T_2$ using the optimal threshold.

With the above technique, threshold values can be automatically set.

In the above arrangements, the threshold values are selectively used in accordance with the different print duties. Different read densities are obtained depending on different colors of test patterns. If a predetermined threshold value is set regardless of colors, a position serving as a reading reference of an end orifice cannot often be detected. The threshold value may be changed in accordance with a change in color. This is very effective to control a light emission quantity of a light source for test pattern reading, to calculate an optimal constant corresponding to a color in response to a read output, or not to amplify a read output. When this control operation is to be performed, a uniform density is not necessarily obtained at an end portion regardless of colors. The change in threshold value depending on a change in color can be effectively used in this embodiment.

In the above embodiment, test patterns are formed and unevenness correction is performed when the type of recording medium is predetermined. However, test pattern formation and unevenness correction may be performed regardless of types of recording media In this case, test patterns having appropriate duties corresponding to types of recording media are formed, the test patterns are read, and unevenness correction is performed on the basis of the read result. At the same time, a change in threshold value can be performed in accordance with a change in the type of recording medium.

An embodiment obtained by applying the present invention to a serial printer will be mainly described below. In the following embodiments, the same control systems and processing sequences as described above can be employed, as a matter of course.

Figure 39:
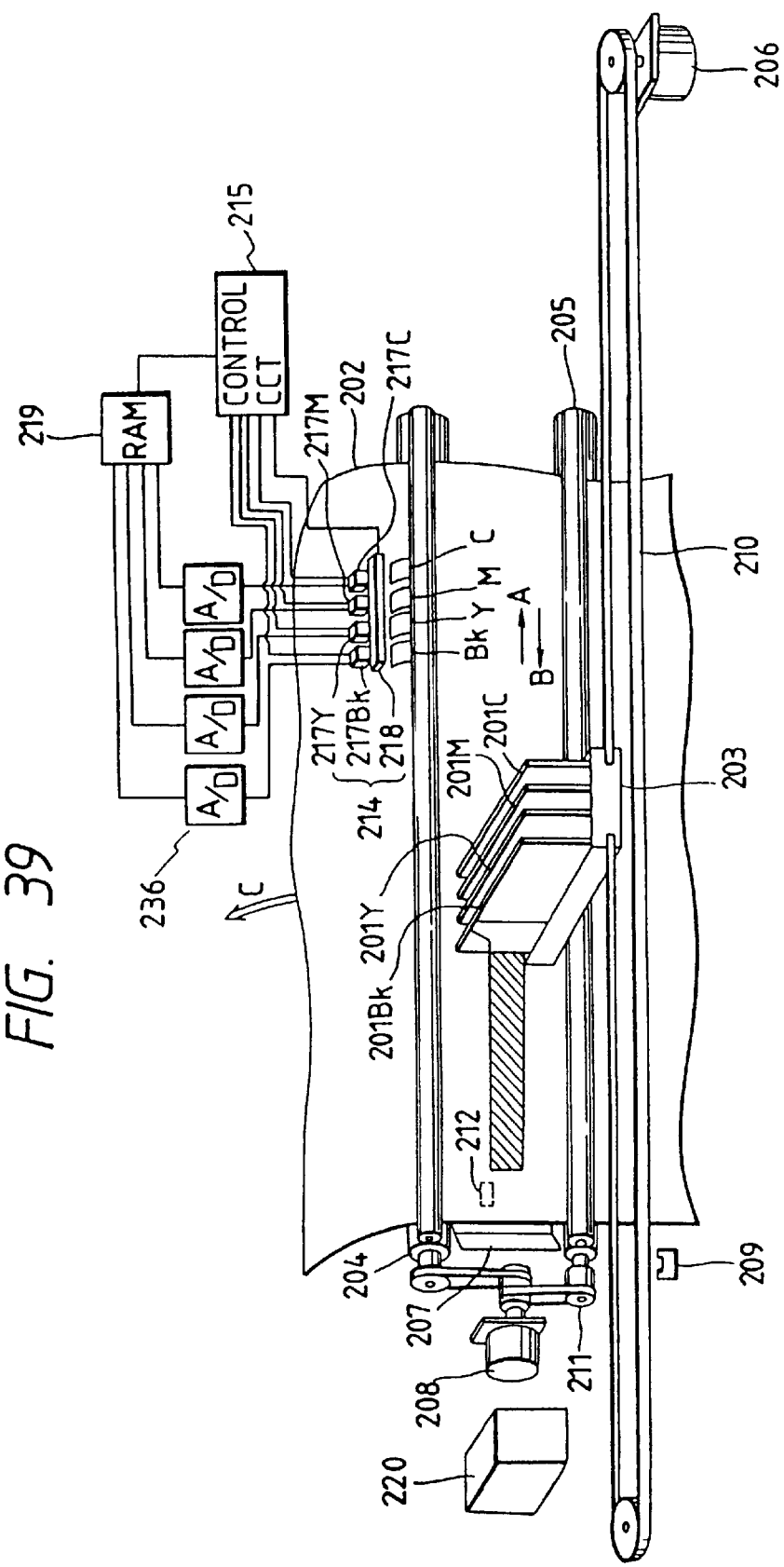
FIG. 39 is a view showing the second embodiment in which the present invention is applied to a serial printer type apparatus.

FIG. 39 is a schematic view showing the seventh embodiment obtained when the present invention is applied to a serial printer type ink-jet recording apparatus. Recording heads 201C, 201M, 201Y, and 201BK receive cyan, magenta, yellow, and black inks from ink tanks (not shown) through ink tubes, respectively. The inks supplied to the recording heads 201C, 201M, 201Y, and 201BK are driven in accordance with a recording signal corresponding to recording information supplied from a main control unit almost identical to that in FIG. 24. Ink droplets are injected from the respective heads to record information on a recording medium 202.

A convey motor 208 is a driving source for intermittently feeding the recording medium 202. A main scan motor 206 for driving a feed roller 204 and a convey roller 205 serves as a driving source for driving a main scanning carriage 203 in directions of arrows A and B through a main scanning belt 210. In this embodiment, since accurate paper feed control is required, the paper feed motor 208 and the main scan motor 206 comprise pulse motors.

When the recording medium 202 reaches the paper feed roller 205, a paper feed roller clutch 211 and the convey motor 208 are rotated to convey the recording medium 202 to the convey roller 204 along a platen 207. The recording medium 202 is detected by a sensor 212 arranged on the platen 207, and a detection signal from the sensor 212 is used for position control, jamming control, and the like. When the recording medium 202 reaches the convey roller 204, the paper feed roller clutch 211 and the convey motor 208 are turned off. A suction motor (not shown) is operated to start a suction operation from the inside of the platen 207. The recording medium 202 is brought into tight contact with the platen 207 serving as an image recording area. Prior to an image recording operation on the recording medium 202, the scanning carriage 203 is moved to the position of a home position sensor 209. Forward scanning is performed in the direction of the arrow A, and cyan, magenta, yellow, and black inks are injected from predetermined positions from the recording heads 201C to 201BK to perform image recording. When image recording by a predetermined length is completed, the scanning carriage 203 is stopped. At this time, backward scanning is started in the direction of the arrow B opposite to the direction of the arrow A. The scanning carriage 203 is returned to the home position sensor 209. During backward scanning, paper feeding by a length of sheet recorded with the recording heads 201C to 201BK is performed by causing the convey motor 208 to drive the convey roller 204 in a direction of an arrow C.

In this embodiment, each of the recording heads 201C to 201BK comprises an ink-jet recording head for forming a bubble by heat and injecting an ink droplet by a pressure of the bubble. Four ink-jet recording heads each having 256 orifices are used as the recording heads 201C to 201BK.

When the scanning carriage 203 is stopped at the home position detected by the home position sensor 209, a recovery operation of the recording heads 1 is performed once by a recovery unit 220. This operation aims at performing a stable recording operation. In order to prevent injection start unevenness caused by a change in viscosity of an ink left in the orifices of the recording head 201, operations such as a suction operation for the recording head 201 by the recovery unit 220 and an ink preliminary injection operation are performed in accordance with programmed conditions such as stop time, a temperature inside the apparatus, and injection time.

The operations described above are repeated to record an image on the entire surface of the recording medium. Under the control of a control circuit 215, an uneven image density reading unit 214 reads test patterns printed on the recording medium 202 upon application of uniform image signals to the recording heads 201C to 201K and outputs read signals. The uneven image density reading unit 214 is arranged outside the image recording area. In this embodiment, the uneven image density reading unit 214 is arranged to face the recording surface of the recording medium on the downstream side of the recording head along the convey direction (i.e., the direction of the arrow C) of the recording medium 202. As described above, the recording medium 202 on which test patterns are recorded is illuminated with a light source 218. Recording densities of the test patterns recorded on the recording medium by the recording heads are read by reading sensors 217C, 217M, 217Y, and 217BK. Test pattern signals read by the reading sensors 217C, 217M, 217Y, and 217BK are converted into digital signals by an A/D converter 236, and the digital signals are temporarily stored in a RAM 219.

Figure 40:
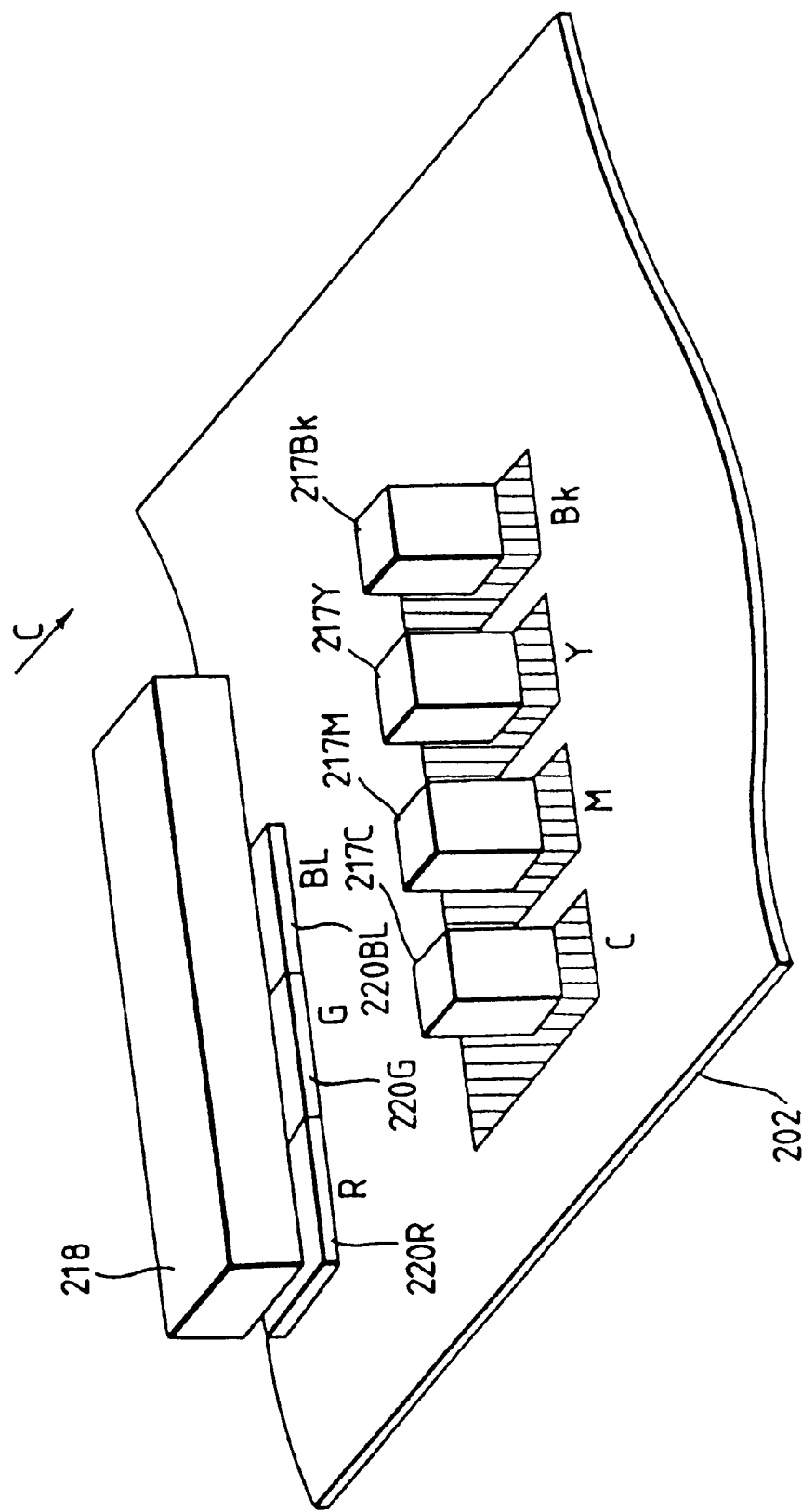
FIG. 40 is a view showing a reading system unit of the second embodiment.

FIG. 40 is a schematic view for explaining a reading unit of this embodiment. In order to improve reading precision of uneven image densities of the test patterns recorded on the recording medium 202 by the recording heads, color filters 220R, 220G, and 220BL are arranged on a light source 218 on the recording medium side. R, G, B, and L light components are radiated on the C, M, and Y test patterns recorded on the recording medium 202. In this manner, by emitting light components of complementary colors onto the C, M, and Y test patterns, different spectral sensitivities of the reading sensors 217C, 217M, 217Y, and 217BK need not be employed in units of test pattern colors. Uneven image densities of the respective colors can be read by using sensors having identical spectral sensitivities.

With the above arrangement, the press member described above can be used to prevent sheet floating during reading. A sufficient margin is formed in each color test pattern except for a read area actually used for correction in the same manner as in FIG. 37. The test patterns can be formed by three scanning operations of the recording head. A pattern formed by two scanning operations can be used for unevenness correction.

Figure 41:
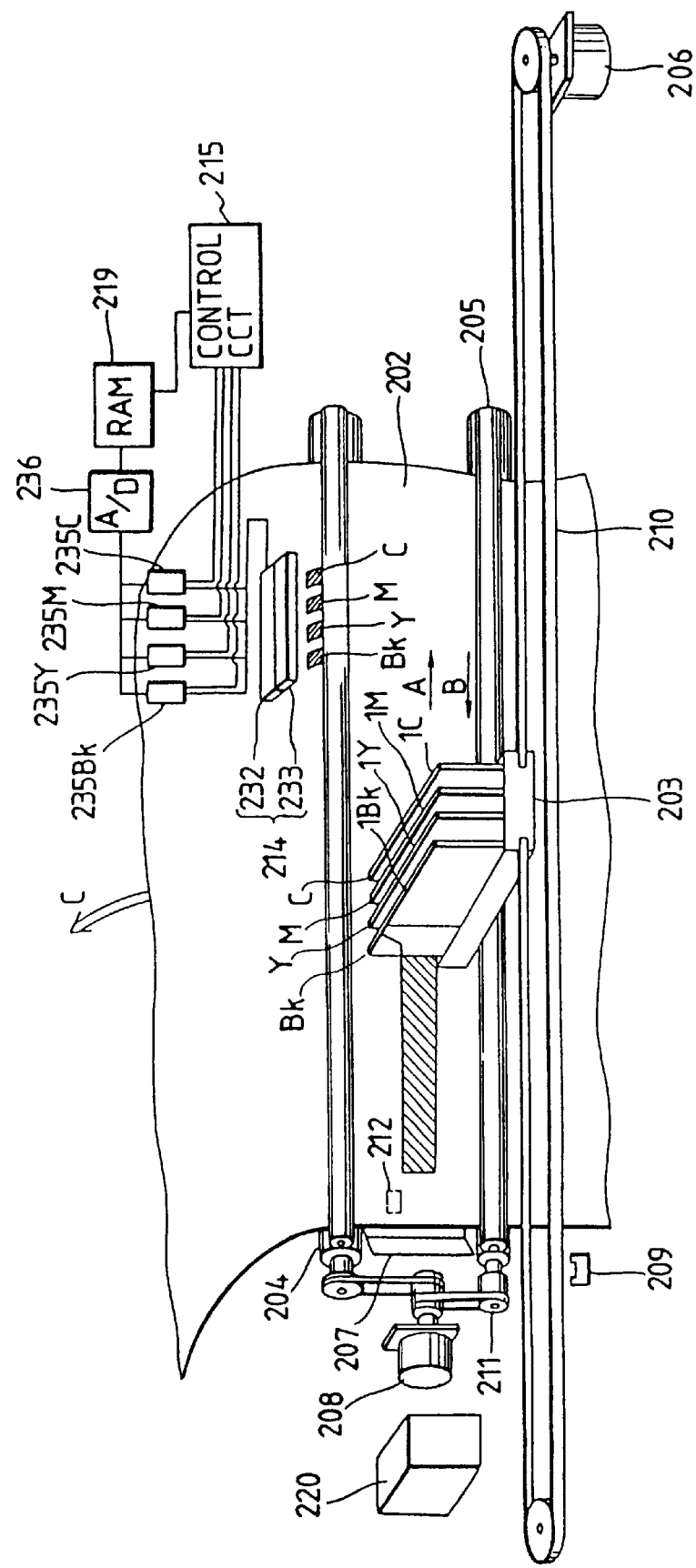
FIG. 41 is a view showing the third embodiment of the present invention.

FIG. 41 is a schematic view of the third embodiment obtained when the present invention is applied to a serial printer type apparatus. Uniform image signals are applied to the recording heads 201C, 201M, 201Y, and 201BK to read test patterns recorded on the recording medium 202, and read signals are output as in the above arrangement. In this case, the uneven image density reading unit 214 arranged outside the image recording area is constituted by a line reading sensor 232 and a light source 233.

In this embodiment, the uneven image density reading unit 214 is located to face the recording surface of the recording medium on the downstream side of the recording head in the convey direction (i.e., the direction indicated by the arrow C) of the recording medium 202, and a press member similar to the one described previously is arranged. When a test pattern recorded on the recording medium 202 is to be read, a distance between the recording medium 202 and the reading sensor 232 can be easily kept constant. In addition, only one reading sensor is required, thereby providing a compact apparatus.

Figure 42:
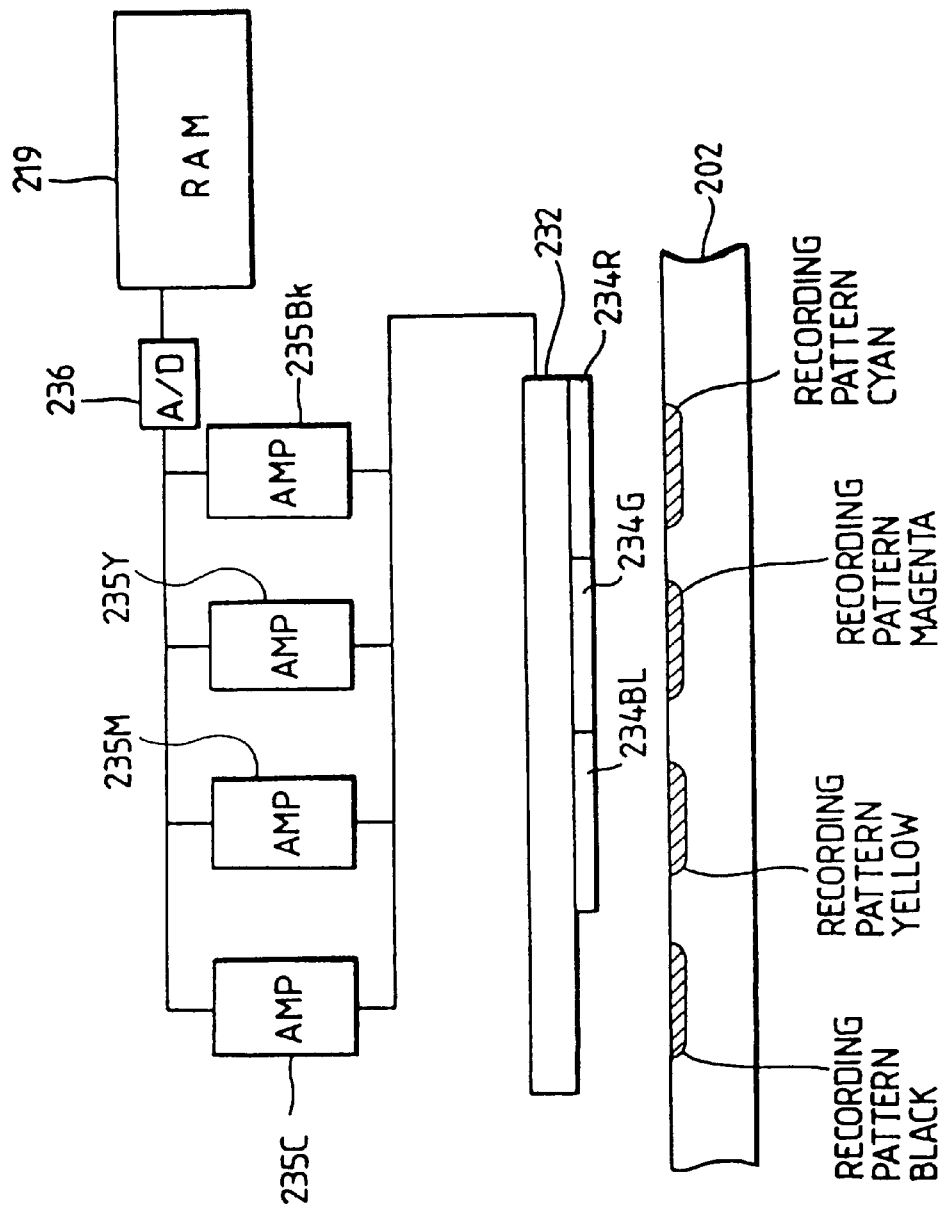
FIG. 42 is a view showing a reading unit of the third embodiment.

As shown in FIG. 42, R, G, B, and L color filters 234R, 234G, and 234B are arranged on the reading side of the reading line sensor 232 so as to correspond to the positions of the test patterns recorded by the respective recording heads, thereby improving reading precision of the reading sensor 232 for the print patterns of the respective colors. As described with reference to FIGS. 35, 36A, and 36B, the color read signals from the reading sensor 232 are amplified by amplifiers 235C to 235BR, respectively, to increase the resolution of the read data, thereby further improving reading precision.

Figure 43:
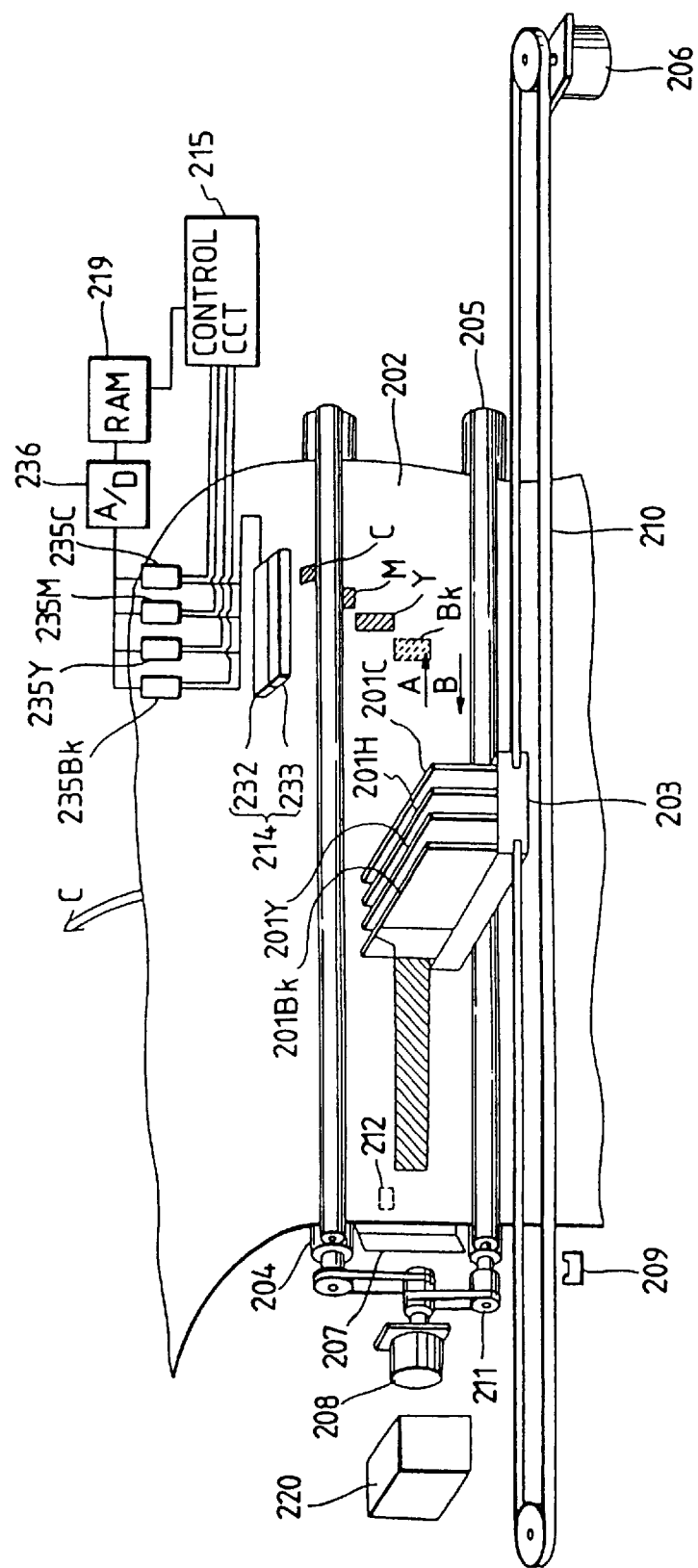
FIGS. 43 and 44 are views showing the fourth and fifth embodiments of the present invention, respectively.

FIG. 43 shows the fourth embodiment obtained by applying the present invention to a serial printer type apparatus. In this embodiment, when test patterns are to be recorded on a recording medium 20 upon selective scanning of a carriage having recording heads 201C, 201Y, 201Y, and 201BK in directions indicated by arrows A and B, a test pattern is recorded by each recording head every scanning cycle of the carriage 203. After the reading line sensor 232 reads the test pattern recorded on the recording medium 202, the carriage 203 is scanned again, and another test pattern is recorded on the recording medium 202 by the next recording head.

According to this embodiment, by reading each test pattern recorded on the recording Medium by each recording head in units of colors, the capacity of the AM 219 for storing the test pattern read data can be reduced to ¼, thereby further simplifying the structure of the apparatus.

Figure 44:
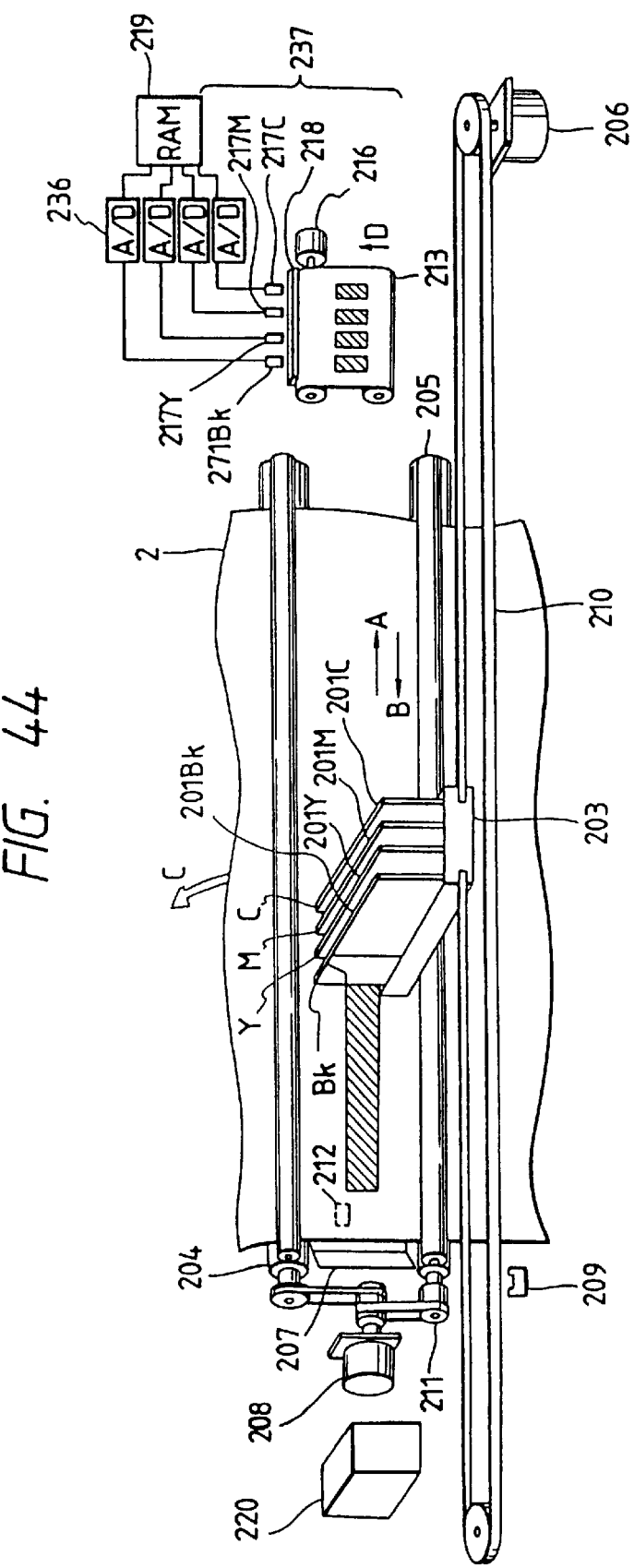

FIG. 44 schematically shows the fifth embodiment obtained by applying the present invention to a serial printer type apparatus. In this embodiment, a test pattern recording unit for causing a recording head to record a test pattern and an uneven image density correction unit 237 constituted by a test pattern reading unit are arranged outside an image recording area.

In this embodiment, when an uneven image density state of the test pattern is stabilized after a test pattern is recorded on a test pattern recording sheet 231 of a test pattern recording unit by each recording head, the test pattern recording sheet 213 is conveyed to the uneven image density reading unit.

As described above, according to the present invention, the threshold value is set variable in accordance with test images and print duties to accurately cause the unevenness data to correspond to recording elements, thereby forming accurate unevenness correction data.

The image forming apparatus can form a high-quality image.

Figure 45:
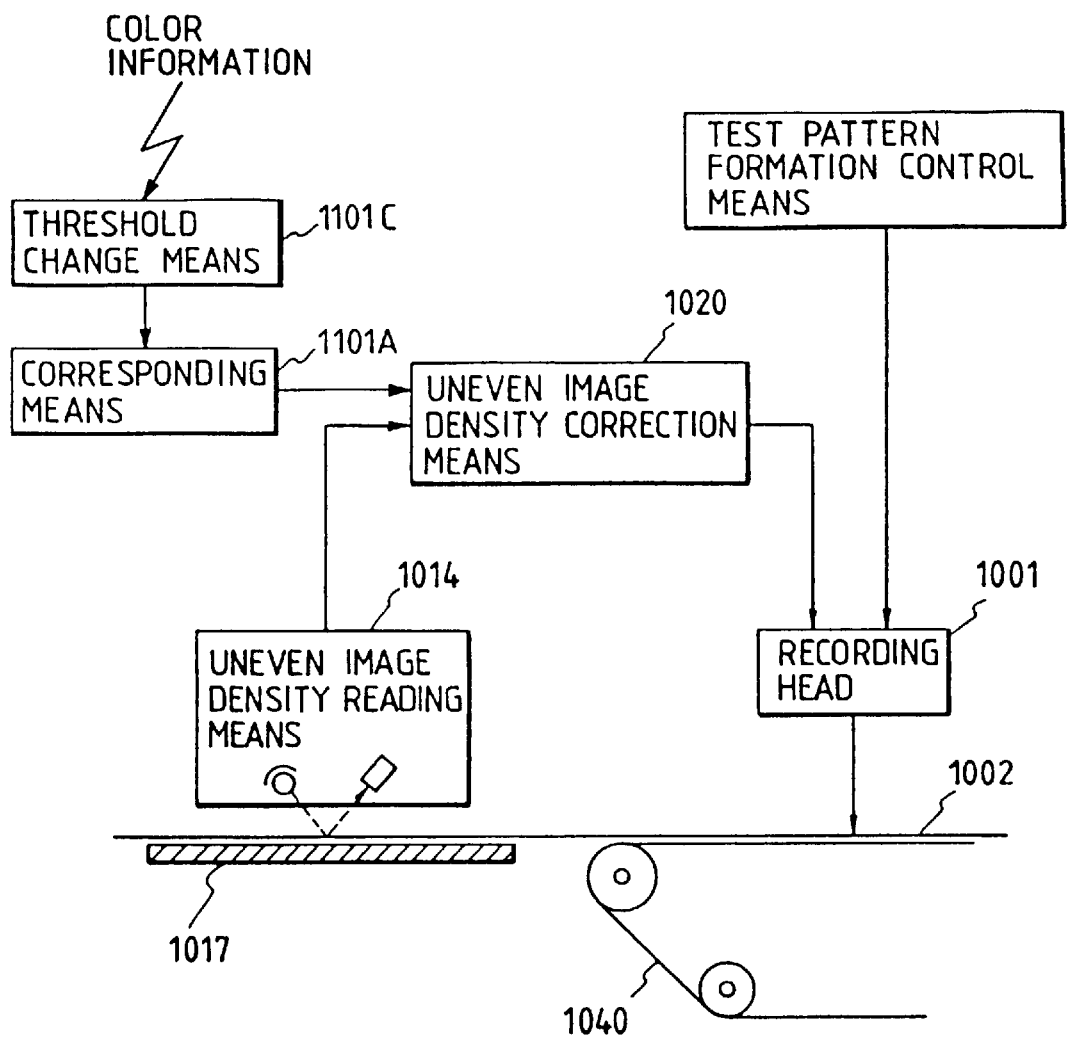
FIG. 45 is a view for explaining the principle of the sixth embodiment of the present invention.

The sixth embodiment of the present invention will be described below. FIG. 45 is a schematic view showing a main part of this embodiment. The same reference numerals as in the first embodiment of FIG. 11 denote the same parts in the sixth embodiment, and a detailed description thereof will be omitted. In the sixth embodiment, a threshold value of a corresponding means 1101A is changed in accordance with a color of a test pattern, unlike in the first embodiment wherein the threshold value is changed in accordance with a change in print duty. A threshold change means 1101C changes the threshold value in accordance with a color of a test pattern. A mechanical structure and a reading system of the sixth embodiment are identical to those of the first embodiment, and a detailed description thereof will be omitted.

An arrangement of a control system of this embodiment is the same as described with reference to the first embodiment of FIG. 24. In the sixth embodiment, an indication input unit 106 includes an on-line switch for causing the apparatus to communicate with a host unit, and can input a command representing the start of recording, a command representing indication of test pattern recording for uneven image density correction, information representing a type of recording medium, and a command indicating a head subjected to correction (a specific color to be subjected to unevenness correction may also be indicated or designated).

Figure 46:
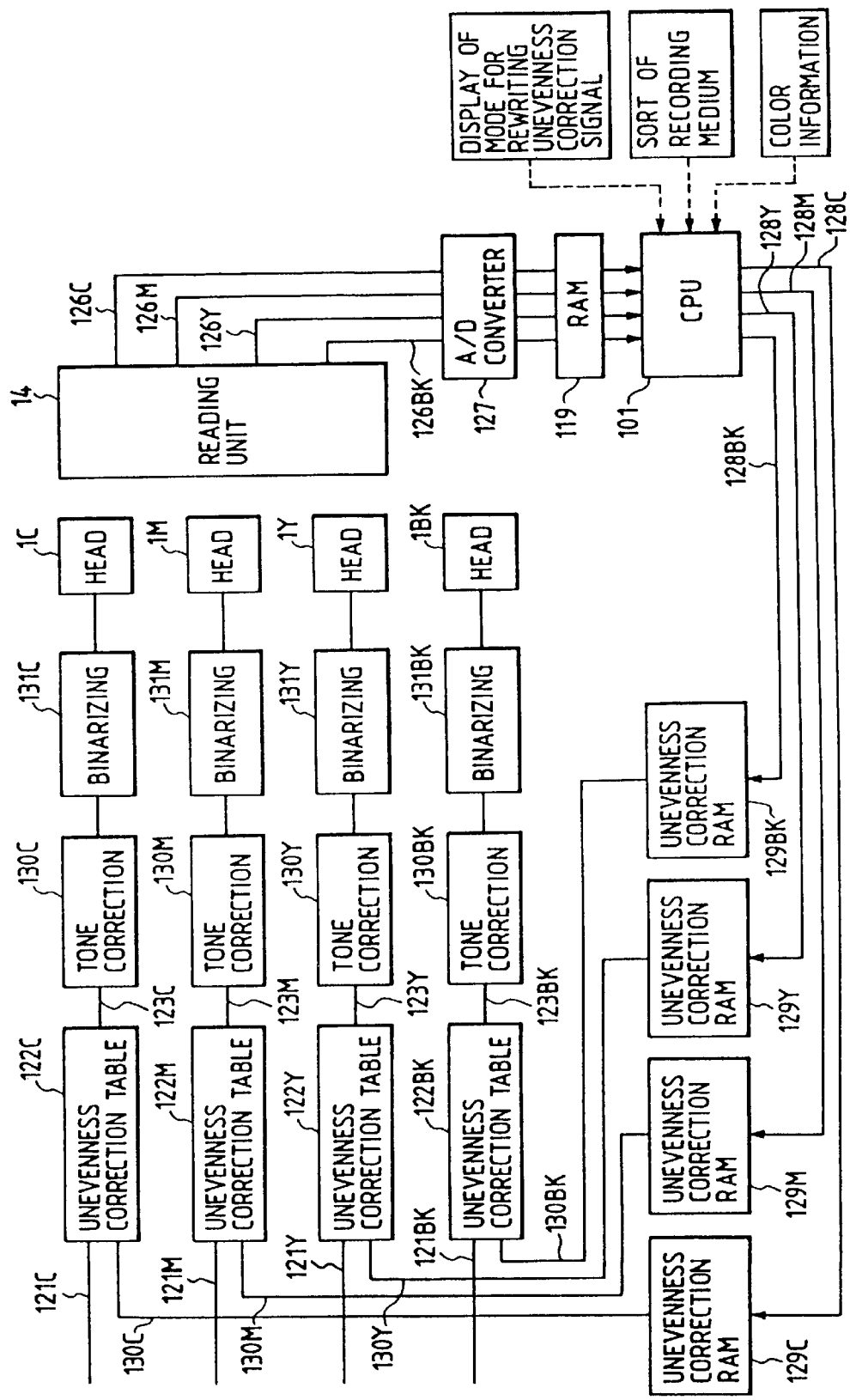
FIGS. 46 and 47 are a block diagram and a flow chart, respectively, for explaining unevenness correction processing.

FIG. 46 shows a detailed arrangement of the above circuit and, especially, an uneven image density correction system. This is substantially the same as that of the fist embodiment described with reference to FIG. 25, except that a print duty is not input to a CPU 101 but color information is input thereto.

With the above arrangement, the following processing is performed to more accurately perform unevenness correction.

Figure 47:
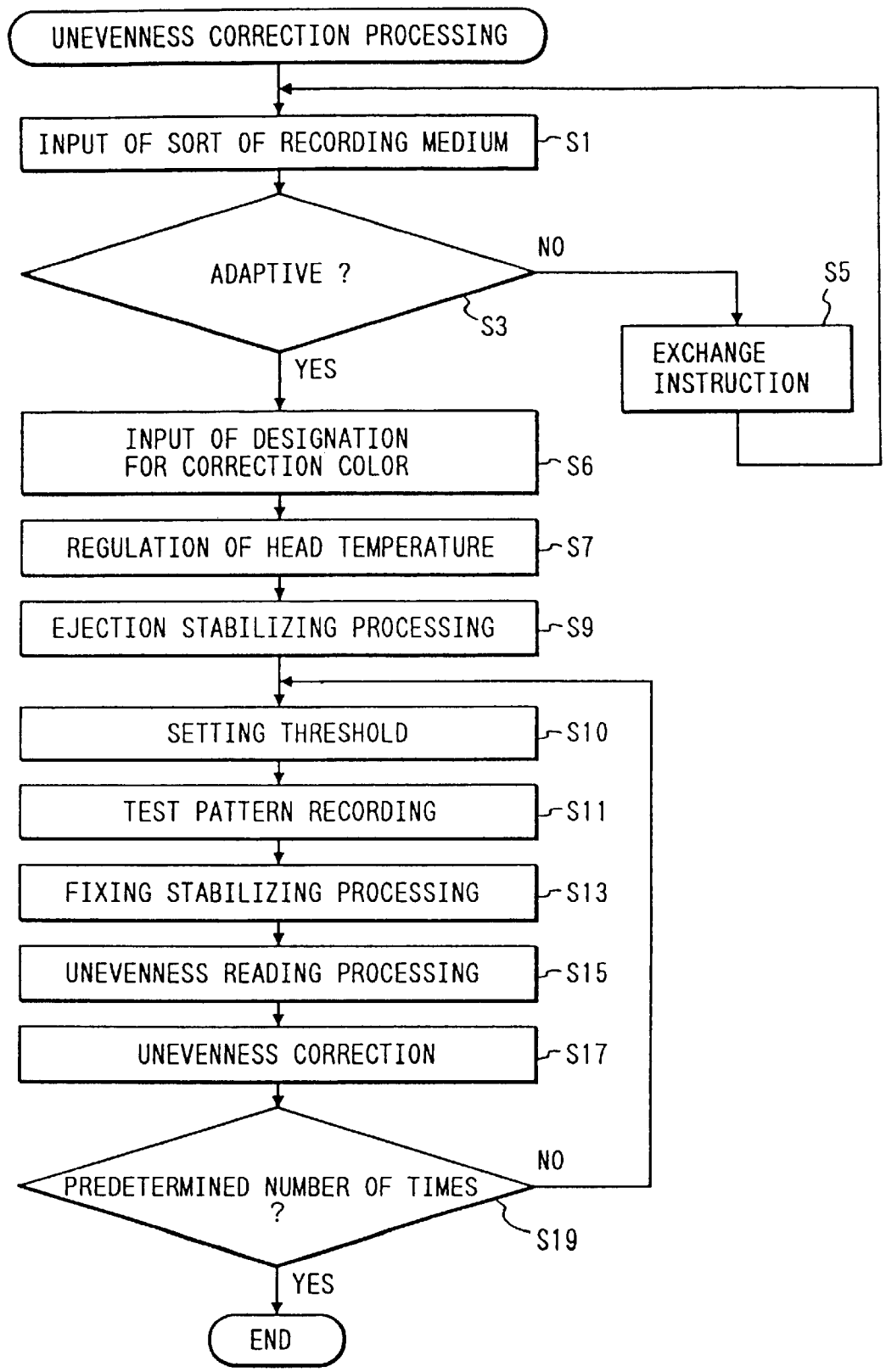

FIG. 47 shows an unevenness correction processing sequence of this embodiment. The same reference symbols as in the first embodiment denote the same steps in FIG. 27, and a detailed description thereof will be omitted.

Referring to FIG. 47, when a recording medium is suitable for unevenness correction (steps S1, S3, and S5), the flow advances to step S6 to receive an indication input of a recording head subjected to unevenness correction. In this case, cyan, magenta, yellow, or black can be indicated or designated so as to receive information of a color to be concentratedly corrected. The flow advances to step S7 to perform temperature adjustment or control.

When injection stabilizing processing is completed in step S9, a threshold value for setting a position as a reading reference of an end orifice of a recording head 1 is set in accordance with set color information in step S10. For example, when a read density of a uniform halftone pattern having a duty of 50% is given as about 0.74 for black, about 0.73 for cyan, about 0.72 for magenta, and about 0.50 for yellow, threshold values are ½ these read densities, respectively. That is, the threshold value for black can be set to 0.39, the threshold value for cyan or magenta can be set to 0.36, and the threshold value for yellow can be set to 0.25. However, the threshold values are not limited to ½ the corresponding read densities, but can be arbitrarily set. For example, when a reflection density of a recording medium itself is relatively high, each threshold value is preferably set to be ½ a sum of the reflection density and the corresponding color read density.

In step S11, predetermined test patterns are recorded with recording heads 1C to 1BK, and uneven image densities are read from these test patterns.

Note that a test pattern is a uniform halftone pattern having a density 96, and a print ratio falls within the range of 30 to 75%.

Fixing stabilization processing (step S13), unevenness reading processing (step S15), and unevenness correction (step S17) are then performed au in FIG. 27.

In this embodiment, only one recording head subjected to unevenness correction is manually set. However, when full-color recording using the apparatus of this embodiment is to be performed, unevenness correction data may be preferably formed for heads of two or more colors. In this case, it is cumbersome to set each print duty at a time. As a modification of this embodiment, a plurality of colors are simultaneously set to perform unevenness correction.

In this arrangement, the same control system as described above can be employed. In this case, a plurality of colors such as a set of cyan and black, or a set of cyan, magenta, and black can be selected in step S6 in FIG. 47. Alternatively, a single indication input unit for indicating all colors may be arranged. As shown in FIG. 38A with reference to the first embodiment, when cyan and black are selected, a cyan pattern $T_1$ and a black pattern $T_2$ are printed on the recording medium 2. A threshold value for the cyan pattern is set first, and the cyan pattern $T_1$ is read. Upon completion of reading of the cyan pattern $T_1$, a threshold value for the black pattern $T_2$ is set, and the black pattern $T_2$ is read. Various methods may be employed to selectively use the threshold values in such a manner that conveyance of the recording medium 2 is monitored, and an optimal threshold value is selected on the basis of a monitoring result.

With the above arrangement, even if there are a plurality of heads associated with formation of unevenness correction data, an optimal threshold value need not be set for each cycle, resulting in convenience.

As another modification, a mark representing a test pattern corresponding to a specific color head may be printed before the test pattern, the specific color head may be judged upon reading of the mark, and an optimal threshold value may be set.

FIG. 38B show test patterns of this embodiment. A mark $M_1$ represents a black test pattern, and a mark $M_2$ represents a black test pattern.

Prior to printing of a cyan test pattern, the mark $M_1$ is printed. The mark $M_2$ is printed prior to printing of the black test pattern. The reading head reads the mark $M_1$ first to determine the color of the uneven image density head, and an optimal threshold value is set. The head reads the test pattern $T_1$.

The head then reads the mark $M_2$ and determines the color, thereby setting an optimal threshold value. The test pattern $T_2$ is read using this optimal threshold value.

With the above technique, the threshold values can be automatically set.

When adjustment of a light emission quantity of a light source for test pattern reading, calculation of an optimal constant corresponding to a color in response to a read output, or amplification of a read output is to be performed, a uniform density is not necessarily obtained at an end portion regardless of colors due to reflection on the background of the recording medium. The change in threshold value depending on a change in color can be effectively used in this embodiment. In addition, when the above adjustment is not performed, the above technique can be more effectively utilized.

In the above embodiments, the threshold values are changed in accordance with only colors. However, the threshold values may be changed in accordance with changes in print duty. In order to perform optimal correction in various density ranges, test patterns are formed at print duties corresponding to these density ranges, and the read result may be utilized (e.g., print duties of 30%, 50%, and 75%; and an average value obtained upon printing of the test patterns at these duties). If read densities are different in correspondence with duties and a predetermined threshold value is obtained regardless of different duties, a position serving as a read reference of an end orifice cannot often be accurately detected. Therefore, the threshold value may be changed in accordance with the print duties.

In the above arrangement, test patterns of primary colors are printed, and unevenness correction is performed. However, test patterns obtained by mixing colors may be used.

The sixth embodiment is applicable to a serial printer shown in FIGS. 39 to 44.

According to the present invention, as described above, the threshold value is set variable in accordance with colors of recording agents of heads associated with unevenness correction, so that unevenness data are accurately caused to correspond to the recording elements, thereby accurately forming unevenness correction data.

The image forming apparatus, therefore, can form a high-quality image.

Figure 48:
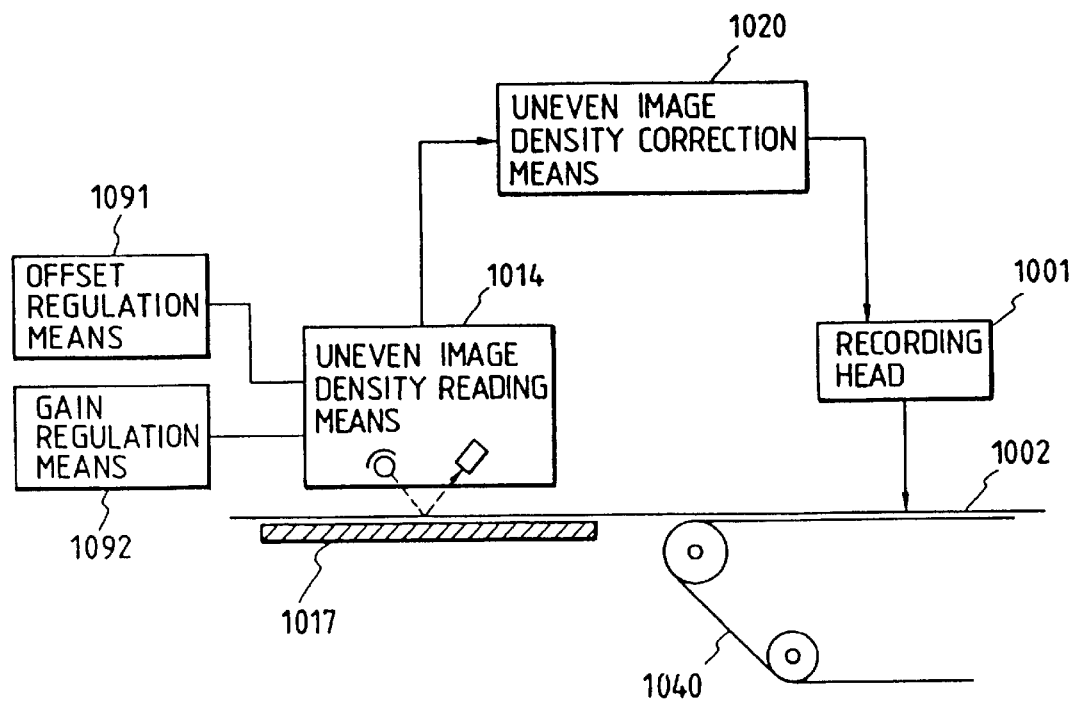
FIG. 48 is a view for explaining the principle of the seventh embodiment.

The seventh embodiment of the present invention will be described below. FIG. 48 is a schematic view of a main part of this embodiment. The same reference numerals as in the first embodiment of FIG. 11 denote the same parts in the seventh embodiment, and a detailed description thereof will be omitted.

An offset regulation means 1091 and a gain regulation means 1092 regulate the offset and gain of a read means 1014. By these regulation operations, the uneven image density can be accurately read and corrected.

This embodiment employs both the offset and gain regulation means. However, if one of the offset and gain is fixed or appropriately set, only the other factor can be regulated. A description of the same parts of the mechanical structure and the reading system as in the first embodiment will be omitted.

In this embodiment, offset and gain regulation operations are performed prior to reading of test patterns. For this purpose, a first reference density sample having a high optical density and a second reference density sample having a low optical density are read.

Figure 49:
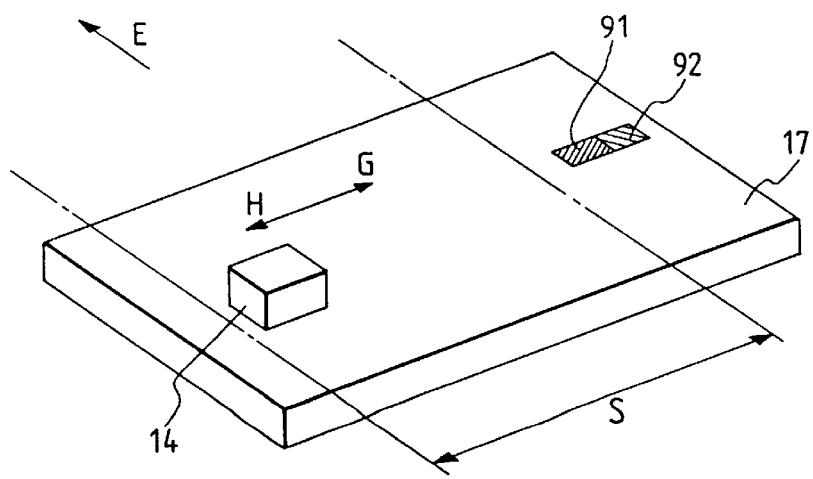
FIG. 49 is a perspective view showing a reference density sample formed on a reading platen.

FIG. 49 show these samples. These samples are formed outside a recording medium convey range S of a reading platen 17 but inside a scanning range of a reading unit 14. A first reference density sample plate 91 has a density slightly higher than a test pattern density (i.e., the quantity of reflected light is small), and a second reference density sample plate 92 has a density slightly lower than the test pattern density (i.e., the quantity of reflected light is large). In this embodiment, these sample plates are arranged outside the range S. However, if a recording medium is read before it reaches the platen 17, the sample plates may be formed within the range S.

Figure 50:
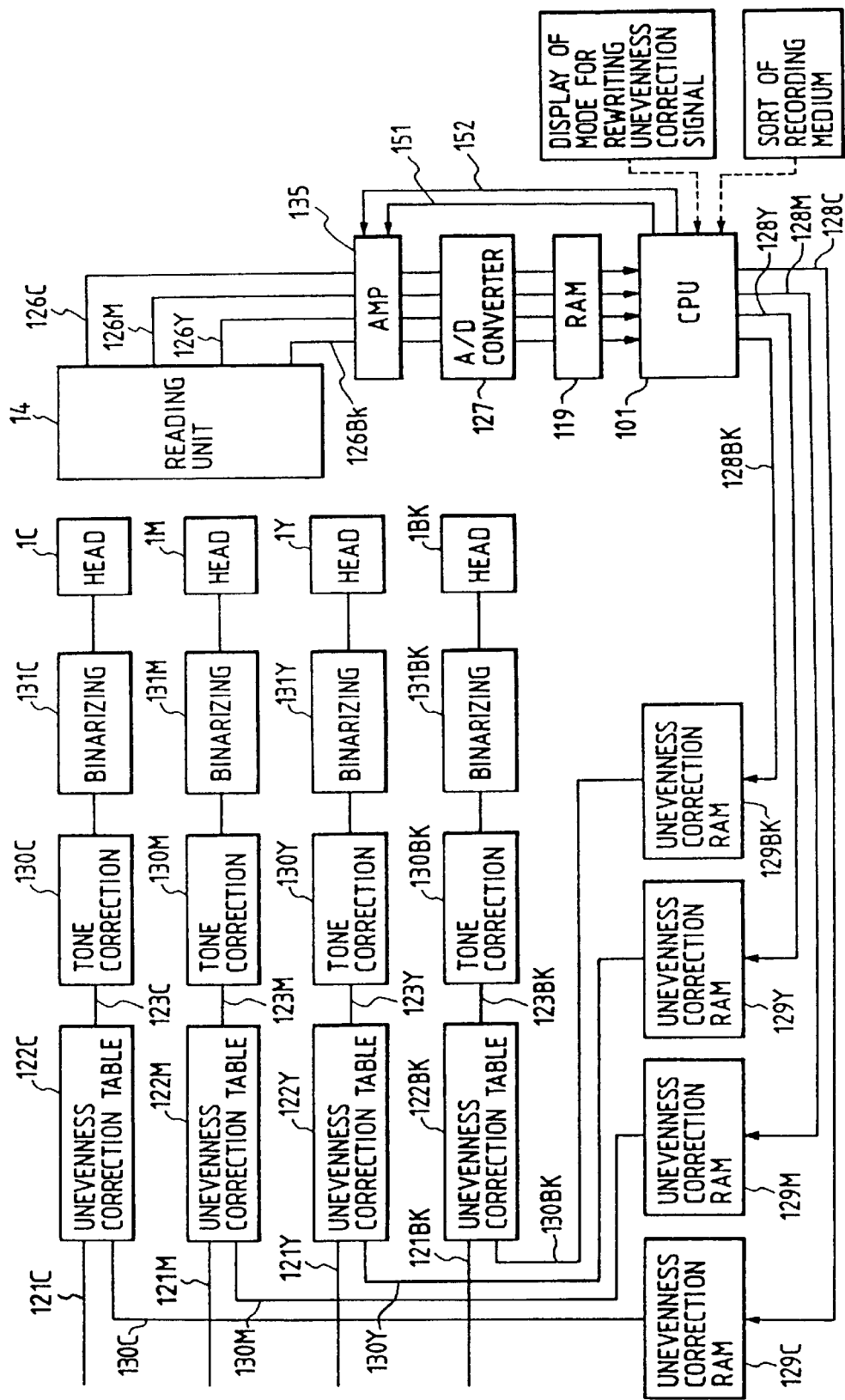
FIGS. 50 and 51 are a block diagram and a flow chart, respectively, for explaining unevenness correction processing.

FIG. 50 shows a detailed arrangement of the control system of this embodiment and, particularly, an uneven image density correction system. Color signals 126C, 126M, 126Y, and 126BK are read by the reading unit 14 through color filters and apertures (FIG. 19). These color signals are input to an amplifier 135. Offset adjustment and gain adjustment of the amplifier 135 are completed through signals 151 and 153 under the control of a CPU on the basis of data obtained by reading the first and second reference density sample plates 91 and 92 prior to reading of the test patterns. An A/D converter 127 converts an amplifier output into digital data.

Other arrangements of the uneven image density reading system of this embodiment are the same as those in the first embodiment in FIG. 25, and a detailed description thereof will be omitted.

With the above arrangement, the following processing is performed to more accurately perform unevenness correction.

Figure 51:
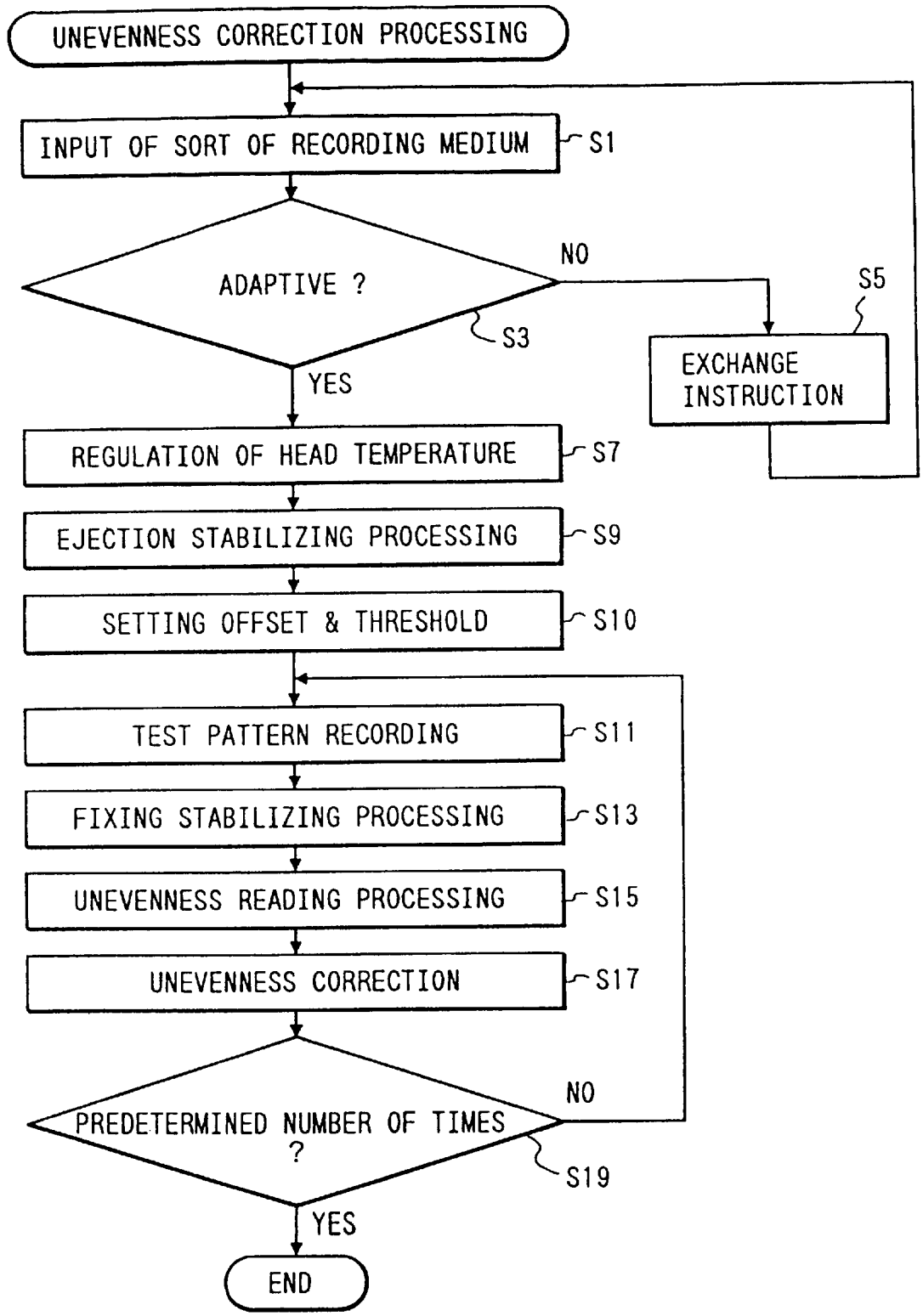

FIG. 51 shows an uneven correction processing sequence according to this embodiment. A description of the same steps as described with reference to the first embodiment of FIG. 27 will be omitted.

When injection stabilizing processing up to step S9 is completed, predetermined test patterns are recorded with recording heads 1C to 1BK in step S11, and uneven image densities are read from these test patterns.

In this embodiment, however, prior to reading of uneven image densities, the offset and gain of the amplifier 135 are regulated. For this purpose, a regulation processing sequence (step S10) is inserted between the injection stabilizing processing (step S9) and test pattern recording (step S11) in the sequence of FIG. 51.

In this embodiment, the optical density of the test pattern is given as 0.6, and the optical densities of the first and second reference density sample plates 91 and 92 are given as 0.9 and 0.3, respectively. These sample plates are gray.

In processing of step S10, the reading unit 14 is moved to the position of the first reference density sample plate 91 having a high density (i.e., the quantity of reflected light is small) to read the density of this sample plate. This read signal (i.e., a signal corresponding to the signal 126Bk since the sample is gray in this embodiment) is detected by a CPU 101. The offset regulation signal 151 is output to the amplifier 135 so that a signal representing a light reception quantity becomes zero. The amplifier 135 is arranged so that its offset and gain are regulated. In accordance with the offset regulation signal 151, the offset can be regulated so that an output obtained upon reading of the first reference density sample plate 91 becomes zero. Subsequently, the reading unit 14 is moved to the second reference density sample plate 92 having a low density (i.e., the quantity of reflected light is large) to read the density of this sample plate. The gain regulation signal 152 is output to the amplifier 135 so that its read signal has a maximum output value.

Test patterns are then recorded in step S11, and the same processing as in FIG. 27 is performed.

In unevenness reading processing in step S15, in order to compensate for sensor output differences between colors, a sensor output ratio of the colors is obtained beforehand, a reciprocal number is multiplied with the sensor output by the CPU 101 in unevenness reading processing, and unevenness correction is performed on the basis of this product.

This sensor output correction need not be performed by arithmetic operations in the CPU 101, but can be performed by a unit connected to the input of the CPU 101.

When the A/D converter 127 comprises, e.g., an 8-bit A/D converter, an output value of each color must be converted into 8-bit digital data of the dynamic range. This is very effective against a decrease in resolution of the read data of each color.

Figure 52:
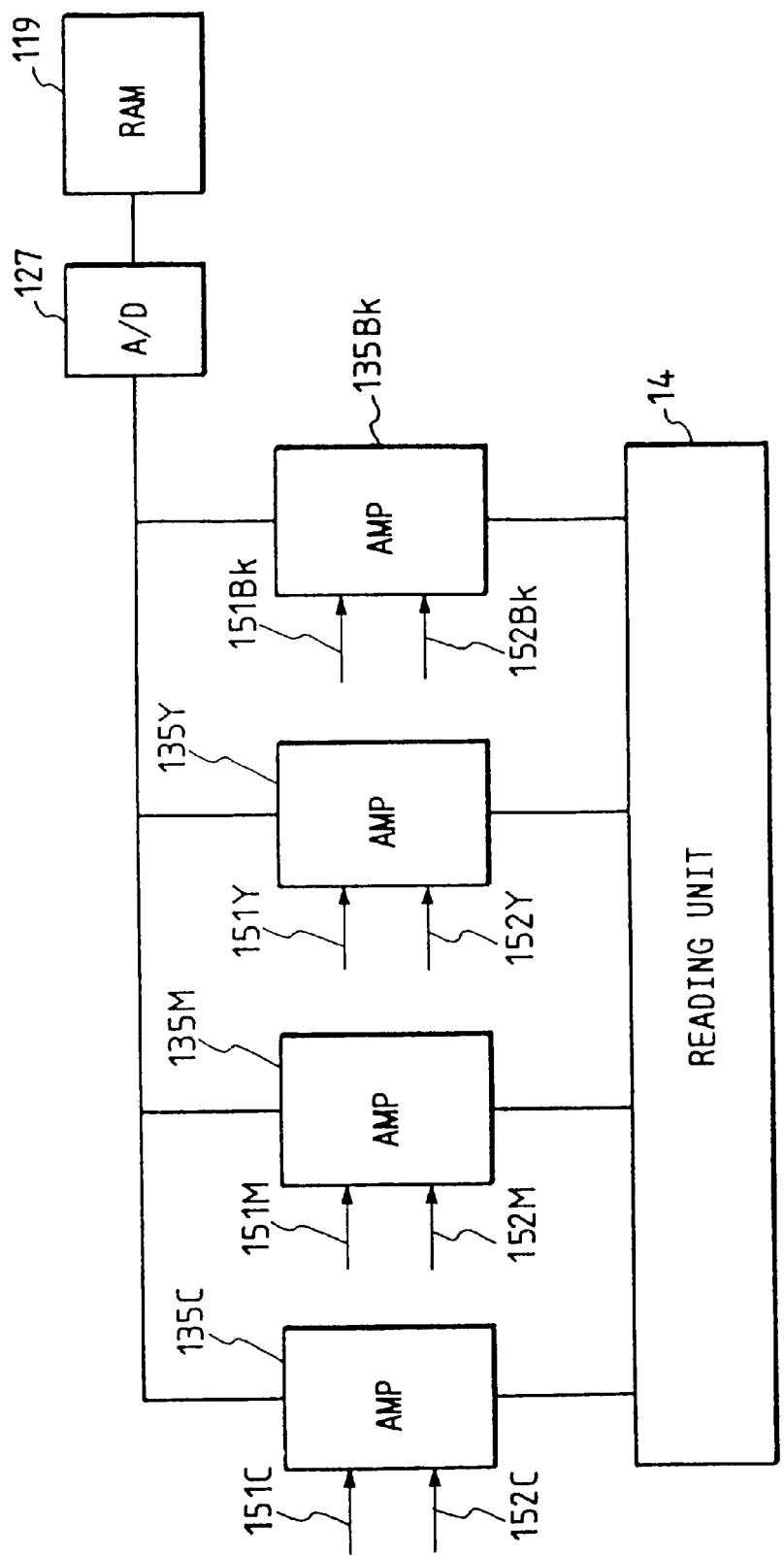
FIG. 52 is a block diagram showing an arrangement for correcting differences in outputs in accordance with colors of unevenness reading sensors.

As shown in FIG. 52, amplifiers 135C, 135M, 135Y, and 135BK are arranged to amplify read signals of the respective colors. Offset regulation operations of the respective amplifiers 135C, 135M, 135Y, and 135BK are performed in accordance with signals 151C, 151M, 151Y, and 151Bk, respectively. At the same time, gains of these amplifiers 135C, 135M, 135Y, and 135BK are appropriately regulated in accordance with signals 152C, 152M, 152Y, and 152Bk. Sensor output values of the read signals of the respective colors in FIG. 36A are matched to be almost equal to each other, as shown in FIG. 36B. The A/D conversion read signal width of the read signals can be reduced as a whole. Therefore, the resolution of the read data in 8 bits can be increased, and read precision car be further improved.

Unevenness correction is performed in step S17 of FIG. 51 as in FIG. 27.

In this embodiment, as described above, the standard density plates are read prior to reading of uneven image densities, thereby regulating the offset and gain of the amplifier. For this reason, a stable output can always be obtained. In addition, since offset and gain regulation operations are performed by using standard density plates having densities close to the unevenness correction patterns without using the perfectly white and black plates, a density read resolution can be greatly increased. For example, when read data is processed in units of 8 bits (256 steps), and a white plate having a density of 0.07 and a black plate of 1.50, a resolution per bit is 0.0056 (~{1.50–0.07}/256). However, as in this embodiment, the gray standard density plates having densities of 0.3 and 0.9 are used, the resolution can be increased to 0.0023 (~{0.9–0.3}/256). As a result, a very small uneven image density can be detected and corrected, thereby performing high-precision unevenness correction.

Figure 53:
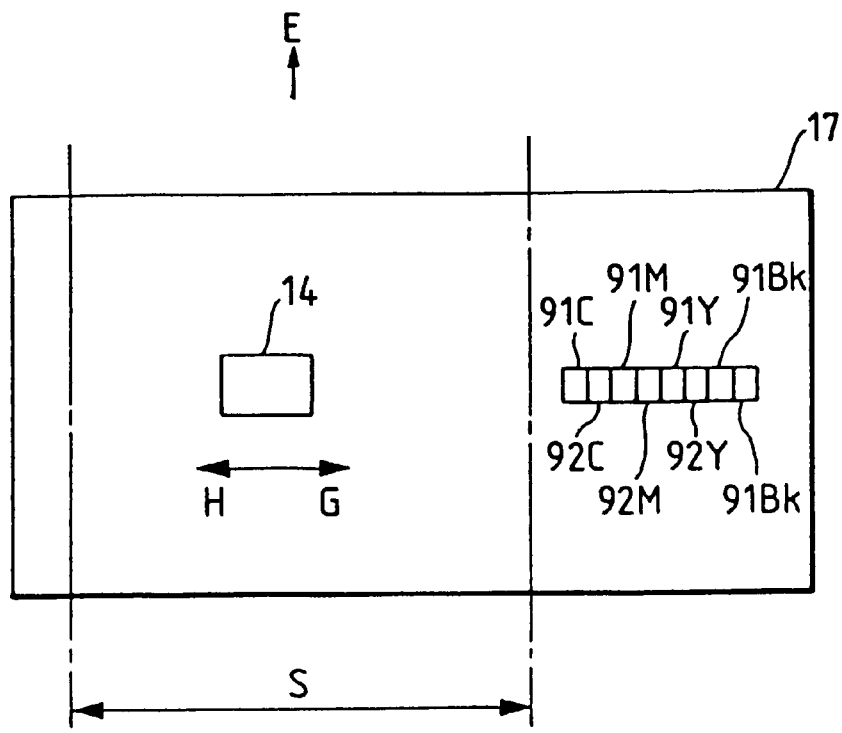
FIG. 53 is a plan view showing another reference density sample formed on a reading platen.

A modification of the seventh embodiment described above will be described below. FIG. 53 is a plan view of the platen 17 portion used in this embodiment. The same reference numerals as in FIG. 49 denote the same parts in FIG. 53.

In this modification, four standard density sample plates are yellow, magenta, cyan, and black sample plates and are selectively used in accordance with the color of a head subjected to unevenness correction. Referring to FIG. 53, first and second reference cyan density sample plates 91C and 92C have densities slightly higher than and lower than that of the test pattern formed by the cyan head 1C, respectively. The reading unit 14 reads the first standard density sample plate 91C, and offset regulation is performed so as to nullify the output from the reading unit 14. The reading unit 14 reads the second standard density sample plate 92C, and gain regulation is performed to maximize the output from the reading unit 14. Thereafter, the cyan head prints a test pattern as a halftone having a print duty of 50%, and the reading unit 14 reads an unevenness distribution, thereby rewriting the unevenness correction data of the cyan head.

Similarly, standard density sample plates 91M and 92M, 91Y and 92Y, and 91Bk and 92Bk are of magenta, yellow, and black, respectively. As in the cyan pattern, the offset and gain regulation operations are performed, the unevenness distribution of the heads of these color components, and unevenness correction data are rewritten.

In the seventh embodiment described above, common standard density sample plates are used for the respective color components. For this reason, the density of the standard density plate having a lower optical density is preferably set to have a density slightly lower than that of the unevenness correction color test pattern having the lowest density. The standard density plate having a higher optical density is preferably set to have a density slightly higher than that of the unevenness correction color test pattern having a highest density. In this case, a density difference between these two standard density plates cannot be reduced. However, in this modification, a density difference between the paired standard density plates can be reduced to further improve reading precision.

Assume that the above technique is applied to the control system shown in FIG. 50. In this case, the standard density sample plates of a given color are read prior to reading of the test pattern of the corresponding color, and the offset and gain of the amplifier 135 are regulated. When the above technique is applied to the control system in FIG. 52, the standard density sample plates of all colors are read in advance, and the offset and gain values of the amplifiers 135C to 135Bk are regulated.

As another modification, halftone patterns formed on the recording medium 2 are used in place of the standard density plates.

Figure 54:
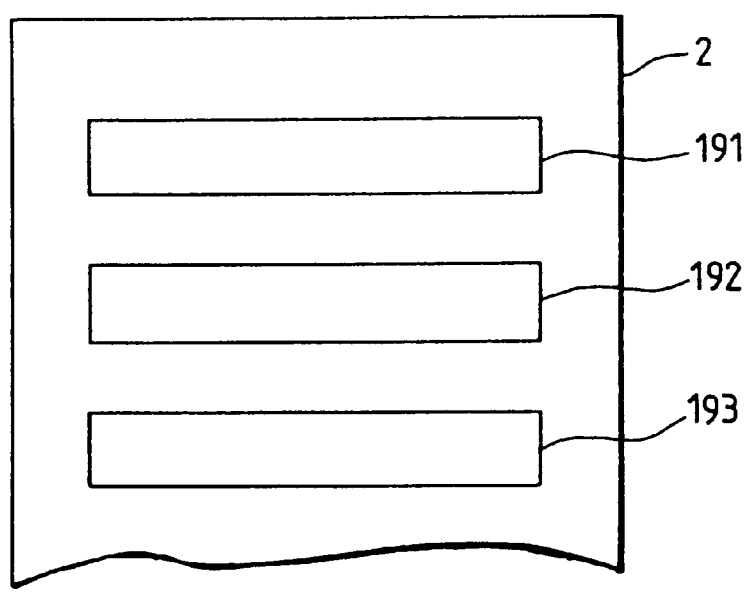
FIG. 54 is a plan view showing a reference density sample formed on a recording medium.

FIG. 54 shows unevenness correction patterns used in this embodiment. A halftone pattern 191 having a duty of 70% serves as the first standard density sample pattern. A halftone pattern 192 having a duty of 30% serves as the second standard density pattern. A halftone pattern 193 has a duty of 50%. The recording medium 2 having the test patterns thereon is fed in the E direction in FIG. 12A. When the pattern 191 reaches the position of the reading unit 14, the halftone pattern having a duty of 70% is read, and offset regulation is performed so that an output from the reading unit 14 becomes zero.

A halftone pattern having a duty of 30% is read when the pattern 192 reaches the reading unit 14. The gain is regulated so that an output from the reading unit 14 becomes maximum. Subsequently, an uneven image density of the halftone having a duty of 50% is read while the pattern 193 is being fed. The unevenness correction data are rewritten, as previously described.

With the above operation, the standard density plates need not be used, and the reading unit 14 need not be moved outside the range S.

The patterns 191 and 192 are formed for only one color (e.g., Bk). Alternatively, these patterns may be formed for all colors, as described with reference to FIG. 53. The duties of these patterns can be arbitrarily selected. When unevenness correction data are to be rewritten upon reading of the halftone having a duty of 50%, halftone patterns having duties of 60% and 40% are used for offset and gain regulation operations, respectively. Reading precision can be further improved as compared with the case wherein halftone patterns having densities of 70% and 30% are used.

The seventh embodiment of the present invention is also applicable to the serial printer shown in FIGS. 39 to 44. In this case, offset and gain values of a reading system including sensors 217C to 217BK and amplifiers 235C to 235BK must be regulated.

In the above embodiment and modifications, the offset and gain values are regulated by appropriate halftone patterns. These operations may be performed by using the standard density plates shown in FIG. 49 or 53.

As described above, according to the present invention, at least one of the first and second standard density samples is read, and at least one of the offset and gain values of the read means is regulated in accordance with a read result. Stable reading and accurate uneven image density correction can be performed even if a simple, low-cost read means is used.

The first standard density sample has an optical density higher than that of the test pattern, and the second standard density sample has an optical density lower than that of the test pattern. Therefore, reading precision can be improved, and a very small uneven image density can be corrected.

The eighth embodiment of the present invention will be described below.

Figure 55:
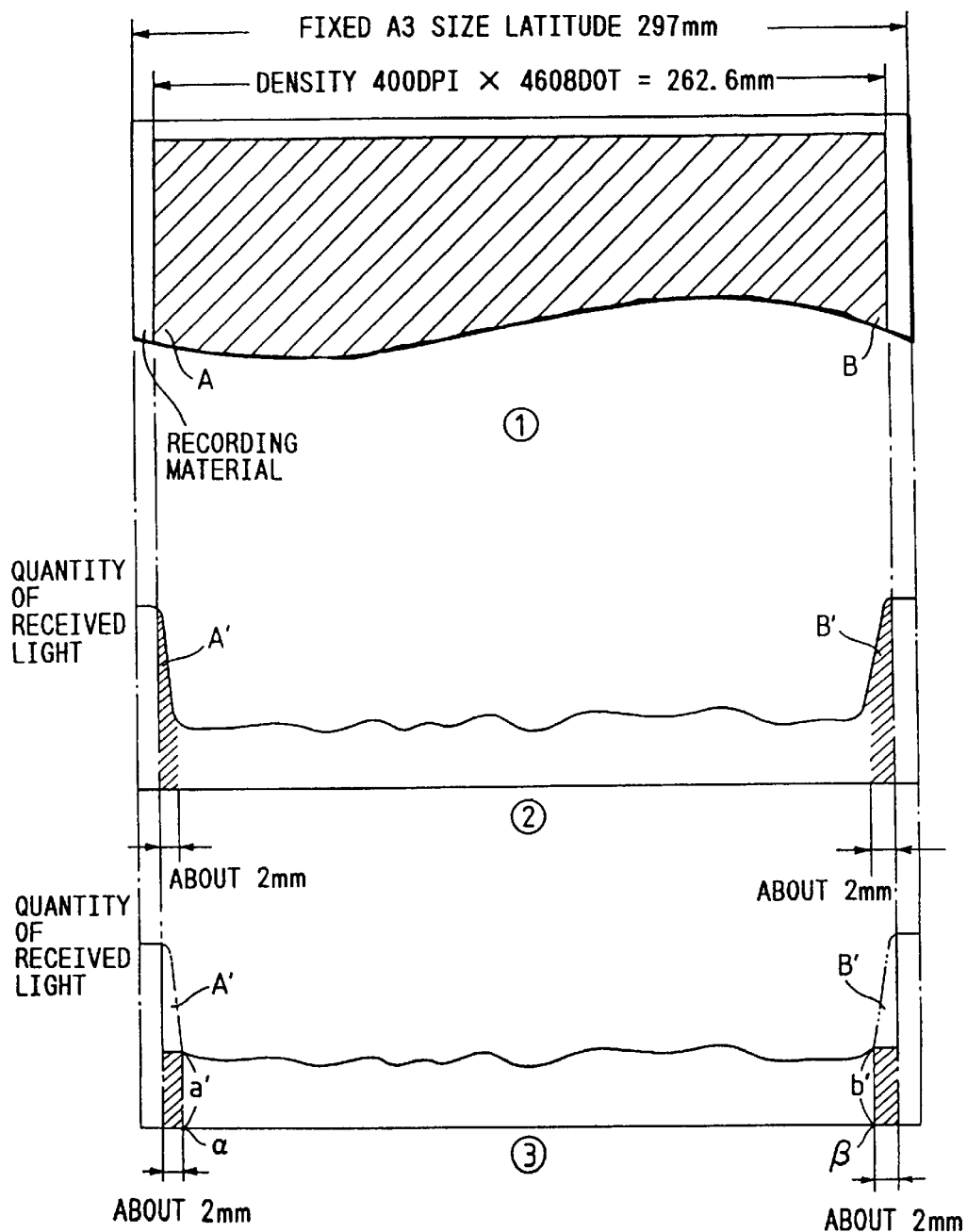
FIGS. 55 to 57 are views for explaining the eighth to tenth embodiments of the present invention, respectively.

FIG. 55 is a view for explaining the eighth embodiment of the present invention.

A distribution of light reception quantity of an optical sensor which receives light reflected by a test pattern ① (all the recording elements are driven by the same drive signal) in FIG. 55 is shown in ② in FIG. 55. When the light quantity data thus obtained is directly used, both end portions of the corrected image have higher densities, as previously described. When light quantity data for portions A' and B' in ② in FIG. 55 are set equal to those (a' and b') of the portions corresponding to the adjacent recording elements (or a recording element group), as shown in ③ in FIG. 55, the above drawback can be solved. More specifically, for example, of the light quantity distribution data stored in a memory, data corresponding to the portions A' and B' are converted into a' and b'. This processing can be executed by software when addresses α and β of the adjacent portions, the data a' and b' of which are stored in the memory, are designated because the addresses of the light quantity distribution data are predetermined.

In the eighth embodiment, light reception quantity data of a portion measured to have a lower density than that of the actually recorded image is substituted with light quantity data spatially equivalent to light quantity data free from errors. An increase in density of image portions recorded by the two end recording elements can be prevented and therefore the densities in the image are made uniform. This substitution scheme cannot have a level obtained by ideal uneven image density correction processing by using the recording heads because actual density data of the end portions cannot be obtained. For this reason, an arrangement for improving this will be described with reference to the ninth embodiment as follows.

Figure 56:
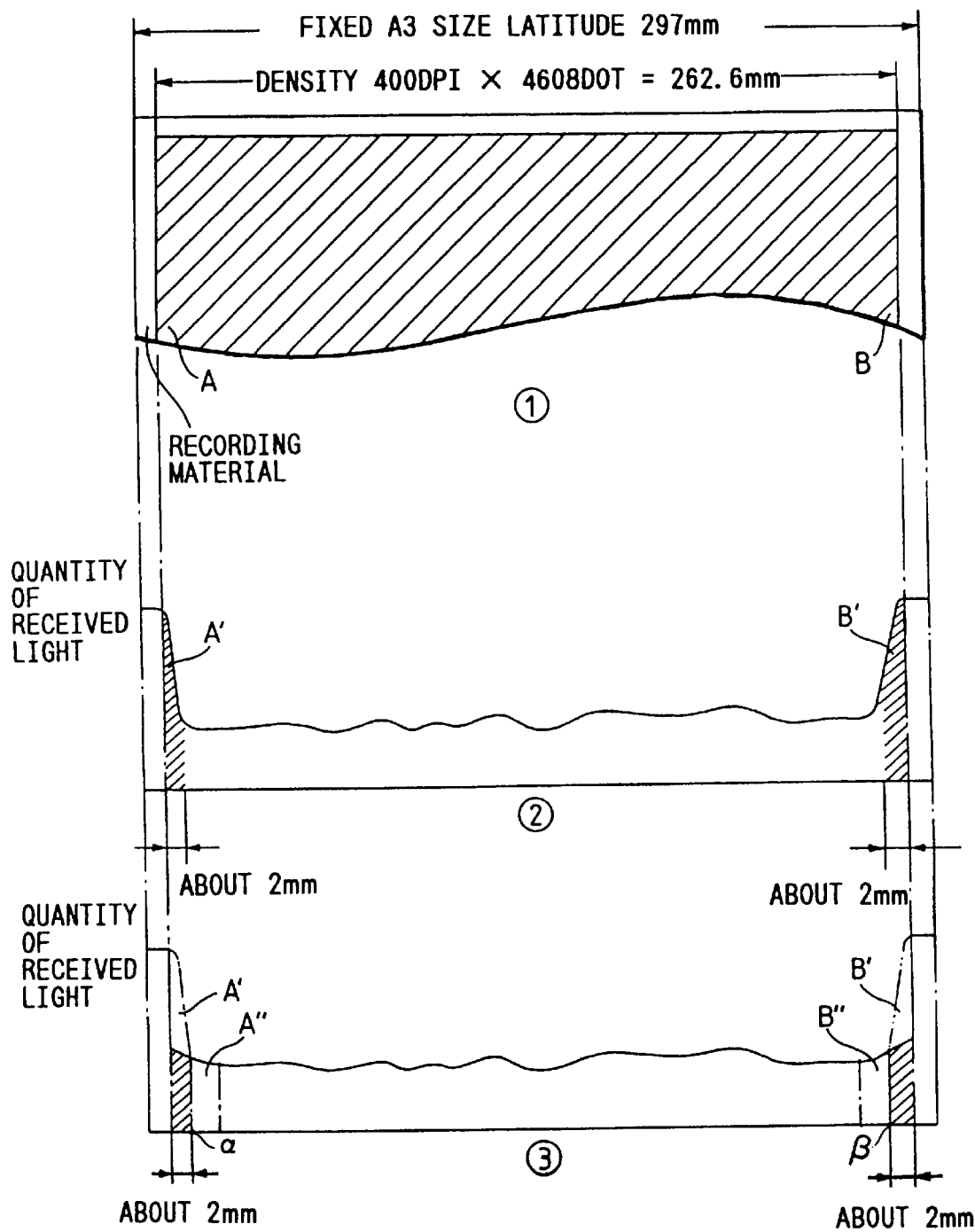

FIG. 56 is a view equivalent to FIG. 55. In the ninth embodiment, as is apparent from ③ in FIG. 56, light quality data of portions A' and B' susceptible to a flare influence are substituted with values estimated from data close to α and β. More specifically, the light quantity data of the portions A" and B" are linearly approximated by the method of least squares, and the resultant line is extrapolated to obtain data as corrected light quantity data.

With the above processing, uneven image densities of the flared portions A' and B' can also be corrected to some extent. Therefore, the density is made uniform.

In the ninth embodiment, the light quantity data of the portion susceptible to the flare influence is estimated from spatially close data. In the tenth embodiment, a more accurate estimated value can be obtained.

Figure 57:
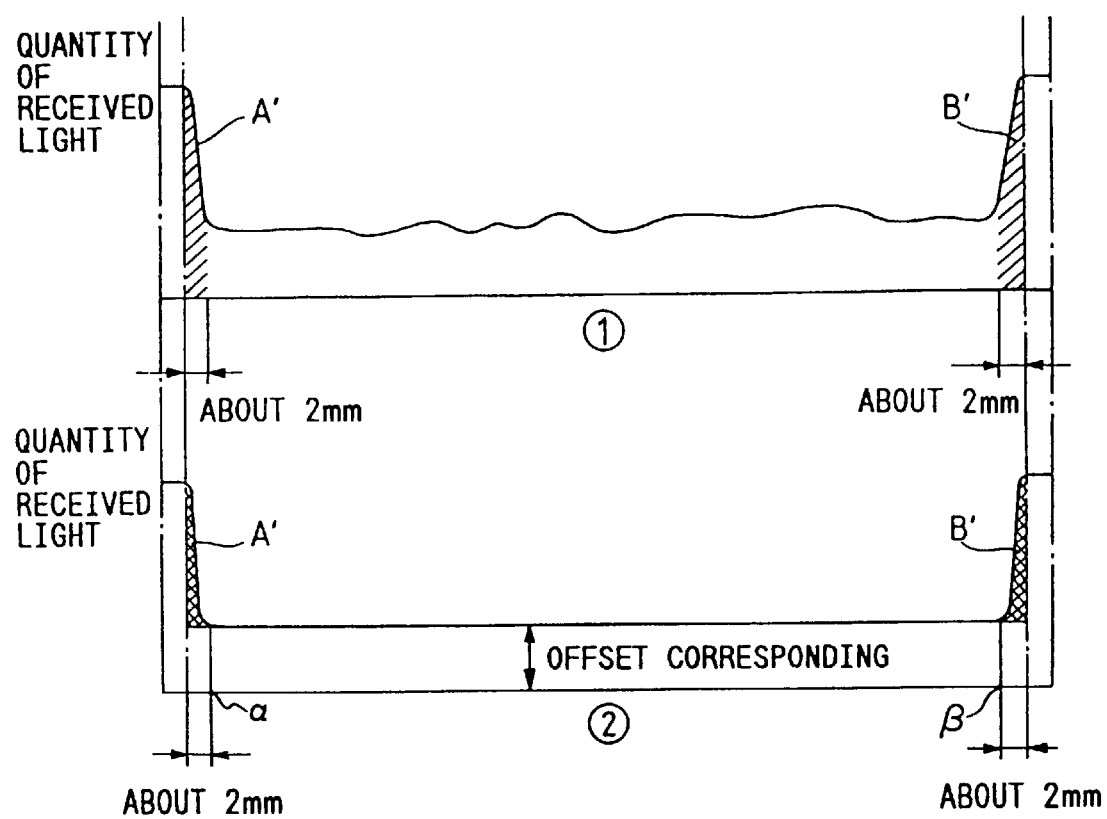

A light quantity distribution obtained by reading a test pattern recorded at a predetermined print duty is shown in ① of FIG. 57. A light quantity distribution obtained upon reading of a test patch (i.e., a patch having no uneven image density by controlling an optical density: the patch is obtained by a printing operation and the size of the patch is equal to that of the above test pattern) having an optical density almost equal to that of the test pattern recorded at the above print duty is shown in ② in FIG. 57.

A correction value is calculated by using the above-mentioned algorithm using data obtained such that the data obtained by subtracting an offset component from the light quantity distribution data of ② of FIG. 57 (i.e., all the read data are given as a predetermined value of "0" because portions except for the portions A' and B' have a predetermined density) is subtracted from the light quantity distribution data ①. The crosshatched portions A' and B' in ② in FIG. 57 correspond to an influence amount and an unnecessary information amount from the recording medium. In practice, the above test patch is read, and data obtained by subtracting an offset component from the read data is stored (apparently, only the portions A' and B' are required). The value stored in the memory is subtracted from the data of the portions A' and B' of the light quantity distribution data obtained upon reading of the test pattern. That is, an unnecessary information amount influenced by a recording end portion is stored in advance and is subtracted from the read density information of the end portion, thereby accurately obtaining actual density information. This scheme is also incorporated in the present invention.

By using the resultant light quantity distribution data, uneven image density correction is performed using the algorithm described above. The uneven image density of this portion can be properly corrected without causing an undesirable increase in density at two end portions of the image. In the calculation using ②of FIG. 57, uneven image density correction processing using, as an uneven image density quantity, a difference between the density data of the area A' in ① and the density of the area A' in ② as the reference density is also incorporated in the tenth embodiment. The recording medium background is not limited to the one described above. For example, when three test patterns are printed and only the central pattern is to be read, the principle of the eighth to tenth embodiments can be employed. In particular, in the tenth embodiment, a pattern formed in advance is a uniform density data pattern, and the calculation is further facilitated.

The present invention is not limited to the particular embodiments described above. Various erroneous information elimination means can be employed.

Figure 58:
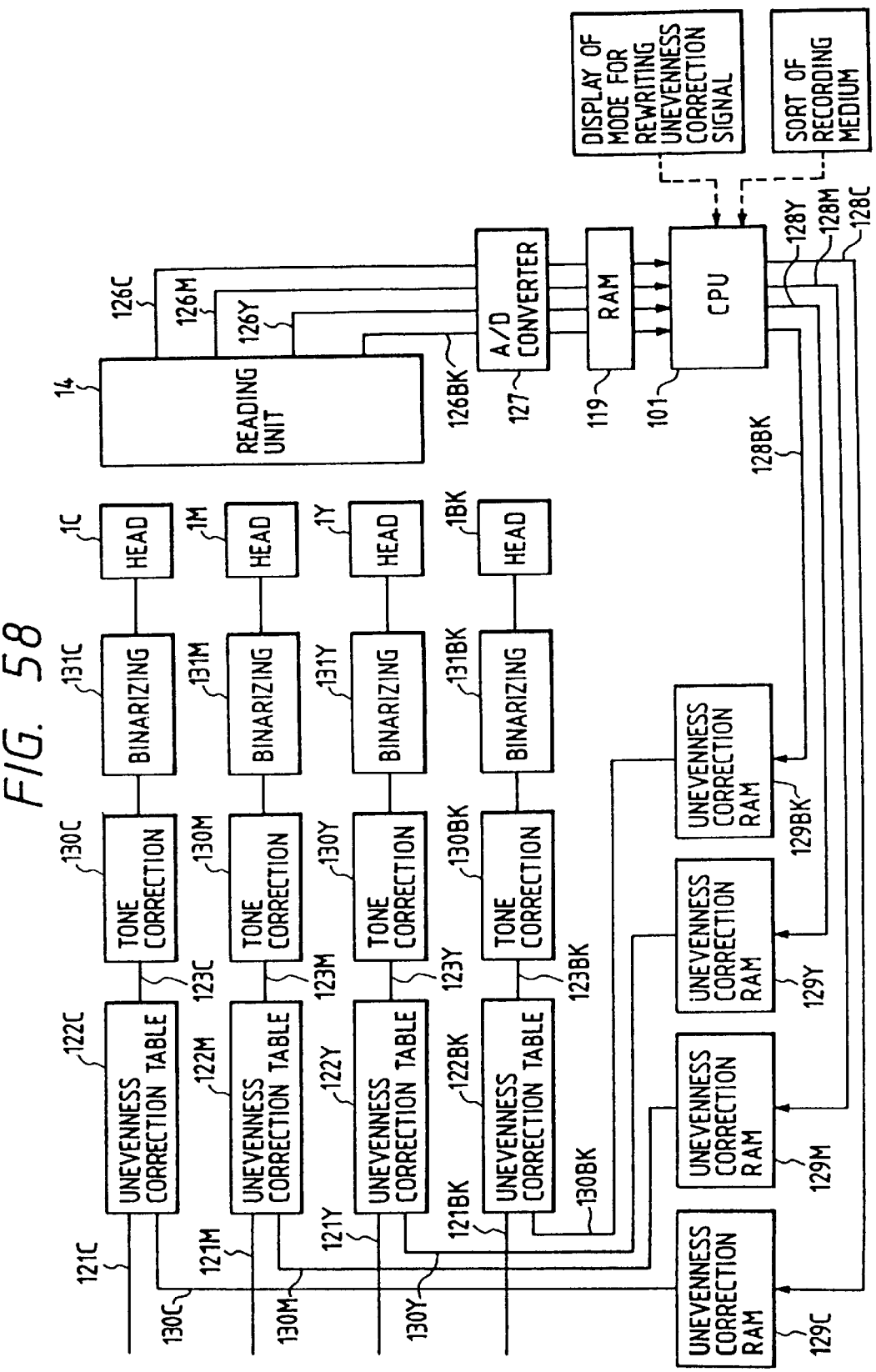
FIGS. 58 and 59 are a block diagram and a flow chart, respectively, for explaining unevenness correction processing.
Figure 59:
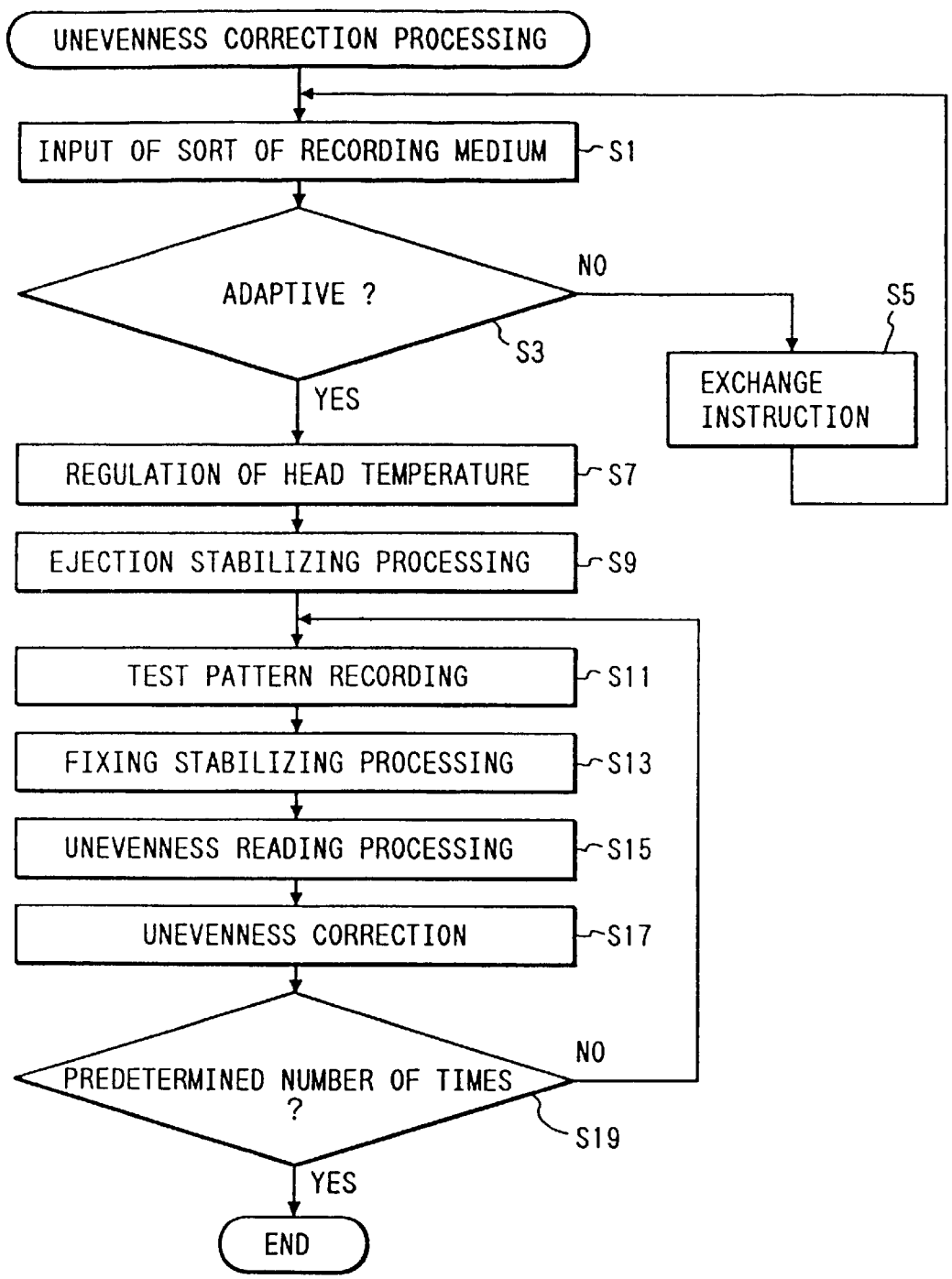

The mechanical structures and the reading systems of the eighth to tenth embodiments are the same as those of the first embodiment, and a detailed description thereof will be omitted. The control system and the unevenness correction sequence are basically the same as those of the first embodiment of FIGS. 25 and 27, as shown in FIGS. 58 and 59, and a detailed description thereof will be omitted.

According to the present invention, as is apparent from the above description, of all the test pattern densities read by the read means, the read densities of the portions recorded by the end recording elements of the recording element array are corrected by the end correcting means, so that the density of each end portion is almost equal to that of the central portion. In addition, accurate density information can be obtained from both ends of the test pattern to be read. Influences caused by the background density of the recording medium and adjacent erroneous information except for the test pattern can be eliminated.

As a result, uneven image density correction is performed on the basis of the corrected read values, and normal image formation is performed on the basis of this. In this case, the image end portions are prevented from being recorded at a low or high density.

Since correction on the basis of the accurate density information of the end portions can be accurately performed and the target reference values can be accurately set by utilizing the present invention, both non-injection detection except for that in unevenness correction and discrimination of a boundary can be performed.

The eleventh embodiment of the present invention will be described below.

Figure 60:
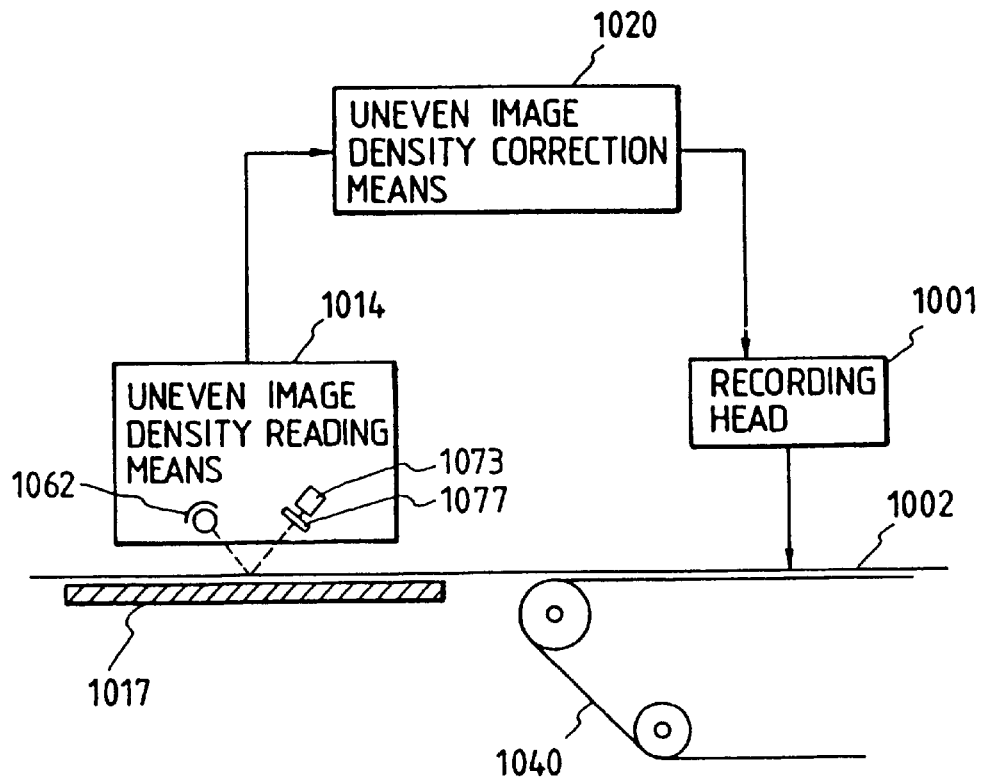
FIG. 60 is a view showing the eleventh embodiment of the present invention.

FIG. 60 is a schematic view showing a main part of this embodiment. The same reference numerals as in the first embodiment of FIG. 11 denote the same parts in the eleventh embodiment of FIG. 60, and a detailed description thereof will be omitted.

Referring to FIG. 60, an uneven image density read means 1014 reads a test pattern formed on a recording medium 1002 by a recording head 1001 so as to correct an uneven image density of the recording head 1001. The uneven image density read means 1014 includes a light source 1062 for illuminating light on the surface of the recording medium, a sensor 1073 for receiving light reflected by the surface of the recording medium, and an appropriate converter. The uneven image density read means 1014 is mainly scanned in a direction corresponding to the orifice array direction of the recording head 1001. An uneven image density correction means 1020 corrects drive conditions of the recording head in accordance with uneven image densities read by the test patterns. A platen 1017 regulates the recording medium flat at a test pattern read position.

A means 1077 determines a read range at each main scanning position on the recording medium 1002 read with the reading sensor 1073. The means 1077 is constituted by a member having an aperture having an appropriate size in front of the light-receiving surface of the sensor, or by a light-receiving surface itself having an appropriate size.

The mechanical structure, the reading system, the control system, and the unevenness correction sequence of this embodiment are basically the same as those of the first embodiment, and only different parts will be described below.

The reading system of this embodiment is the same as that shown in FIGS. 13 to 15. In this embodiment, the read range at each scanning position is appropriately determined so as to eliminate the following drawback.

When the length in the direction corresponding to the recording element array direction within the read range (i.e., the main scanning direction G of the reading unit in this embodiment, that is, the direction perpendicular or almost perpendicular to the moving direction E of the recording medium) is large, read signals reflect the recording characteristics of a large number of recording elements. For this reason, fringe-like uneven image densities having high spatial frequencies cannot be detected. In this case, the length in the main scanning direction is preferably small. When the length in the E direction is not sufficiently large, the uneven image densities cannot be accurately read due to an influence by a difference in dots recorded during the read area at the respective scanning positions of the reading unit 14 and by a shortage of the light reception quantity of the sensor.

Figure 61:
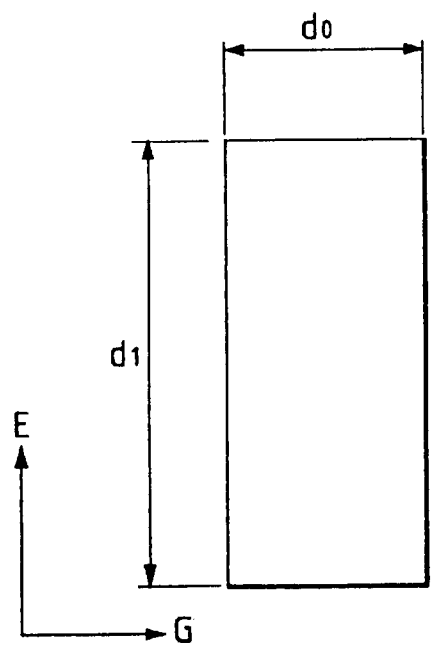
FIG. 61 is a view for explaining a reading unit of the eleventh embodiment.

As shown in FIG. 61, assume that read area dimensions in the main scanning direction and the sub-scanning direction are given as $d_0$ and $d_1$ which can solve the above drawback, and that condition $d_0 < d_1$ is obtained. In order to determine the dimensions of the area, the size of the light-receiving surface of the sensor is appropriately set in this embodiment. For example, in a recording head having 4736 orifices and operated at 400 dpi, the uneven image densities can be considerably accurately read under the conditions that $d_0 = 0.8$ mm and $d_1 = 2$ mm. The size of the light-receiving surface can be appropriately determined in accordance with these conditions. In this embodiment, the light-receiving surface has a rectangular shape defined such that the length of the light-receiving surface of the sensor in the sub-scanning direction is larger than that of the main scanning direction.

By using the sensor 73 having the light-receiving element having a sub-scanning length larger than a main scanning length, the above problem as inaccurate reading of the uneven image density can be solved. Therefore, the uneven image densities can be properly corrected, and a high-quality image can be obtained.

In this embodiment, since correction precision is determined by the main scanning length of the light-receiving surface of the sensor 73, it is difficult to correct an uneven image density having a period smaller than the main scanning length. As a modification of this embodiment, in order to cope with this problem, a sensor itself has a light-receiving surface having a predetermined large size, e.g., 2 mm in the main scanning direction and 2 mm in the sub-scanning direction. At the same time, an aperture member having a main scanning length of 0.25 mm and a sub-scanning direction of 2 mm can be arranged just in front of the light-receiving surface.

By arranging this member, uneven image densities having higher spatial frequencies can be corrected. When the sub-scanning length of the mask is larger than the main scanning length, problems caused by a difference in dots and a shortage of light quantity are not posed.

An arrangement capable of more accurately reading an uneven image density than the above modification will be described below. In this case, the arrangement of a reading system is equal to that of the above modification. In this embodiment, however, scanning of the reading unit is not limited to once. After the first scanning is performed, the test pattern is shifted by 2 mm (i.e., a sub-scanning length of the reading area), that is, the recording medium 2 is shifted by 2 mm in the E direction, the second scanning is performed to read the uneven image density. By averaging these two uneven image density data, the sub-scanning length of the read area is increased as an apparent length according to an experiment of the present inventors. The scanning operations for reading uneven image densities are performed a plurality of times, and the resultant data are averaged to more accurately read the uneven image densities and perform more accurate uneven image density correction.

When color image recording is to be performed by using three color heads, i.e., cyan (C), magenta (M), and yellow (Y) heads, or four color heads, i.e., cyan (C), magenta (M), yellow (Y), and black (Bk) heads, and when uneven image density data are to be rewritten, correction test patterns are preferably recorded by using the corresponding heads, unevenness values of these test patterns are preferably read, and the unevenness correction data of these heads are preferably rewritten. As described above, when light passing through a filter is used, a total light reception quantity is decreased, but the dynamic range is widened, thereby improving unevenness reading precision. The arrangement for switching the color filters shown in FIG. 19 can be applied to this embodiment. In this case, a color filter switching portion 79 can be pivoted about a shaft 79A to properly and selectively locate an R filter 77R, a G filter 77G, BL filter 77BL, or a BK aperture (no filter) 77BK on an optical path to the sensor 73 during reading of the test pattern of each color. These filters can be selectively positioned during reading of a corresponding test pattern. In this embodiment, the shape and size of the light-receiving surface of the sensor 73 can be appropriately determined. Each filter or an aperture itself also serves as the mask, and its shape and size can be determined as described above.

With this arrangement, the single uneven image reading sensor 73 and the light source 62 can accurately perform unevenness correction of each color.

When the shape and size of the light-receiving surface are determined as described above, the position of the filter is not specified if it is located on an optical path L from the light source 62 to the sensor 73. On the other hand, when the filter or aperture itself also serves as a mask, it is preferably located in front of the light-receiving surface.

As described above, according to the present invention, the read area at each main scanning position of the reading means for mainly scanning the recording medium to read the test patterns in a direction corresponding to the recording element array direction is defined such that the sub-scanning length is larger than the main scanning length, so that fringe-like uneven image densities having high spatial frequencies and appearing in the array direction by variations in recording elements can be read. At the same time, an influence caused by a difference in dot counts on the test patterns and an influence caused by a shortage of the reception light quantity can be eliminated. Therefore, the uneven image densities can be accurately read and can be accurately corrected on the basis of the read result.

The twelfth embodiment of the present invention will be described below.

Figure 62:
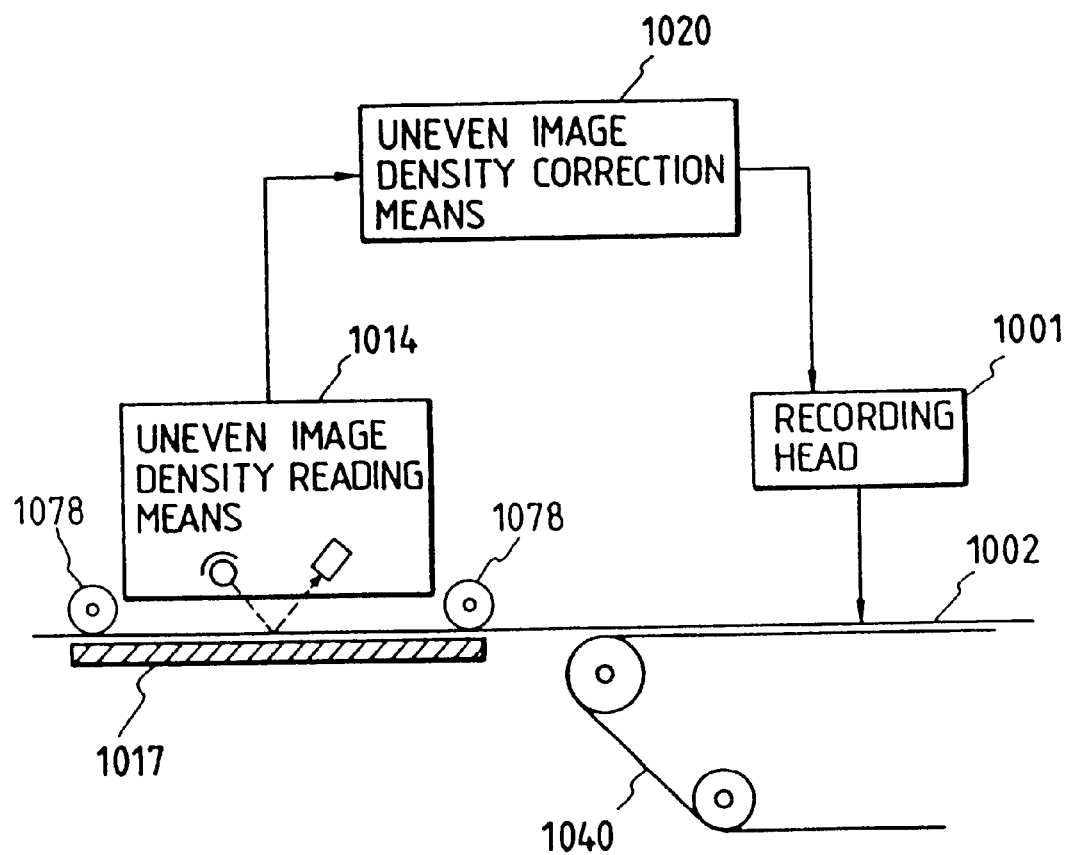
FIG. 62 is a view showing the twelfth embodiment of the present invention.

FIG. 62 is a schematic view showing the main part of this embodiment. The same reference numerals as in the first embodiment of FIG. 11 denote the same parts in the twelfth embodiment of FIG. 62, and a detailed description thereof will be omitted.

A press member 1078 associated with a press means of the main part of this embodiment is disposed near a read position of an uneven image density read means 1014. The press member 1078 brings a recording medium 1002 into contact with a platen 1017 to prevent floating of the recording medium 1002 and allow an accurate, stable reading operation. This press member 1078 can take a form of a roller or plate. A normal convey technique for conveying a recording area to the platen 1017 by air suction or electrostatic attraction is available. This technique, however, is effective only in a normal recording area and is not applied to a downstream side in the convey direction.

The press member of the present invention includes an arrangement in which the air suction convey area extends to this read area, or electrostatic attraction is performed again to uniform the contact state in the read area. In particular, when a press member such as a roller or plate is arranged near the read position, floating of the recording medium can be prevented with a simple structure.

This member may also serve as a color filter for reading a test pattern in units of colors, depending on forms of the press members. As shown in FIGS. 15 and 16, the press member may be integrally formed with the uneven image density read means 1014. In this case, the press member may be displaceable in accordance with the thickness of the recording medium 1002, so that a gap between the recording medium 1002 and the read means 1014 may be kept constant regardless of changes in thickness of the recording medium. Alternatively, the press member and the uneven image density read means 1014 may be separately formed. If the gap is not taken into consideration, the uneven image density reading means 1014 is fixed in the vertical direction. However, if the gap must be taken into consideration, only the read means 1014 can be displaceable in the vertical direction.

The mechanical structure, the reading system, the control system, and the unevenness correction sequence are basically the same as those of the first embodiment, and a detailed description thereof will be omitted.

According to the present invention, as described above, since uneven image density reading which inhibits floating of the recording medium can be performed, an accurate, stable reading operation can be performed. Therefore, precision of uneven image density correction can be improved.

Figure 63:
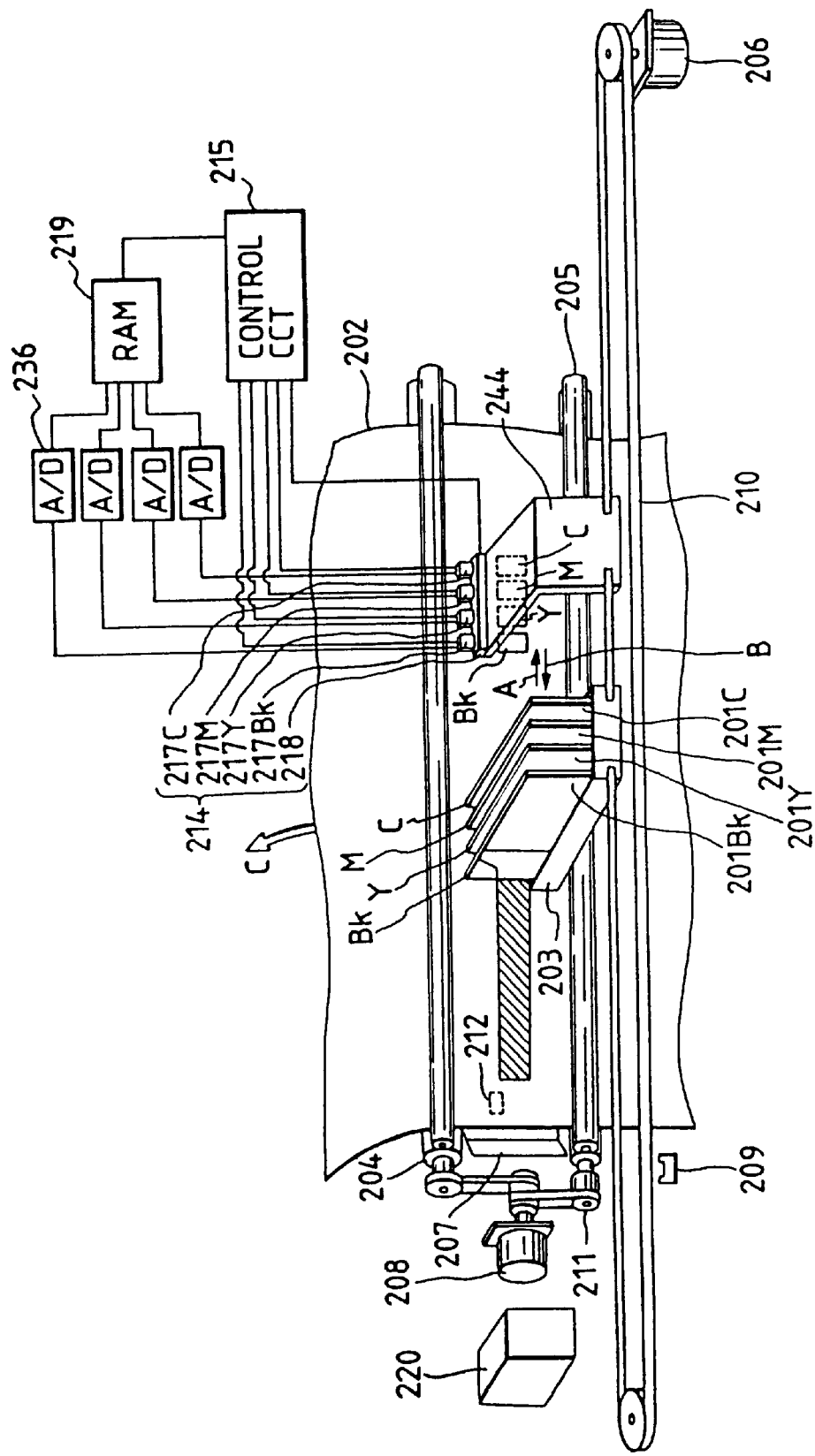
FIG. 63 is a view showing the thirteenth embodiment of the present invention.

The thirteenth embodiment of the present invention will be described below. FIG. 63 is a view showing a mechanical structure of this embodiment. The same reference numerals as in FIG. 39 denote the same parts in FIG. 63, and a detailed description thereof will be omitted Referring to FIG. 63, an uneven image density reading unit 214 reads test patterns printed on a recording medium 202 upon application of a uniform image signal to recording heads 201C to 201BK and outputs read signals. In this embodiment, the uneven image density reading unit 214 is fixed on a main scanning belt 210 through a holder 244 and performs reading on a platen 207. In this case, the recording heads and the reading unit are interlocked, so that a distance therebetween is kept to be a predetermined distance. This distance is determined not to cause the reading unit to receive an influence of an ink mist flying from each recording head. If this influence can be effectively eliminated, the reading unit may be mounted on a carriage 203.

In this embodiment, the recording medium 202 on which test patterns are recorded is illuminated with a light source 218, and recording densities of the test patterns recorded on the recording sheet by the respective recording heads are read by sensors 217C, 217M, 217Y, and 217BK.

A control system of the above apparatus by connecting the respective components described above will be described below.

Figure 64:
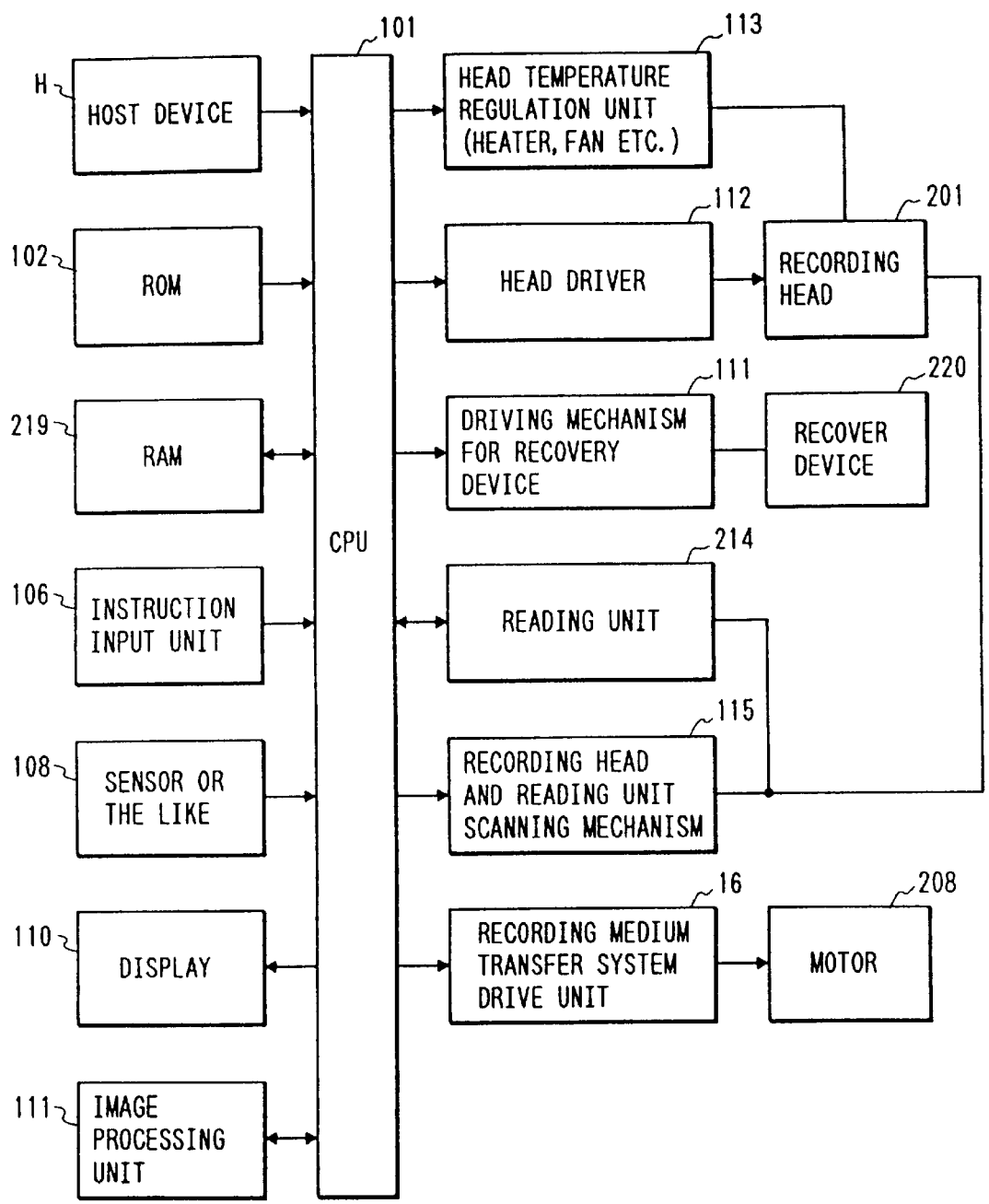
FIG. 64 is a block diagram showing an arrangement of a control system for performing uneven image density correction.

FIG. 64 shows an arrangement of the control system. The same reference numerals as in FIG. 24 denote the same parts in FIG. 64, and a detailed description thereof will be omitted.

A head driver 112 drives ink injection energy generation elements of a recording head 201 (the heads 201Y, 201M, 201C, and 201BK are collectively referred to). A temperature regulation unit 113 performs temperature regulation of the recording head 201. More specifically, the temperature regulation unit 113 includes a heater and a cooling fan arranged for a head 1. A driving mechanism 111 for recovery device is connected to a CPU to drive a recovery device 220. A recording head and reading unit scanning mechanism 115 includes a motor 206 for scanning the recording heads and the reading unit. A recording medium convey system drive unit 16 drives a motor 208 for driving a recording medium convey system.

Of the above units, the system for correcting the uneven image density is basically the same as that shown in FIG. 25, and a detailed description thereof will be omitted.

The unevenness correction sequence of this embodiment is basically the same as that of FIG. 27, and a detailed description thereof will also be omitted.

Figure 65:
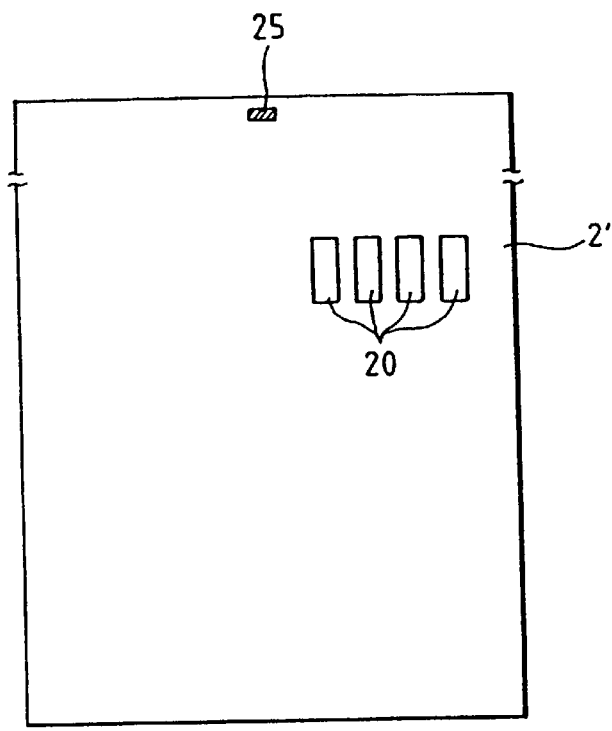
FIG. 65 is a view showing a state wherein an identification mark for performing uneven image density correction is formed on a recording medium in accordance with types of recording media.

FIG. 65 shows a recording medium 2' used for reading unevenness correction in this embodiment. This recording medium corresponds to that shown in FIG. 28. The recording medium 2' has unevenness correction patterns 20 of the respective colors recorded hereon, and a recording medium density identification mark 25. The density identification mark 25 corresponding to a type of recording medium is printed in a leading margin of the recording medium. The identification mark 25 is read by the uneven image density reading unit 214 prior to reading of the unevenness correction patterns at the time of their reading.

Figure 66:
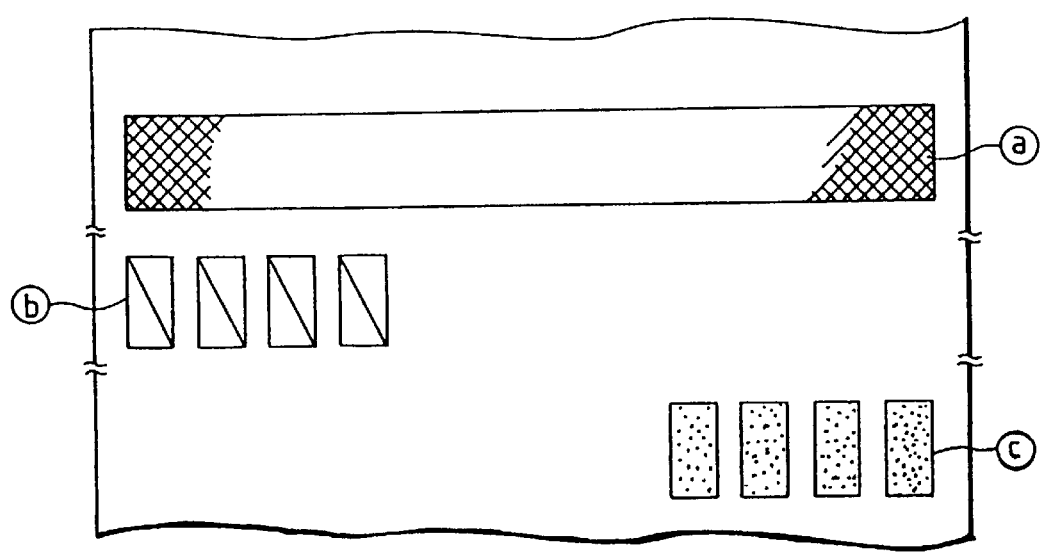
FIG. 66 is a view showing an injection stabilization pattern, an injection defect detection pattern, and an uneven image density correction test pattern, all of which are formed on a recording medium.

FIG. 66 shows recording of an injection stabilizing pattern and corresponds to FIG. 31. A pattern (a) serves as an injection stabilizing pattern. patterns (b) serve as patterns for checking the presence/absence of non-injection (the orifices are sequentially driven from an end orifice while the recording heads are being scanned, thereby forming these patterns). Patterns (c) serve as test patterns. The injection stabilizing pattern is obtained by driving all the orifices of all the recording heads at a print ratio of 100%. When this injection stabilizing pattern is recorded, the head temperature can be stabilized, and an ink supply system can be kept in a stable state, thereby satisfying all conditions for normal recording. The presence/absence of injection errors and the uneven image densities can be accurately detected in an actual recording state.

Operations for recording test patterns and reading uneven image densities of the recorded test patterns according to this embodiment will be described below.

Figure 67:
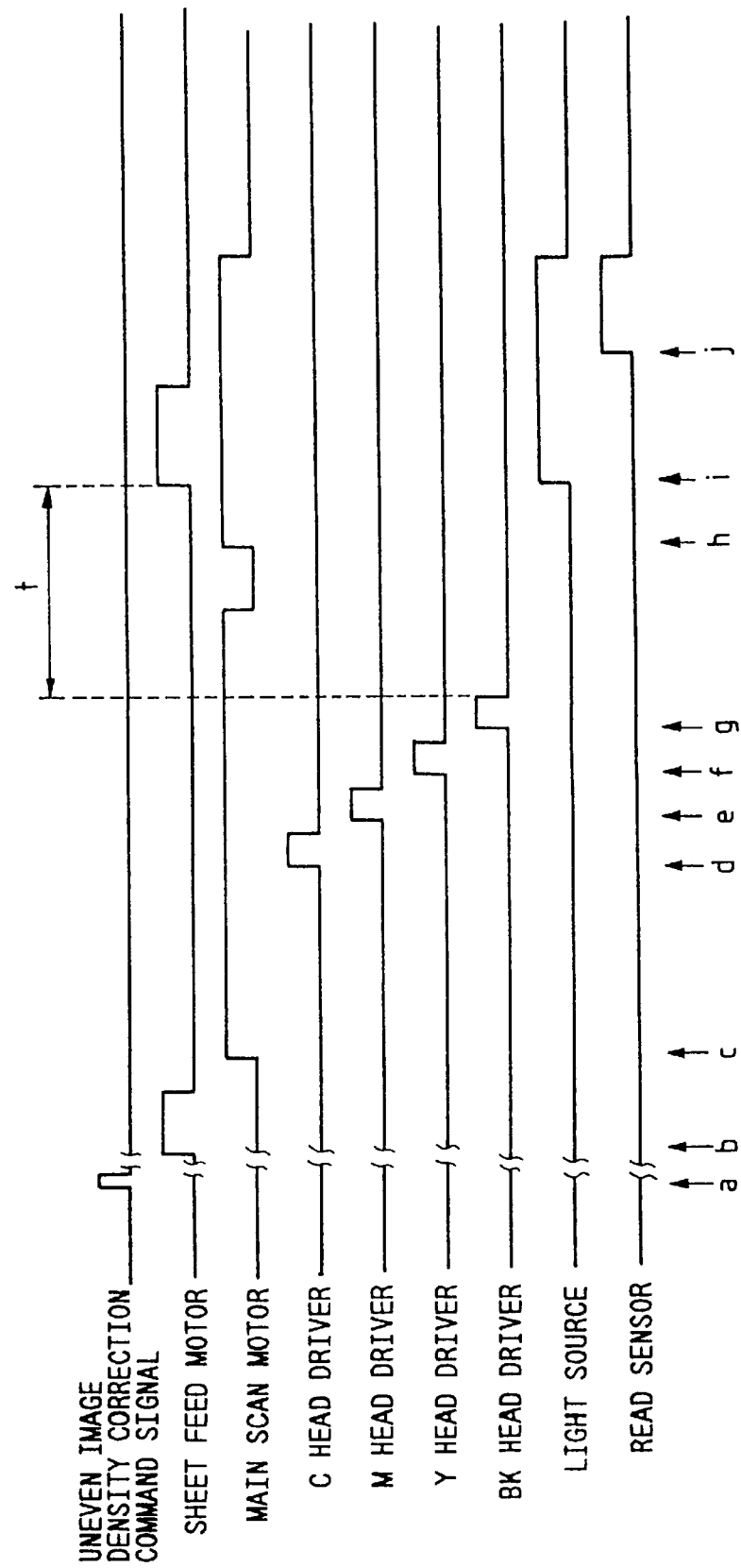
FIGS. 67 and 68 are timing charts showing two operations, i.e., test pattern recording and uneven image density reading.

FIG. 67 is a timing chart showing an operation of the apparatus of this embodiment and corresponds to FIG. 33. An uneven image density correction processing sequence is started at a timing a in FIG. 67. When this sequence is completed, the recording medium 202 is conveyed to an image recording area at a timing b. A main scan motor is driven at a timing c. The drivers for the cyan, magenta, yellow, and black recording heads 201C, 201M, 201Y, and 201BK are driven at timings d, e, f, and g, respectively, thereby recording the test patterns on the recording medium 202. These test patterns are used to read uneven image densities. In this case, all lines represented by the unevenness correction table have a gradient of 1.0, and a state in which no unevenness correction is performed is set. The test patterns can be uniform halftone patterns having print duties of about 30 to 75%.

As previously described, after the state of the unevenness of each test pattern is stabilized, the recording medium is conveyed at a timing i and is stopped when the test patterns reach the scanning range of the reading unit 214. After a timing j, the read sensor is driven to read uneven image densities of test patterns of the respective colors by the reading unit 214.

Figure 68:
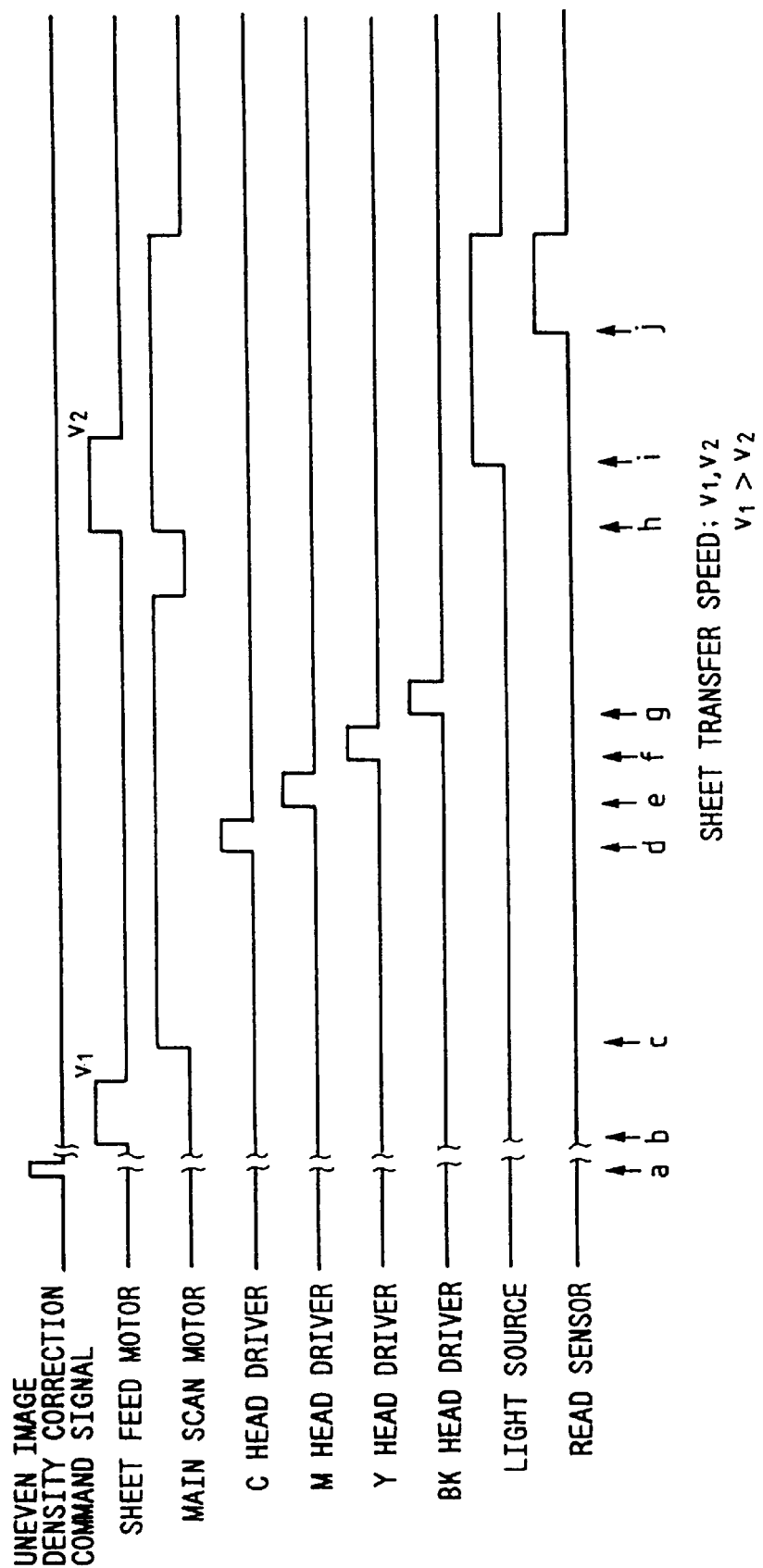

FIG. 68 is a timing chart showing another operation of this apparatus. In this operation, a paper convey speed $v_2$ at the time of conveyance of the recording medium to the uneven image density reading unit 14 upon completion of test pattern recording by the recording heads (time g') is reduced with respect to a convey speed $v_1$ for conveying the recording medium 202 to the recording position, thereby satisfying condition $v_1 > v_2$ and hence obtaining the same effect as in FIG. 67.

In these operations, a fixing stabilizing time is provided to convey the recording medium because a scanning range of the recording head is different from that of the reading unit in FIG. 63. However, the reading unit may be kept stopped for a predetermined period of time during scanning. This is also effective when the scanning range of the recording head is equal to that of the reading unit. However, if fixing stability of the test patterns is not important, the above processing is not required.

As described above, since the uneven image density reading unit is arranged on the carriage or a member interlocked with the carriage, the test patterns can be read on the platen for regulating the recording surface flat. The recording medium can be kept flat, and the distance between the reading unit and the recording medium can be kept constant. In addition, since sub-scanning of the recording medium can be accurately performed, accurate density reading can be performed. Furthermore, a special arrangement for keeping the predetermined distance at the time of test pattern reading need not be used, the apparatus can be made compact. Since the distance between the recording head and the reading unit can be kept to be a predetermined distance, inconvenience (e.g., an ink mist and a thermal influence) caused by an excessively small gap between the recording head and the reading unit can be eliminated to protect the reading sensor. Since a single aperture type sensor is used in place of a line sensor such as a CCD, and accurate feeding of the recording medium and movement of the reading unit are allowed, uneven image densities can easily be detected within the entire print width. As compared with an arrangement using a line sensor, an inexpensive sensor can be used, and shading correction is not required. In addition, a simple light source can be used, and precision degradation upon contamination of the sensor and the light source can be lessened.

Since a recorded medium can be read without being discharged outside the apparatus, error factors for density detection at the time of test pattern reading are small. High-precision density detection as well as accurate read positioning can be realized.

Figure 69:
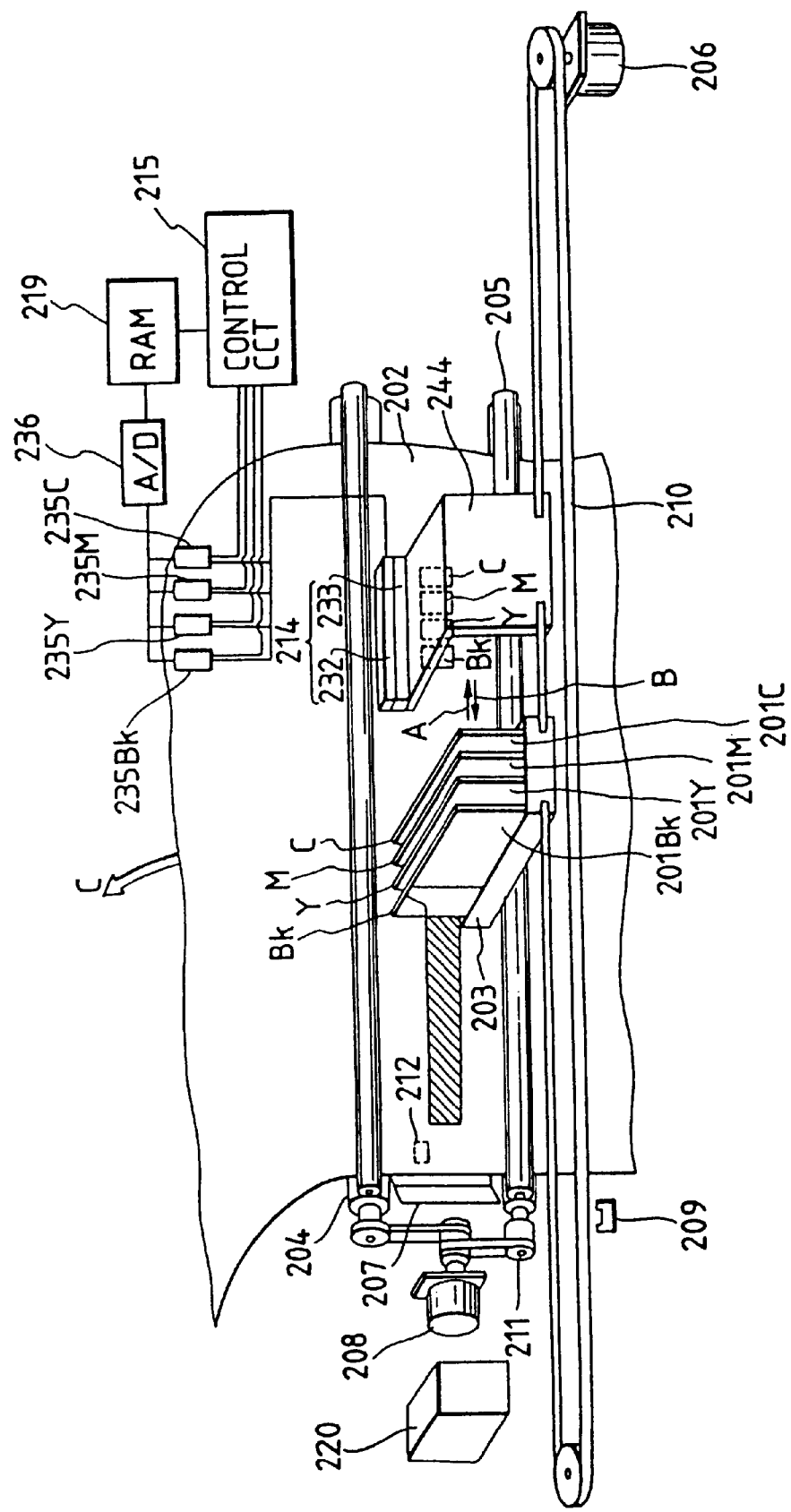
FIG. 69 is a view showing the fourteenth embodiment of the present invention.

FIG. 69 is a schematic view showing the fourteenth embodiment of the present invention. A uniform image signal is supplied to recording heads 201C, 201M, 201Y, and 201BK to record test patterns on a recording medium, and uneven image densities of the test patterns are read to output read signals in the same manner as described above. In the fourteenth embodiment, an uneven image density reading unit 214 comprises a read line sensor 232 and a light source 233. The sensor 232 and the light source 233 are fixed on a main scanning belt 210 through a holder 244. This support mechanism can be appropriately modified, as described with reference to FIG. 63. The same effect as in FIG. 63 can be obtained in this embodiment. Since only one reading sensor is required, the apparatus can be made compact as a whole.

According to the present invention, as described above, since the uneven image density read means is arranged on the carriage or the member interlocked with the recording heads, the test patterns can be read on a member which regulates the recording surface. The recording medium can be kept flat, the distance between the reading unit and the recording medium can be kept constant, and sub-scanning of the recording medium can be accurately performed. Therefore, accurate density reading can be performed. Since a special arrangement for keeping the predetermined distance at the time of test pattern reading is not required, the apparatus can be made compact. Since the distance between the recording head and the reading unit can be kept to be a predetermined distance, inconvenience (e.g., an ink mist and a thermal influence) caused by an excessively small gap between the recording head and the reading unit can be eliminated to protect the read means.

Figure 70:
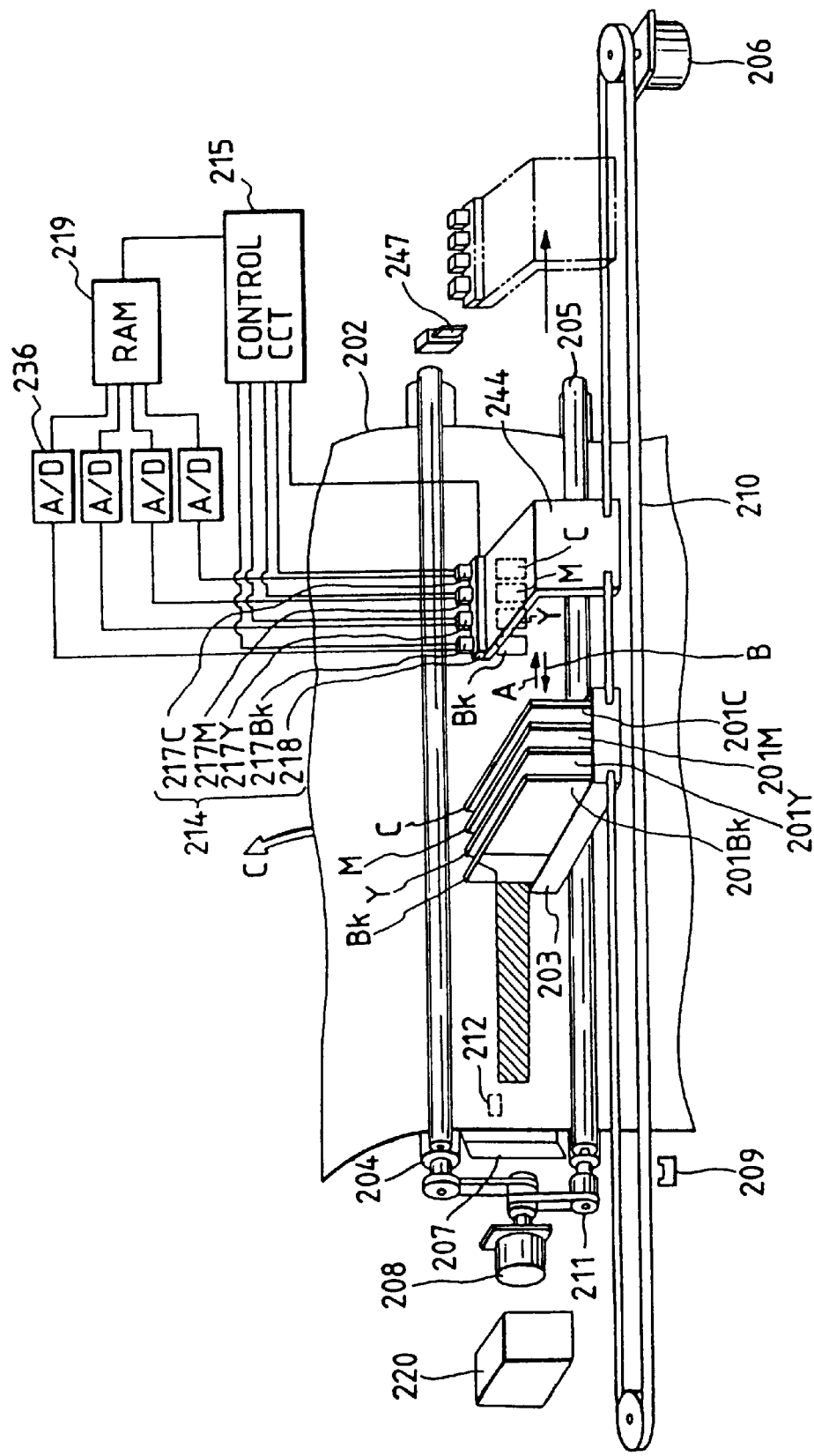
FIG. 70 is a view showing the fifteenth embodiment of the present invention.

Fifteenth embodiment of the present invention will be described below. FIG. 70 is a view showing a mechanical structure of this embodiment. The same reference numerals as in FIG. 63 denote the same parts in FIG. 70, and a detailed description thereof will be omitted.

A cleaning means 247 cleans a transparent protective means for a reading unit 214 (to be described later with reference to FIG. 71). In this embodiment, the cleaning means 214 comprises a blade engaged with the protective means upon every movement of the reading unit moved together with carriage movement during recording or any other operation to clean the surface of the protective means. Upon movement of the carriage during recording or the like, the surface of the protective means is free from ink mists, paper dust, and other foreign substances. The means 247 may take any appropriate form or a cleaning mode in place of the blade. For example, in order to perfectly remove ink mists and the like solidified on the surface of the protective means, an ink solvent or any other cleaning solution may be applied to the surface of the protective means at the time of image reading to facilitate removal of the solidified ink and the contamination substances, and then they may be wiped out by a blade or the like.

Figure 71:
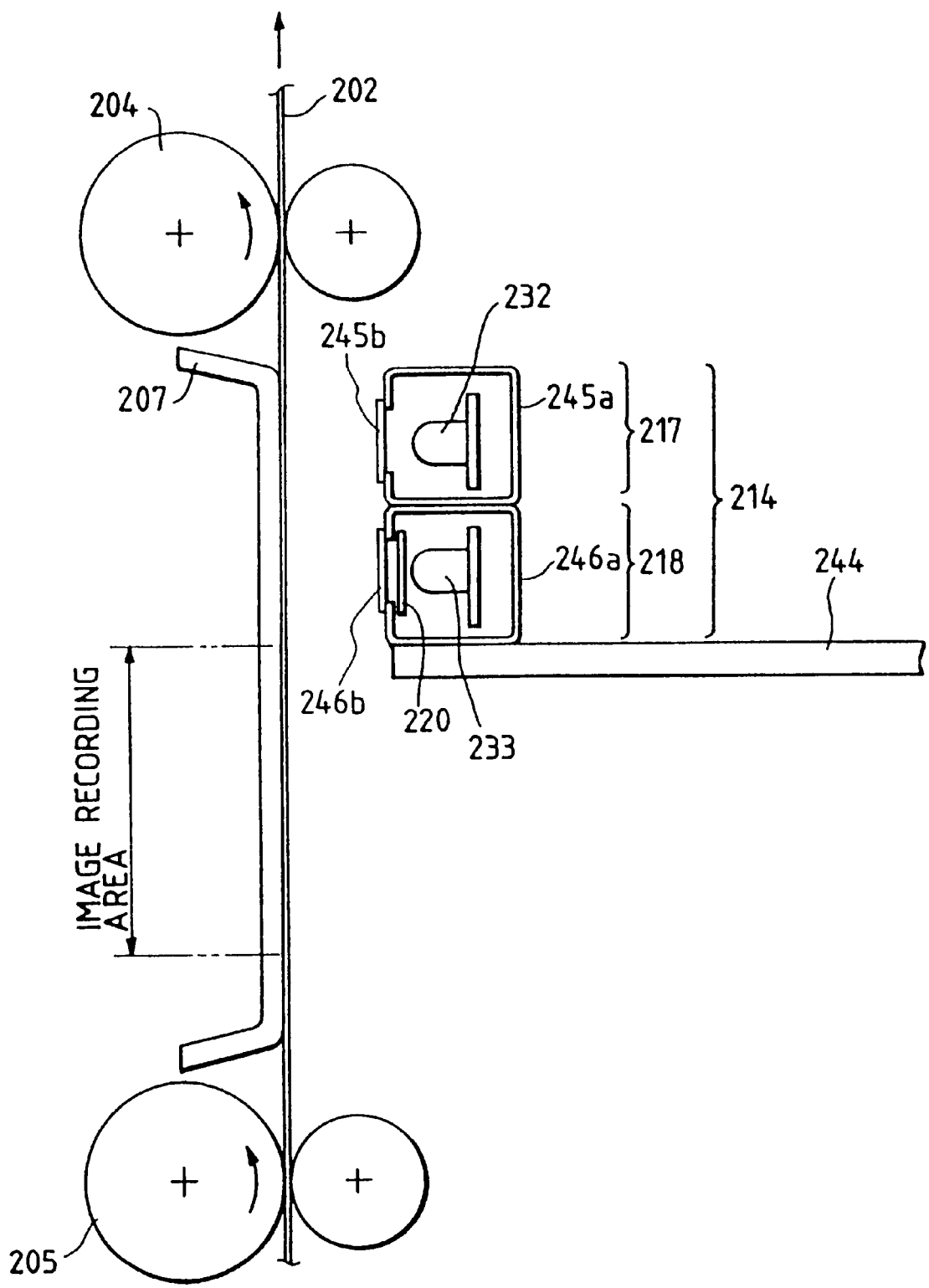
FIG. 71 is a view showing a reading unit of the fifteenth embodiment.

FIG. 71 is a side view showing an arrangement of the reading unit according to this embodiment. Since the reading unit 214 is connected to a main scanning belt 210 through a holder 244, the reading unit 214 is reciprocated together with a carriage 203 in the main scanning direction in the normal recording mode. In order to prevent light-receiving elements 232 arranged in a read sensor 217 (sensors 217C to 217Bk are collectively referred to) and a light source 218 (constituted by a lamp 233 and a filter 220) from being contaminated by ink mists and the like, the light-receiving elements 232 are held in a housing 245a, and the lamp 233 and the filter 220 are held in a housing 246a. Transparent members such as glass windows 245b and 246b are arranged at optical path portions of the housings 245a and 246a, respectively.

Contamination of the optical system with ink mists, paper dust, and water droplets within the apparatus can be prevented by the glass windows serving as the protective members, and the cleaning means, thereby preventing long-term deterioration of the uneven image density reading unit.

The control System, the unevenness correction sequence, and the like of this embodiment are the same as those of the thirteenth embodiment, and a detailed description thereof will be omitted.

With the above arrangement, unevenness reading processing as previously described can be performed. Uneven image densities of the test patterns recorded in units of colors are read, and unevenness correction data for the respective heads can be rewritten. In this case, the glass windows 245b and 246b are engaged with the blade 247 during carriage movement in the recording mode, and the surfaces of the glass windows 245b and 246b are wiped out and cleaned by the blade 247, thereby preventing degradation of reading precision. That is, high reading precision can be maintained without providing any specific cleaning sequence. However, when the glass windows are cleaned by applying the cleaning solution or the like, as described above, it is effective to engage the cleaning solution applying means with the glass windows during movement of the carriage. Alternatively, such cleaning may be performed during only reading. In this case, if this operation is performed by utilizing the fixing stabilization wait time, the total processing time for unevenness correction will not be prolonged.

Figure 72:
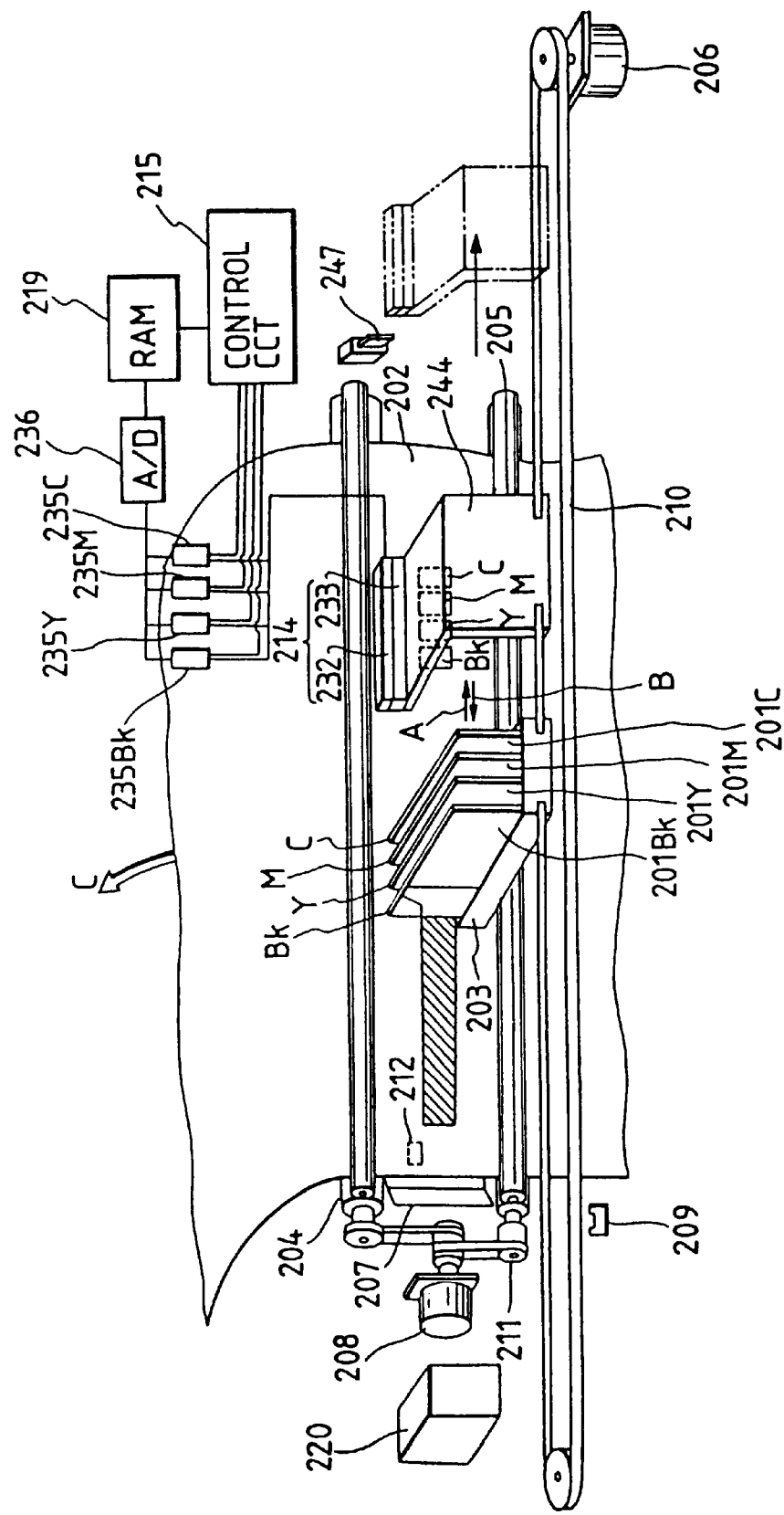
FIG. 72 is a view showing the sixteenth embodiment of the present invention.

FIG. 72 is a schematic view showing the sixteenth embodiment of the present invention. This embodiment is obtained by arranging a cleaning means 247 in the fourteenth embodiment of FIG. 69. The same effect as in the fifteenth embodiment can be obtained in the sixteenth embodiment.

The type and size of the reading sensor of the reading system and scanning relative to test patterns are not limited to the ones described above. For example, a single aperture type sensor for reading reflected light of a predetermined range may be used as the sensor of this embodiment. Alternatively, a line sensor such as a CCD having reading elements arranged in correspondence with the array range of recording elements may be used. In this arrangement, a plurality of read elements are caused to correspond to one orifice, and an average value of the read values is preferably caused to correspond to one orifice.

As a means for protecting the light source, the sensor, and the like from contamination caused by ink mists, the separate housings each with a glass window need not be used. An arbitrary arrangement can be employed. For example, light-transmitting protective means are formed for a lamp (at least its light-emitting portion), a sensor (at least its light-receiving portion), and a filter (at least its filtering portion), and all these components can be simultaneously cleaned. If contamination of any one of the members does not pose any problem, the protective means for the member not susceptible to contamination may be omitted. Alternatively, the entire reading unit may be stored in a single housing, and a protective means such as a single glass window may be arranged in this housing.

According to the present invention, as has been described above, the protective means having an optical path portion as a light-transmitting portion is arranged in the read means, and at least this light-transmitting portion is cleaned. Therefore, inconvenience occurring in the read means, such as ink mists, can be eliminated to protect the read means. Therefore, accurate reading and accurate unevenness correction can be performed.

Figure 73:
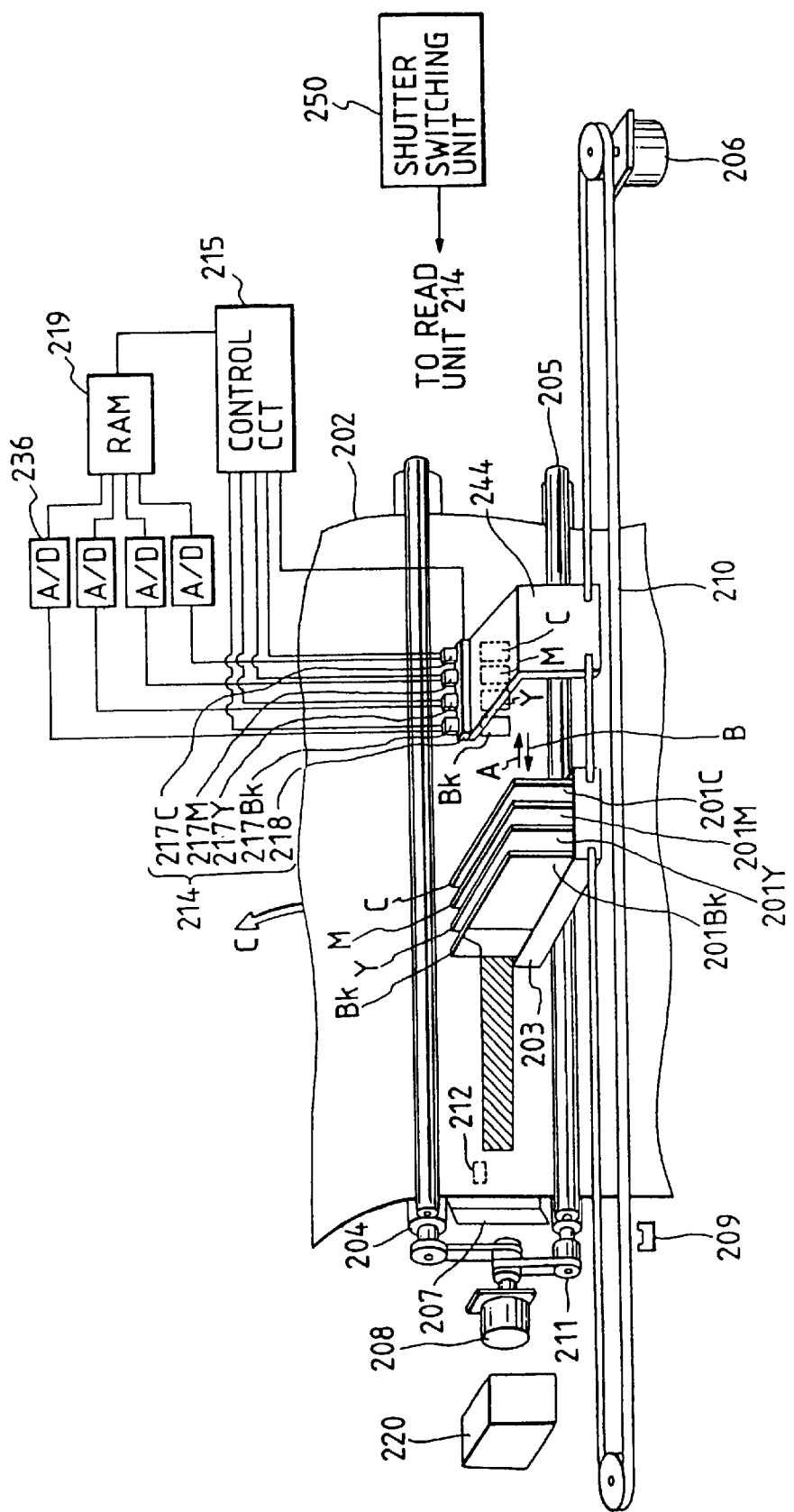
FIG. 73 is a view showing the seventeenth embodiment of the present invention.

The seventeenth embodiment of the present invention will be described below. FIG. 73 is a view showing a mechanical arrangement of this embodiment. The same reference numerals as in FIG. 63 denote the same parts in FIG. 73, and a detailed description thereof will be omitted.

A shutter switching unit 250 opens or closes a shutter serving as a protective means for a reading unit 214 (to be described later with reference to FIG. 74). This switching unit 250 opens the shutter during only reading of test patterns. The switching unit 250 may be a manual switching unit operated by an operator, a switching unit having a mechanism engaged with the shutter to sequentially open or clove the shutter, a switching unit for supplying a switching command to a shutter switching driver arranged in the reading unit 214, or a unit having any other appropriate form.

Figure 74:
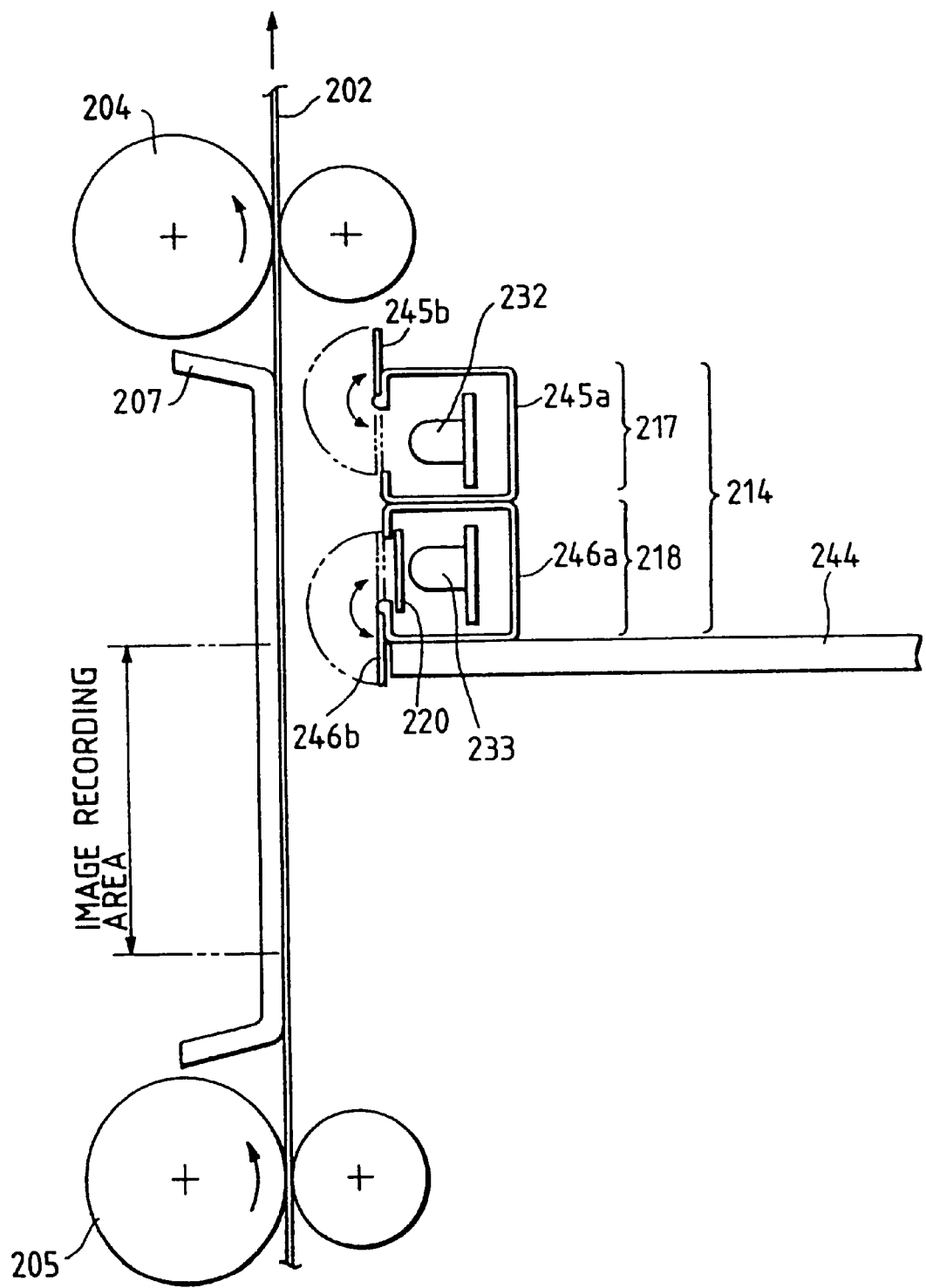
FIG. 74 is a view showing a reading unit of the seventeenth embodiment.

FIG. 74 is a side sectional view showing an arrangement of the reading unit of this embodiment. Since the reading unit 214 is connected to a main scanning belt 210 through a holder 244, the reading unit 214 is repeatedly reciprocated together with a carriage in the main scanning direction in the normal recording mode. In order to prevent light-receiving elements 232 arranged in a read sensor 217 (sensors 217C to 2178k are collectively referred to) and a light source 218 (constituted by a lamp 233 and a filter 220) from being contaminated by ink mists and the like, the light-receiving elements 232 are held in a housing 245*a*, and the lamp 233 and the filter 22D are held in a housing 246*a*. Shutters 245*b* and 246*b* are arranged at optical path portions of the housings 245*a* and 246*a*, respectively.

The shutters 245*b* and 246*b* are kept closed, as indicated by the alternate long and two short dashed lines in FIG. 74, to prevent ink mists and the like from entering into the housings 245*a* and 246*a*. The shutters 245*b* and 246*b* are opened by the shutter switching unit 250 immediately before the reading unit 214 is moved to the test pattern position and unevenness reading is started, thereby starting reading. After reading of the uneven image densities is performed, the shutters 245*b* and 246*b* are closed.

By these operations, contamination of the optical system by ink mists, paper dust, and water droplets inside the apparatus can be prevented, and long-term deterioration of the uneven image density reading unit can be prevented.

Each shutter in FIG. 74 is pivoted as indicated by the alternate long and two short dashed line in FIG. 74 to open or close the housing. However, the shutter may be slid in, e.g., a predetermined direction, thereby inserting internal components into or removing them from the corresponding housing.

As a preferable form of the above shutter mechanism, a cleaner is arranged at a shutter portion which is slid along a reading mechanism to perform a cleaning operation. A seal member may also serve as this cleaner.

A characteristic part of an unevenness correction sequence according to this embodiment will be described with reference to FIG. 75. A control system of this embodiment is the same as that described with reference to each previous embodiment, and a detailed description thereof will be omitted.

Figure 75:
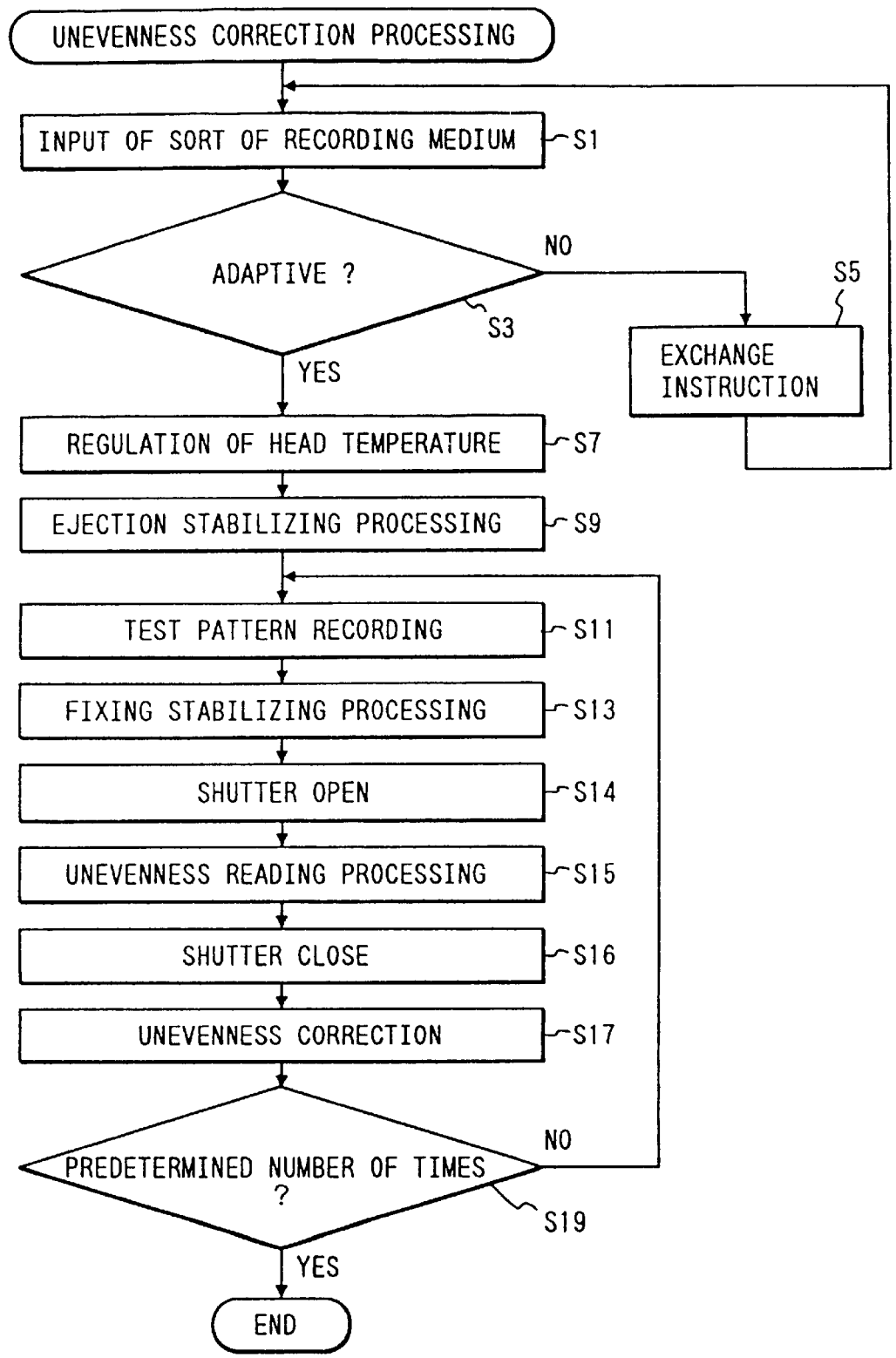
FIG. 75 is a flow chart for explaining uneven image density correction processing of the reading unit shown in FIG. 74.

After fixing stabilization is performed in step S13 of FIG. 75, unevenness reading processing is performed in step S15. Under the control of the shutter switching unit 250, the shutters 245*b* and 246*b* are open immediately before reading is performed (step S14), and the shutters 245*b* and 246*b* are closed immediately before a read operation is started (step S16). That is, since the housings 245*a* and 246*a* are open during only reading, the light-receiving elements, the lamp, and the filter can be effectively prevented from contamination caused by ink mists and the like.

Figure 76:
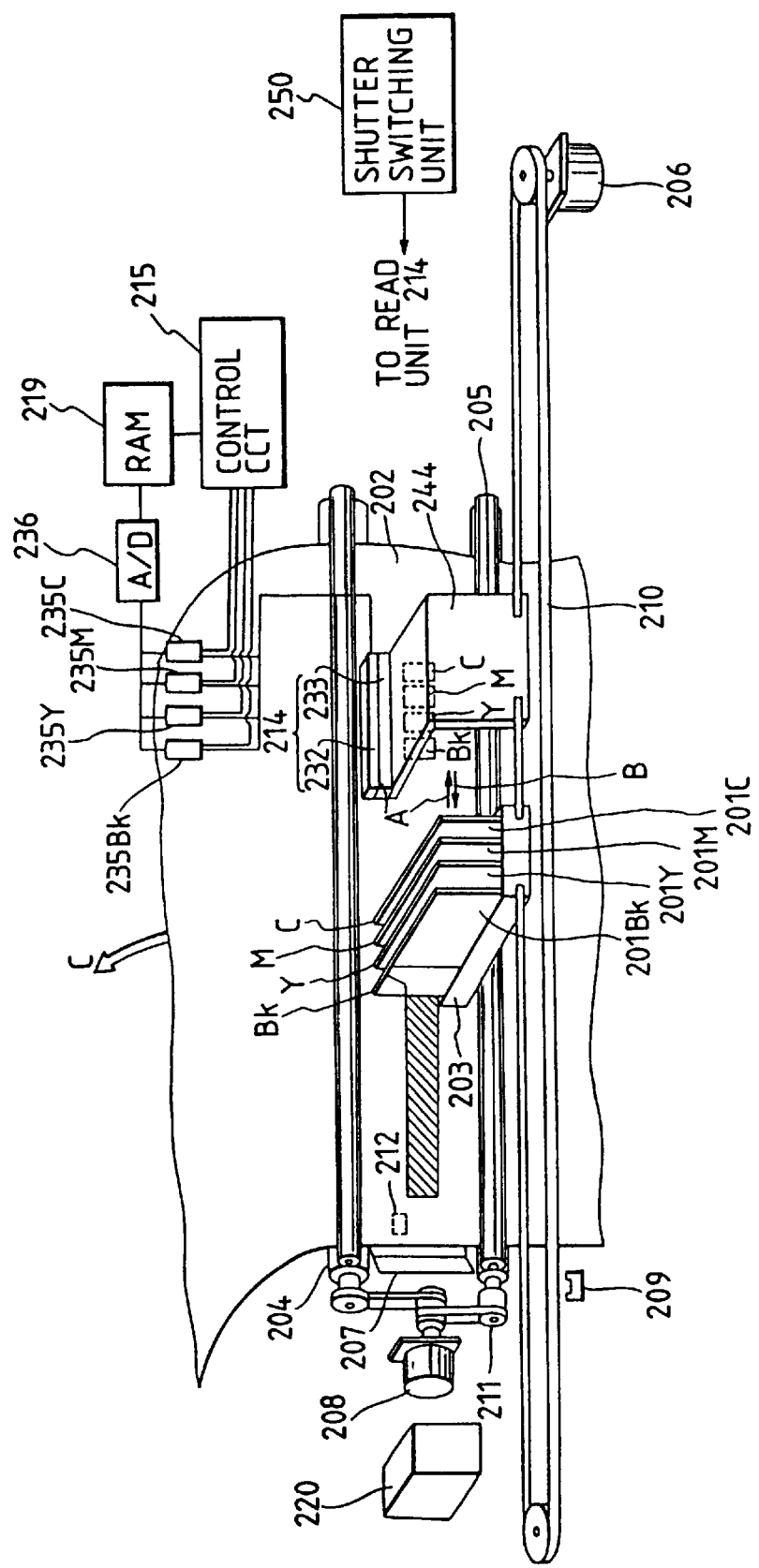
FIG. 76 is a view showing the eighteenth embodiment of the present invention.

FIG. 76 is a schematic view showing the eighteenth embodiment of the present invention. In this embodiment, a shutter switching unit 250 is arranged in the fourteenth embodiment of FIG. 69. The same effect as in the seventeenth embodiment can be obtained.

According to the present invention, as described above, since the protective means is arranged in the read means, the read means can be protected from inconvenience occurring in the read means, e.g., an ink mist. Therefore, accurate reading and hence accurate correction can be performed.

The present invention aim at providing an image forming apparatus capable of causing read sensor outputs to correspond to the respective recording elements and capable of performing appropriate correction in units of recording elements even if a relatively inexpensive low-resolution read sensor is used when test patten images obtained by correction processing performed a plurality of times are subjected to read aberration.

The nineteenth embodiment of the present invention will be described in detail with reference to the accompanying drawings.

Figure 77:
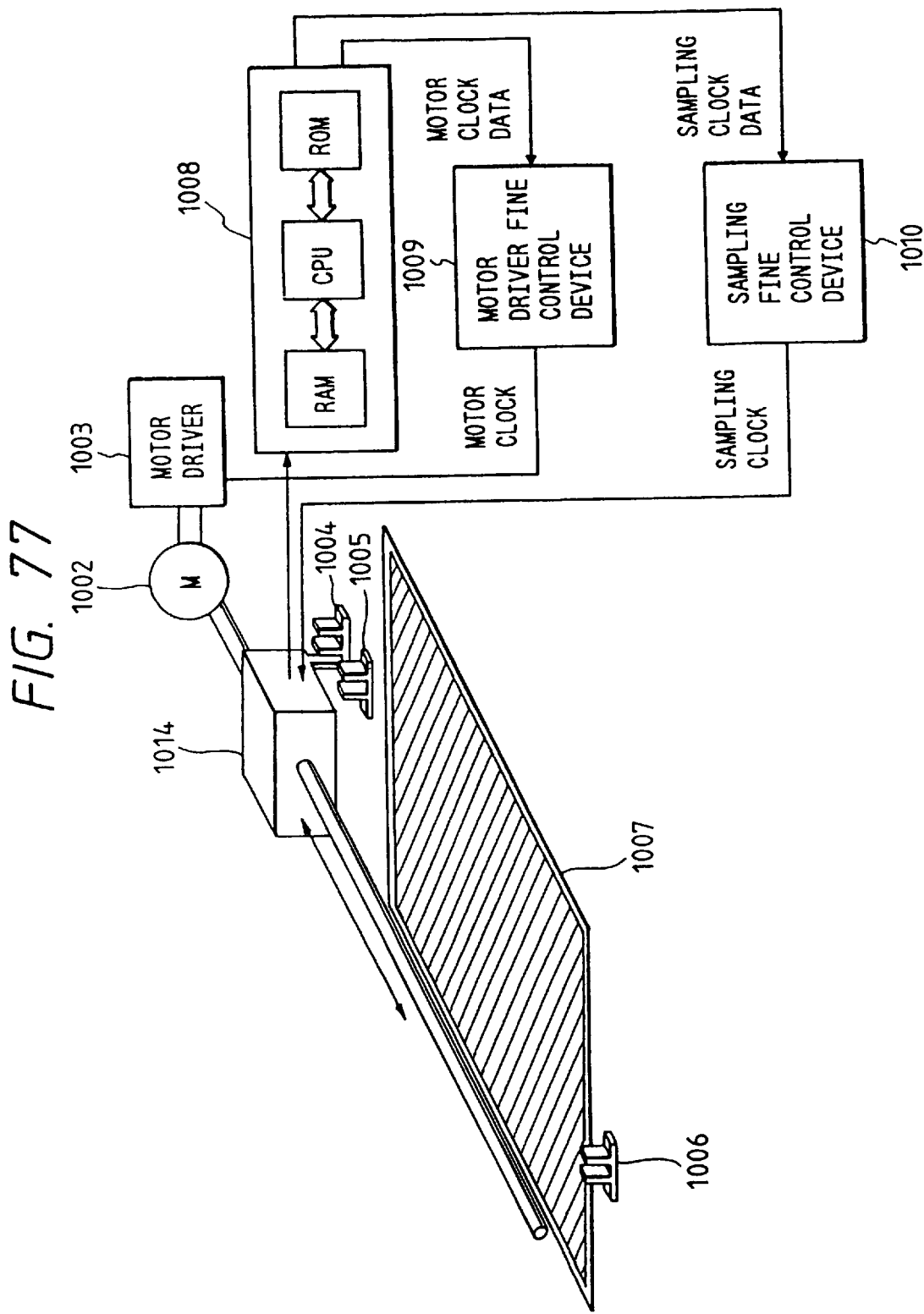
FIG. 77 is a view showing the principle of a reading system according to the nineteenth embodiment.

FIG. 77 is a view showing the principle of an image reading system according to the nineteenth embodiment of the present invention. A reading unit 1014 comprises an image reading sensor having a larger aperture than the size of a print pixel. A motor 1002 drives the reading unit 1014. A motor driver 1003 controls rotation of the motor 1002. A photointerrupter 1004 detects a reference position of the reading unit 1014. A start position detection photointerrupter 1005 detects a read start position. An end position detection photointerrupter 1006 detects a read end position. Test pattern images serving as read targets are printed on a recording medium 1007. An arithmetic operation unit 1008 receives image data output from the reading unit 1014 and performs an arithmetic operation. A motor driver fine control device 1009 controls the motor driver 1003 for performing fine movement of the reading unit 1014. A sampling fine control device 1010 finely controls a sampling pitch of the reading unit 1014.

Figure 79:
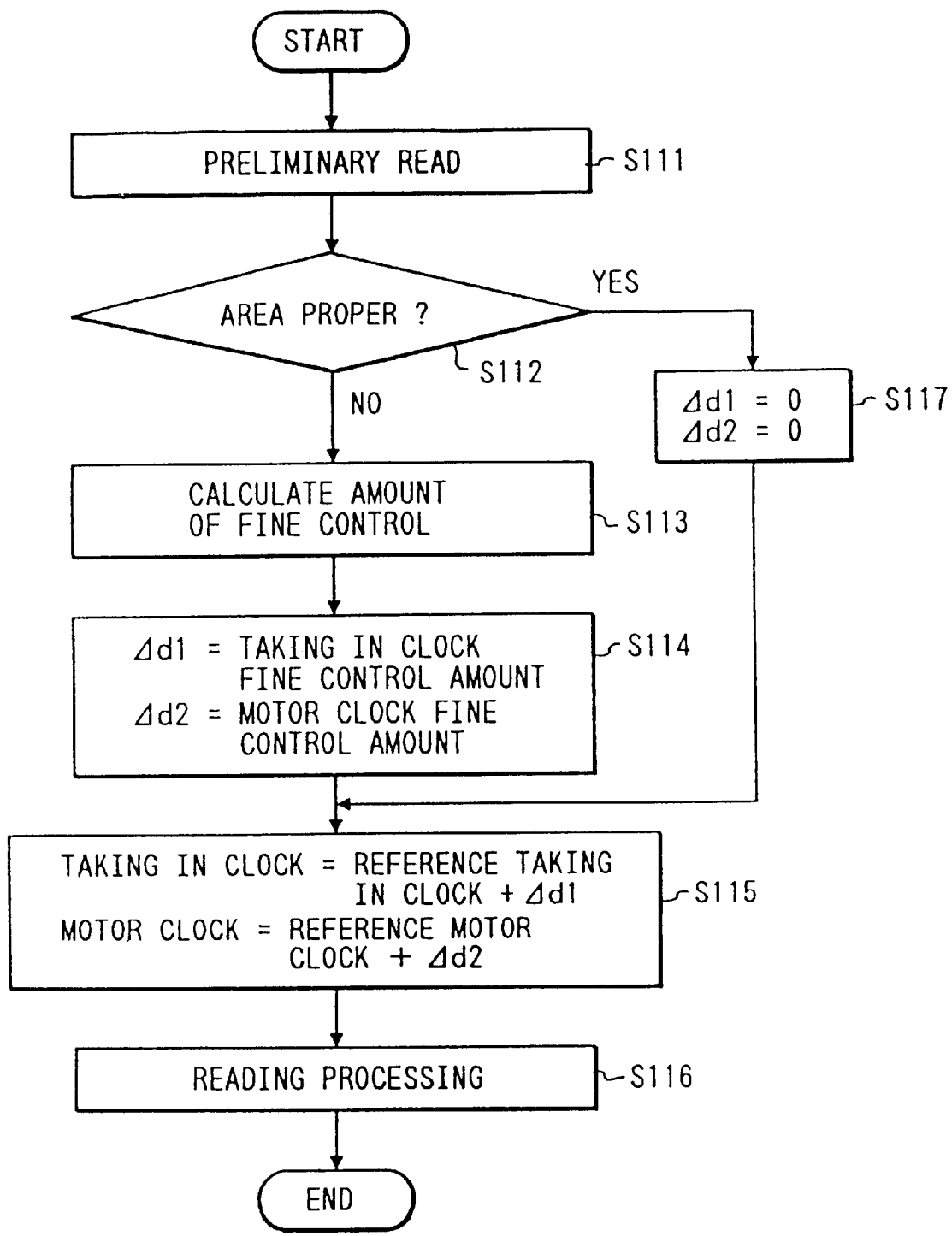
FIG. 79 is a flow chart showing reading processing in the nineteenth embodiment.

Reading processing on the basis of the above arrangement will be described with reference to FIGS. 78 and 79. More specifically, FIG. 78 is a view for explaining processing for finely controlling a positional relationship between an image area and a read sensor, and FIG. 79 is a flow chart showing a reading processing sequence of one correction processing cycle.

Preliminary reading is performed in step S111. Each test pattern image recorded on the recording medium 1007 is scanned at a rate set as an initial value, and this image is read at a sampling pitch (reading pitch) set as an initial value. In step S112, it is determined from a sensor output whether an image area is subjected to aberration from a predetermined position. For example, as a result of reading, when sensor outputs are given as in ① of FIG. 78, i.e., when a waveform of sensor output levels in units of sampling pitches is given by level 0 for output 0, level 1 for output 1, level 3 for output 2, and level 4 for outputs from output 3, this waveform is subjected to aberration from an ideal sensor output waveform shown in ② of FIG. 78. It is thus determined that the detected image area is subjected to aberration from an ideal image area. In this case, the flow advances to step S113. An aberration quantity at an image end and an aberration quantity of a sampling start point are calculated as fine control amounts of the motor control clock and the taking in clock on the basis of the sensor output waveform subjected to aberration. These fine control amounts are set as clock offset amounts of these clocks in step S114. If no aberration is found in an image, this offset quantity is reset to zero in step S117.

When these offset quantities are completely set, the two offset quantities for these reference clocks are added to each other with respect to the sampling fine control device 1010 and the motor clock. In step S116, the reading unit 1014 is scanned using the motor clock sum, and reading for normal correction is performed using the read clock sum. A relationship between the sensor outputs and the image area is given as ② of FIG. 78.

By using the above processing, even if print area aberration occurs due to paper aberration, the same image area can be sampled under the same condition. In particular, since uneven image density correction must be performed a plurality of times, recording elements are specified on the basis of sensor outputs to perform appropriate correction without depending on paper and print positions even if the sensor has a large aperture and a low resolution.

Figure 80:
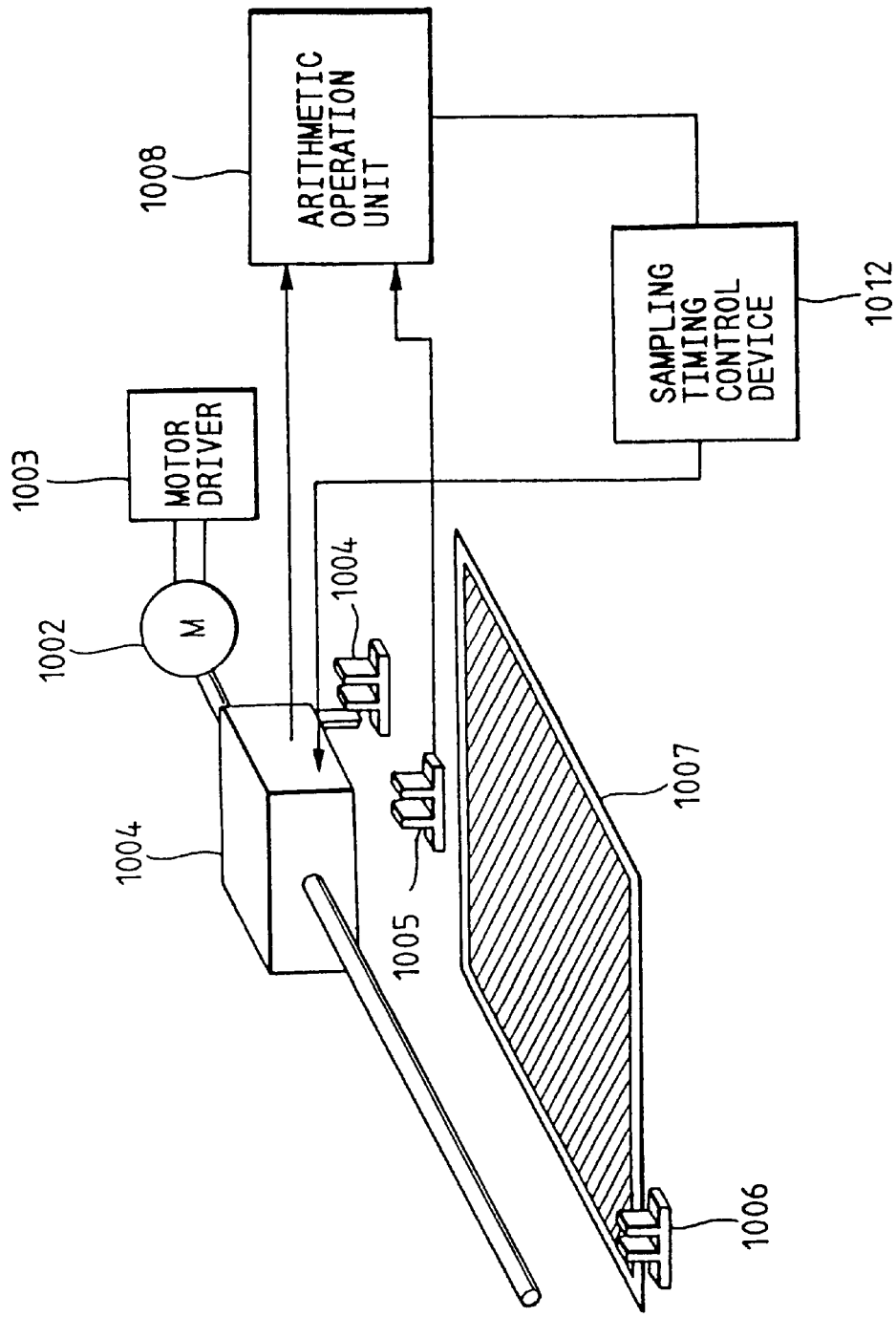
FIG. 80 is a view showing the principle of a reading system according to the twentieth embodiment.
Figure 81:
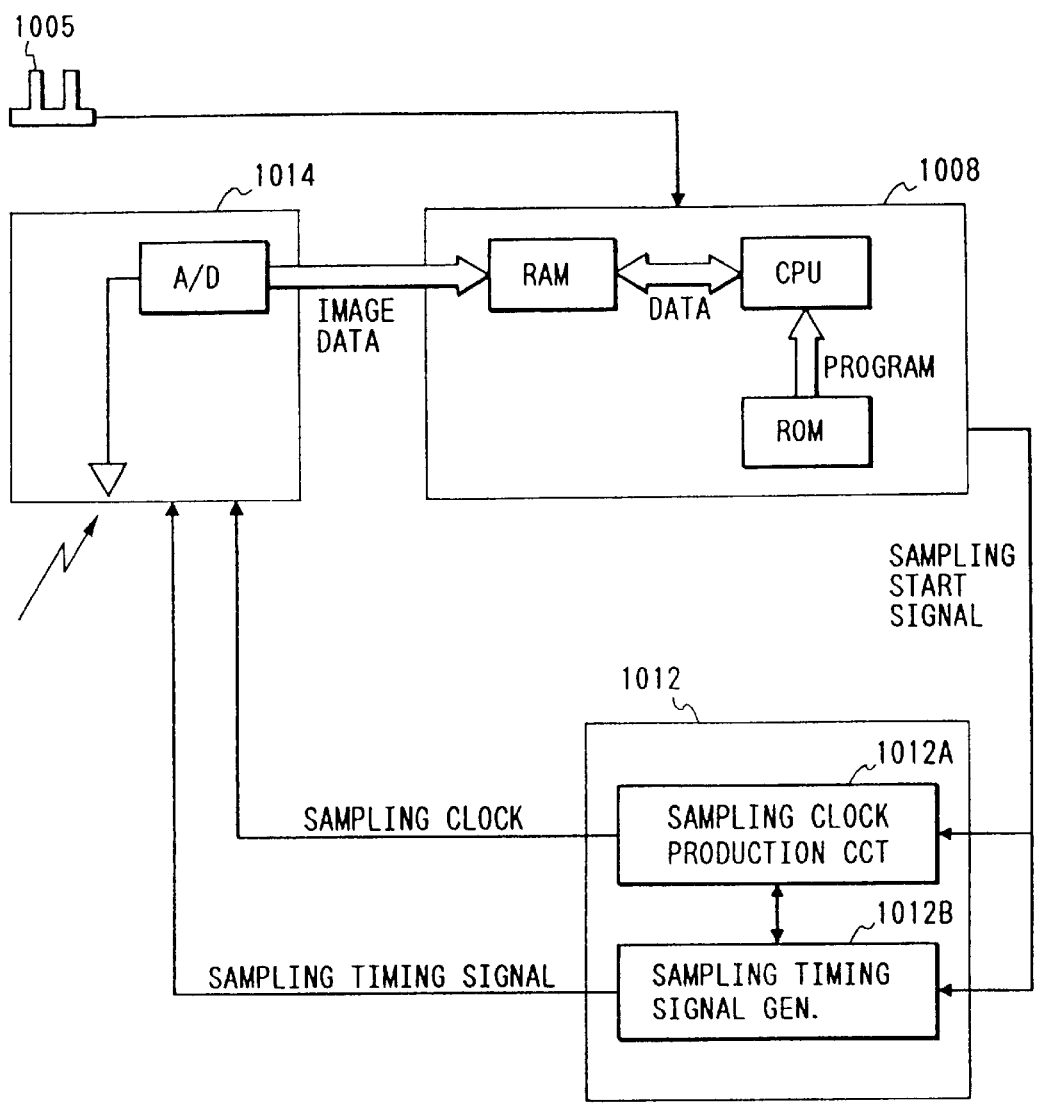
FIG. 81 is a block diagram showing the principle of the reading system of the twentieth embodiment.

FIGS. 80 and 81 are a schematic view and a block diagram, respectively, showing an image reading system according to the twentieth embodiment of the present invention. The same reference numerals as in FIG. 77 denote the same parts in FIGS. 80 and 81, and a detailed description thereof will be omitted. Referring to FIGS. 80 and 81, a sampling timing control device 1012 comprises a sampling clock production circuit 1012A (FIG. 81) and a sampling taming signal generator 1012B (FIG. 81).

Figure 82:
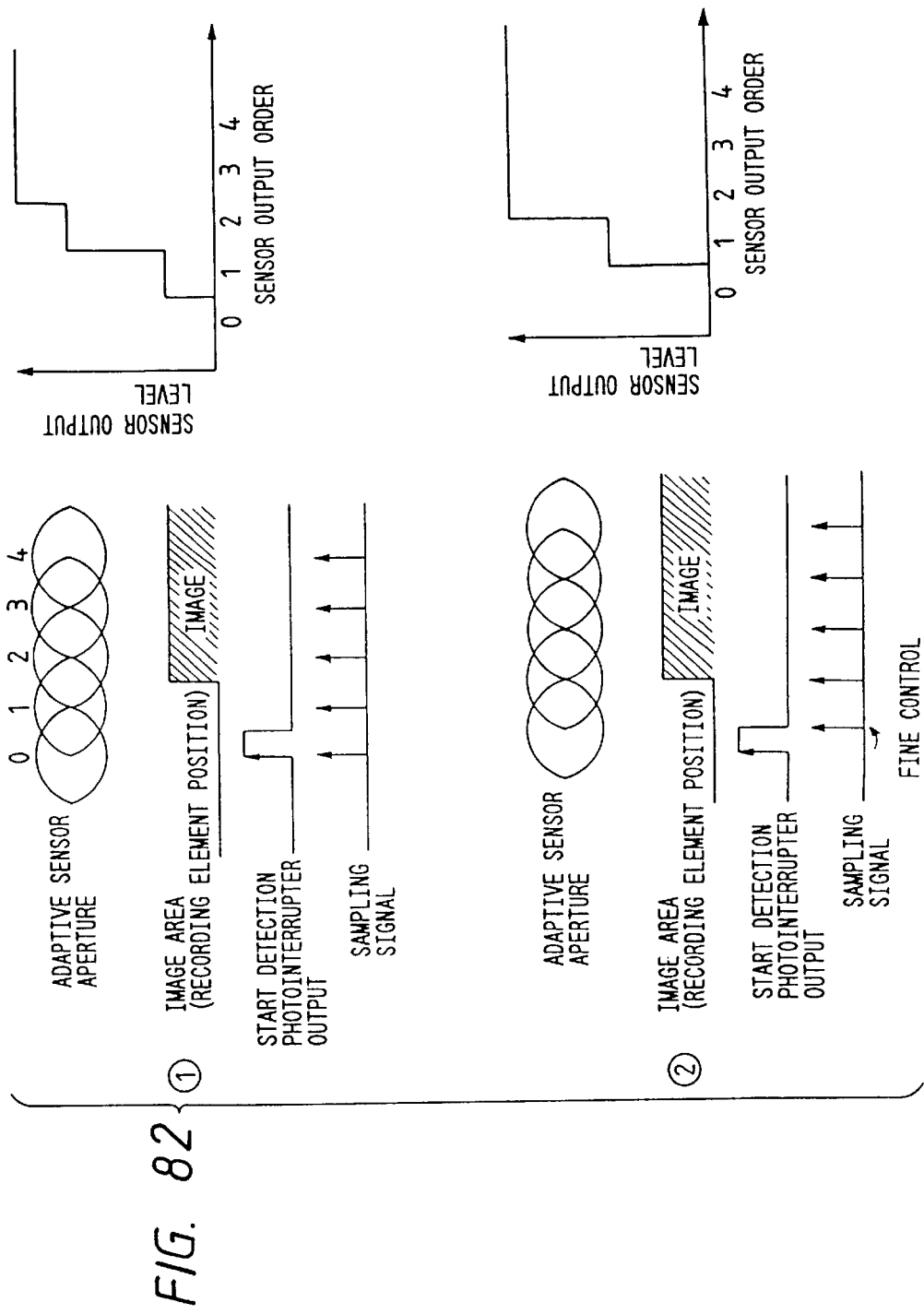
FIG. 82 is a view for explaining correspondence between an image area and a reading sensor output according to the twentieth embodiment.

An operation of this reading system will be described with reference to a description with reference to FIG. 82 and a flow chart of FIG. 83.

Figure 83:
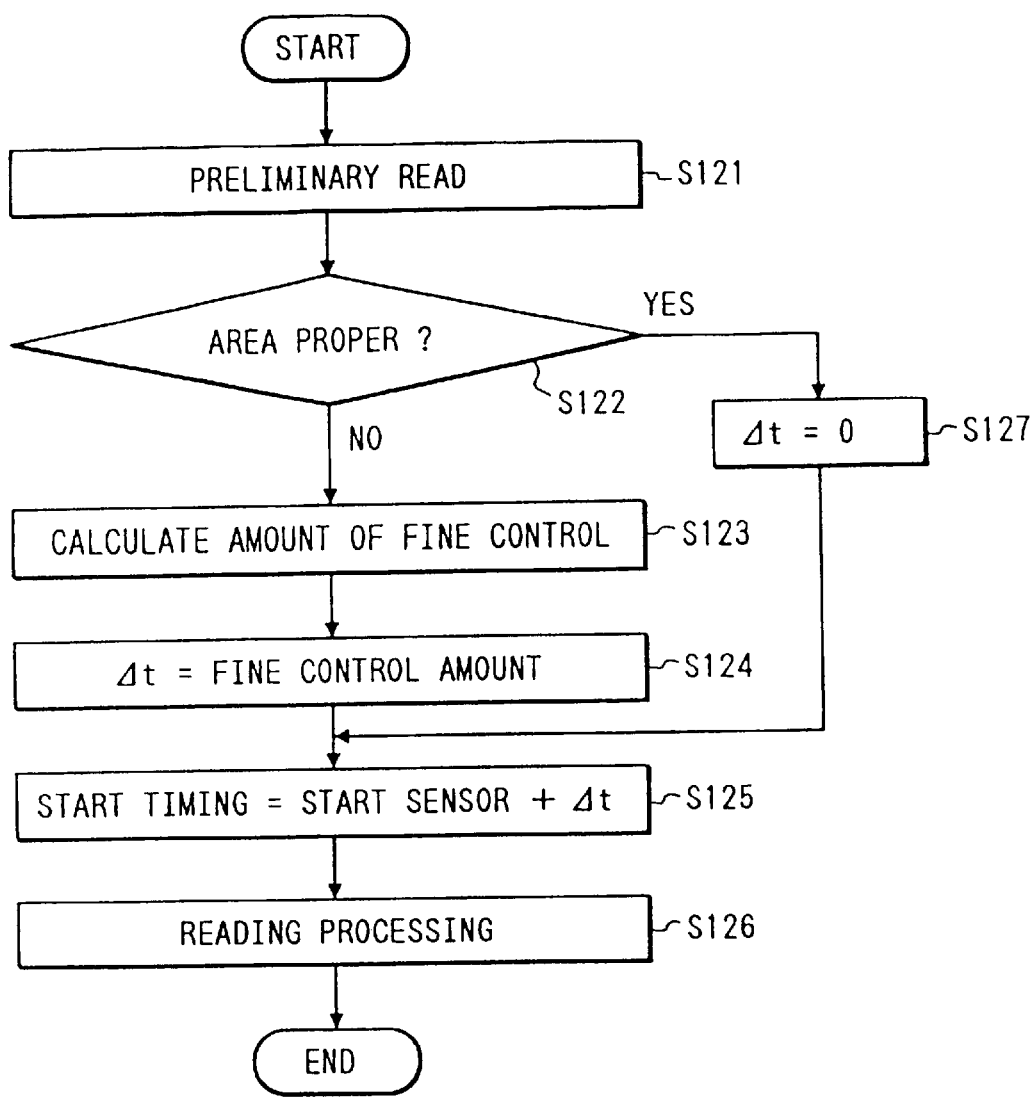
FIG. 83 is a flow chart of reading processing according to the twentieth embodiment.

As shown in the flow chart of FIG. 83, preliminary reading is performed in step S121 as in the nineteenth embodiment.

It is determined in step S122 whether an image area is proper or subjected to aberration from the ideal image area. If image area aberration is detected in step S122, sampling is performed at a position subjected to aberration from a predetermined position. A sensor output given as ① of FIG. 82 is obtained in accordance with a positional relationship between the sensor aperture and the sampling print area. A correspondence between the print area and the sensor outputs becomes unclear. For this reason, in step S123, output level data in an order of sensor outputs taken in a RAM of an arithmetic operation unit are calculated by a CPU in accordance with a program stored in a ROM. In step S124, a time offset quantity is set. This offset time is added to time represented by a start sensor output by the sampling timing control device 1012. Optimal reading is performed within the corrected time in step S126. As a result, a positional relationship between the sensor aperture and the print area is given as ② of FIG. 82. Therefore, a sensor output has a clear end of the print area.

The reading sensor is exemplified by a sensor having an aperture. However, the present invention is also applicable to a reading unit using, e.g., a CCD.

The arrangements described with reference to the first embodiment of FIGS. 12 to 38B are applicable to the nineteenth and twentieth embodiments.

According to the present invention, aberration values of the read position of the reading sensor and the positions of the read test patterns from predetermined positional relationships are obtained in accordance with a read result from the reading sensor for reading the test patterns. The read position of the reading sensor is corrected on the basis of the aberration values, so that the test patterns can be read in accordance with the above predetermined positional relationships. The read result can be caused to correspond to each position within the test pattern. That is, the read result can be caused to correspond to each of the plurality of recording elements. Therefore, optimal correction can be performed in units of recording elements.

High-precision reading can be performed in a low-cost, simple arrangement even if a reading sensor has a large aperture and a relatively low resolution.

In each embodiment described above, when one pixel is constituted by a plurality of dots to print density check patterns such as at least test patterns, the print duties or print densities can be set by changing the number of recording dots constituting one pixel. In this case, the print duty of 75% to 25% is better than the print duty of 100%. Test patterns are preferably formed at an optimal print duty of 50%. This technique is suitable for a scheme for obtaining an optical reflection density. Even a small density change is obtained as a change suitable for print characteristics of a recording head.

The print ratio or duty can be changed by changing a drive voltage and/or drive pulse width, or by changing an ink injection count per dot. This technique can be used when one pixel is constituted by one dot. The present invention can be applied regardless of different setup operations of print duties.

Each embodiment described above is exemplified as an optimal embodiment for performing correction processing in units of injection energy generation elements. In practice, when a convergence state and processing time of the density uniforming processing are taken into consideration, common correction may be performed for a plurality of predetermined adjacent injection energy generation elements. Judging from the above consideration, common correction is preferably performed in units of blocks each consisting of a plurality of elements of a large number of injection energy generation elements of the recording head. This block driving scheme is a known scheme or a specific block drive scheme if drive conditions capable of uniforming densities to be corrected are assured.

Data associated with test patterns may be applied to a host device for the arrangement of FIG. 25. These data may be supplied from the arrangement of FIG. 25 or a test pattern data generating means formed integrally with a recording head 1.

The image forming apparatus may be exemplified as a copying machine in combination of a reader or the like, a facsimile machine having transmission and reception functions, and the like in addition to an image output terminal of data processing equipment such as a computer. In particulars in equipment having an image read means (reader) as an original reading system as in a copying or facsimile machine, the image forming means can also serve as a read means for reading uneven densities of recorded images.

The above embodiments exemplify arrangements for solving a variety of technical problems. All these arrangements are not essential to the present invention. If one or a plurality of arrangements can be arbitrarily selected to arrange a desired apparatus and set a desired even density level, a more preferable arrangement can be obtained.

In the above description, the correction data production device is incorporated in the image forming apparatus, and correction data is produced as needed within the image forming apparatus. However, the present invention is not limited to such a correction data production device. This correction data production device may be arranged independently of the image forming apparatus. In this case, a device independently of the image forming apparatus is used to produce unevenness correction data, and these data are stored in a ROM. The corresponding heads and this ROM may be mounted in the image foaming apparatus.

The present invention brings about excellent effects particularly in a recording head, recording device of ink-jet recording system using heat energy among the ink-jet recording systems.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one drive signal which gives rapid temperature elevation exceeding nucleus boiling corresponding to the recording information on an electricity-heat converters arranged corresponding to the sheets or liquid channels holding liquid (ink), heat energy is generated at the electricity-heat converters to effect film boiling at the heat acting surface of the recording head, and consequently, the bubbles within the liquid (ink) can be formed corresponding one by one to the drive signals. By discharging the liquid (ink) through an opening for discharging by growth and shrinkage of the bubble, at least one droplet is formed. By making the drive signals into pulse shapes, growth and shrinkage of the bubble can be effected instantly and adequately to accomplish more preferably discharging of the liquid (ink) particularly excellent in response characteristic. As the drive signals of such pulse shape, those as disclosed in U.S. Pat. Nos. 4,463,359 and 4,345,262 are suitable. Further excellent recording can be performed by employment of the conditions as described in U.S. Pat. No. 4,313,124 of the invention concerning the temperature elevation rate of the above-mentioned heat acting surface.

As the constitution of the recording head, in addition to the combination constitutions of discharging orifice, liquid channel, electricity-head converter (linear liquid channel or right angle liquid channel) as disclosed in the above-mentioned respective specifications, the constitution by use of U.S. Pat. Nos. 4,558,333, 4,459,600 disclosing the constitution having the heat acting portion arranged in the flexed region is also included in the present invention. In addition, the present invention can also be effectively made the constitution as disclosed in Japanese Patent Laid-Open Application No. 59-123670 which discloses the constitution using a slit common to a plurality of electricity-heat converters as the discharging portion of the electricity-heat converter or Japanese Patent Laid-Open Application No. 59-138461 which discloses the constitution having the opening for absorbing pressure wave of heat energy correspondent to the discharging portion.

Further, as the recording head of the full line type having a length corresponding to the maximum width of recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, addition of a restoration means for the recording head, a preliminary auxiliary means, etc. provided as the constitution of the recording device of the present invention is preferable, because the effect of the present invention can be further stabilized. Specific examples of these may include, for the recording head, capping means, cleaning means, pressurization or aspiration means, electricity-heat converters or another heating element or preliminary heating means according to a combination of these, and it is also effective for performing stable recording to perform preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

What is claimed is:

1. An image forming apparatus for forming an image using a recording head having a plurality of recording elements, said recording elements being arranged in an array and having respectively inherent density characteristics, said apparatus comprising:

test pattern forming means for forming a test pattern, said test pattern being recorded by said plurality of recording elements;

reading means for reading a density of said test pattern corresponding to each of said plurality of recording elements;

eliminating means for eliminating error information, received from an area outside a test pattern area, from density information obtained by said reading means when a density of a test pattern end portion corresponding to an end portion of the array of said plurality of recording elements is determined; and means for making uniform the image densities in correspondence with said plurality of recording elements based on the density information from which the error information is eliminated by said eliminating means.

2. An apparatus according to claim 1, wherein the error information is produced by reading a reference density sample.

3. An apparatus according to claim 1, wherein said recording head has recording agents having different colors to perform multi-color recording.

4. An apparatus according to claim 1, wherein each of said plurality of recording elements of said recording head has an orifice for injecting an ink.

5. An apparatus according to claim 4, where each of said recording elements comprises heat energy generating means, arranged in correspondence with each said orifice, for causing a change in state of the ink by heat, ejecting the ink from said orifice based on the change in state, and forming a flying ink droplet.

6. An apparatus according to claim 1, wherein said recording head is of a serial scanning type.

7. An apparatus according to claim 1, wherein said recording head is of a full-line type.

8. An image forming apparatus comprising:
a recording head, having a plurality of recording elements constituting an array, for performing image formation of a plurality of images each having an image density on a recording medium;
signal generating means for causing said recording head to record a predetermined test pattern;
reading means for reading the test pattern formed by said recording head under the control of said signal generating means;
read value correcting means for correcting a read value of an end portion in accordance with a read value of an adjacent portion adjacent to said end portion, said end portion corresponding to an end portion of said array of said plurality of recording elements; and
means for making uniform the densities of the images in correspondence with said plurality of recording elements based on the read value of the end portion corrected by said read value correcting means and the read value of a portion which does not include the end portion.

9. An apparatus according to claim 8, wherein said recording head has recording agents having different colors to perform multi-color recording.

10. An apparatus according to claim 8, wherein each of said plurality of recording elements of said recording head has an orifice for injecting an ink.

11. An apparatus according to claim 10, where each of said recording elements comprises heat energy generating means, arranged in correspondence with each said orifice, for causing a change in state of the ink by heat, ejecting the ink from said orifice based on the change in state, and forming a flying ink droplet.

12. An apparatus according to claim 8, wherein said recording head is of a serial scanning type.

13. An apparatus according to claim 8, wherein said recording head is of a full-line type.

14. An image forming apparatus comprising:
a recording head, having a plurality of recording elements constituting an array, for performing image formation of a plurality of images each having an image density on a recording medium;
signal generating means for causing said recording head to record a predetermined test pattern;
reading means for reading the test pattern formed by said recording head under the control of said signal generating means;
read value correcting means for correcting a read value of an end portion in accordance with a read value of an adjacent portion adjacent to said end portion, said end portion corresponding to an end portion of said array of said plurality of recording elements; and
means for making uniform the densities of the images in correspondence with said plurality of recording elements based on the read value of the end portion corrected by said read value correcting means and the read value of a portion which does not include the end portion,
wherein said read value correcting means substitutes for the read value of said end portion corresponding to said end portion of said array of said plurality of recording elements the read value of said adjacent portion adjacent to said end portion.

15. An apparatus according to claim 14, wherein said recording head has recording agents having different colors to perform multi-color recording.

16. An apparatus according to claim 14, wherein each of said plurality of recording elements of said recording head has an orifice for injecting an ink.

17. An apparatus according to claim 16, wherein each of said recording elements comprises heat energy generating means, arranged in correspondence with each said orifice, for causing a change in state of the ink by heat, ejecting the ink from said orifice based on the change in state, and forming a flying ink droplet.

18. An apparatus according to claim 14, wherein said recording head is of a serial scanning type.

19. An apparatus according to claim 14, wherein said recording head is of a full-line type.

20. An image forming apparatus comprising:
a recording head, having a plurality of recording elements constituting an array, for performing image formation of a plurality of images each having an image density on a recording medium;
signal generating means for causing said recording head to record a predetermined test pattern;
reading means for reading the test pattern formed by said recording head under the control of said signal generating means;
read value correcting means for correcting a read value of an end portion in accordance with a read value of an adjacent portion adjacent to said end portion, said end portion corresponding to an end portion of said array of said plurality of recording elements; and
means for making uniform the densities of the images in correspondence with said plurality of recording elements based on an end portion value corrected by said read value correcting means and the read value of a portion which does not include the end portion,
wherein said read value correcting means converts the read value of said end portion corresponding to said end portion of said array of said plurality of recording elements to the read value of said adjacent portion adjacent to said end portion.

21. An apparatus according to claim 20, wherein said recording head has recording agents having different colors to perform multi-color recording.

22. An apparatus according to claim 20, wherein each of said plurality of recording elements of said recording head has an orifice for injecting an ink.

23. An apparatus according to claim 22, wherein each of said recording elements comprises heat energy generating means, arranged in correspondence with each said orifice, for causing a change in state of the ink by heat, ejecting the ink from said orifice based on the change in state, and forming a flying ink droplet.

24. An apparatus according to claim 20, wherein said recording head is of a serial scanning type.

25. An apparatus according to claim 20, wherein said recording head is of a full-line type.

26. An image forming method, comprising the steps of:
reading a density of a test pattern which corresponds to each of a plurality of recording elements of a recording head, said recording elements being arranged in an array and each having an image density, the test pattern being recorded by said plurality of recording elements of said recording head;

eliminating an error information, received from an area outside a test pattern area, from density information obtained in said reading step when a density of a test pattern end portion corresponding to an end portion of the array of said plurality of recording elements is determined; and making uniform the image densities in correspondence with said plurality of recording elements based on the density information from which the error information is eliminated in said eliminating step.

27. A method according to claim 26, wherein said recording head has an orifice for ejecting an ink.

28. A method according to claim 27, wherein said plurality of recording elements comprise heat energy generating means for applying heat energy to the ink to cause bubbles in the ink and eject the ink from said orifice.

29. An image forming method, comprising the steps of:

providing a recording head, having a plurality of recording elements constituting an array, for performing image formation of a plurality of images each having an image density on a recording medium;

causing said recording head to record a predetermined test pattern;

reading the test pattern formed by said recording head;

correcting a read value of an end portion in accordance with a read value of an adjacent portion adjacent to said end portion, said end portion corresponding to an end portion of said array of said plurality of recording elements; and making uniform the densities of the images in correspondence with said plurality of recording elements based on said read value of said end portion corrected in said correcting step and the read value of a portion which does not include the end portion.

30. A method according to claim 29, wherein said read value correcting step substitutes for the read value of said end portion corresponding to said end portion of said array of said plurality of recording elements the read value of said adjacent portion adjacent to said end portion.

31. A method according to claim 29, wherein said read value correcting step executes calculation on the read value of said portion adjacent to said end portion to obtain the read value of said end portion corresponding to said end portion of said array of said plurality of recording elements.

32. A method according to claim 29, wherein said recording head has an orifice for ejecting an ink.

33. A method according to claim 32, wherein said plurality of recording elements comprise heat energy generating means for applying heat energy to the ink to cause bubbles in the ink and eject the ink from said orifice.

34. An image forming apparatus for forming an image using a recording head having a plurality of recording elements, said recording elements being arranged in an array and having respectively inherent density characteristics, said apparatus comprising:

test pattern forming means for forming a test pattern, said test pattern being recorded by said plurality of recording elements;

reading means for reading a density of said test pattern corresponding to each of said plurality of recording elements;

calculating means for calculating correction data for correcting an image signal corresponding to each of said plurality of recording elements, on the basis of the density of said test pattern;

correcting means for correcting input image data on the basis of said correction data, corresponding to each of said plurality of recording elements; and record control means for moving said recording head for recording, based on the image data corrected by said correcting means, wherein said calculating means executes different calculation of the correction data for a recording element corresponding to an end portion of the array of said plurality of recording elements, from that of the correction data for a recording element corresponding to a portion other than the end portion of the array of said plurality of recording elements.

35. An apparatus according to claim 34, wherein the correction data is produced by reading a reference density sample.

36. An apparatus according to claim 34, wherein said recording head has recording agents having different colors to perform multi-color recording.

37. An apparatus according to claim 34, wherein each of said plurality of recording elements of said recording head has an orifice for injecting an ink.

38. An apparatus according to claim 37, wherein each of said recording elements comprises head energy generating means, arranged in correspondence with each said office, for causing a change in state of the ink by head, ejection the ink from said orifice based on the change in state, and forming a flying ink droplet.

39. An apparatus according to claim 34, wherein said recording head is of a serial scanning type.

40. An apparatus according to claim 34, wherein said recording head is of a full-line type.

* * * * *

UNITED STATES PATENT AND TRADEMARK OFFICE
CERTIFICATE OF CORRECTION

PATENT NO. : 6,000,776
DATED : December 14, 1999
INVENTOR(S) : Akio Suzuki, et al.

It is certified that error appears in the above-identified patent and that said Letters Patent is hereby corrected as shown below:

Title page
Under item [57] Abstract,
Line 10, "of" should be deleted.

In the drawings
Figure 18A, sheet 12, "OPTICAY" should read -- OPTICAL --;
Firgure 18C, sheet 13, "OPTICAY" should read -- OPTICAL --;
Firgure 25, sheet 19, "ROWRITING" should read -- REWRITING --.

Column 2
Line 2, "Input" should read -- input --.

Column 4
Line 5, "distribution A" should read -- distribution B --;
Line 36, "the" (second occurrence) should be deleted;
Line 45, "coefficient a" should read -- coeffcent $\alpha$ --.

Column 6
Line 50, "is" should be deleted.

Column 9
Line 27, "provide" should read -- provided --.

Column 17
Line 34, "the" (second occurrence) should be deleted;
Line 43, "coefficient a" should read -- coefficient $\alpha$ --.

Column 18
Line 39, "having an aperature" (second occurrence) should be deleted.

Column 19
Line 56, "or" should read -- for --;
Line 57, "do" should read -- $d_0$ --.

Column 21
Line 50, "IBY" should read -- 1 BK --.

UNITED STATES PATENT AND TRADEMARK OFFICE
CERTIFICATE OF CORRECTION

PATENT NO. : 6,000,776
DATED : December 14, 1999
INVENTOR(S) : Akio Suzuki, et al.

It is certified that error appears in the above-identified patent and that said Letters Patent is hereby corrected as shown below:

Column 23
Line 46, "prior to" should be deleted.

Column 27
Line 38, "charge" should read -- change --.

Column 29
Line 35, "and" should read -- end --.

Column 30
Line 46, "sat." should read -- set --.

Column 31
Line 14, "media" should read -- media. --.

Column 33
Line 42, "Medium" should read -- medium --;
Line 43, "AM 219" should read -- RAM 219 --.

Column 35
Line 3, "au" should read -- as --.

Column 38
Line 7, "car" should read -- can --.

Column 45
Line 58, "patterns" (first occurrence) should read -- Patterns --.

Column 46
Line 60, "to be" should read -- to --.

Column 48
Line 19, "System," should read -- system, --
Line 39, "during only" should read -- only during --.

UNITED STATES PATENT AND TRADEMARK OFFICE
CERTIFICATE OF CORRECTION

PATENT NO.  : 6,000,776
DATED       : December 14, 1999
INVENTOR(S) : Akio Suzuki, et al.

It is certified that error appears in the above-identified patent and that said Letters Patent is hereby corrected as shown below:

Column 49
Line 27, "clove" should read -- close --;
Line 38, "2178K" should read -- 217 BK --;
Line 42, "22D" should read -- 220 --.

Column 51
Line 13, "waveforn" should read -- waveform --.
Line 42, "taming" should read -- timing --.

Column 52
Line 63, "particulars" should read -- particular, --.

Column 54
Line 64, "where" should read -- wherein --.

Column 55
Line 34, "where" should read -- wherein --.

Column 58
Line 42, "office," should read -- orifice, --;
Line 43, "ejection" should read ejection of --.

Signed and Sealed this

Eleventh Day of September, 2001

*Nicholas P. Godici*

*Attest:*

NICHOLAS P. GODICI
*Attesting Officer*   *Acting Director of the United States Patent and Trademark Office*